(12) United States Patent
Jarrell et al.

(10) Patent No.: US 11,668,031 B2
(45) Date of Patent: *Jun. 6, 2023

(54) APPARATUS AND METHODS FOR MATERIAL MANIPULATION

(71) Applicant: Fractal Braid, Inc., Portland, OR (US)

(72) Inventors: Jesse Jarrell, Portland, OR (US); Louis A. Ashford, Portland, OR (US); Dustin French, Portland, OR (US)

(73) Assignee: Fractal Braid, Inc., Portland, OR (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/238,249

(22) Filed: Apr. 23, 2021

(65) Prior Publication Data
US 2021/0348314 A1    Nov. 11, 2021

Related U.S. Application Data

(63) Continuation of application No. 16/845,410, filed on Apr. 10, 2020, now Pat. No. 11,008,683, which is a continuation of application No. 16/517,249, filed on Jul. 19, 2019, now Pat. No. 10,640,897, which is a continuation of application No. 16/197,256, filed on Nov. 20, 2018, now Pat. No. 10,378,132, which is a
(Continued)

(51) Int. Cl.
| | | |
|---|---|---|
| *D04C 3/24* | (2006.01) | |
| *D04C 3/38* | (2006.01) | |
| *D04C 3/22* | (2006.01) | |
| *D04C 3/42* | (2006.01) | |
| *B33Y 30/00* | (2015.01) | |
| *D04C 3/44* | (2006.01) | |
| *D04C 3/46* | (2006.01) | |
| *H02K 15/04* | (2006.01) | |

(52) U.S. Cl.
CPC ............... *D04C 3/24* (2013.01); *B33Y 30/00* (2014.12); *D04C 3/22* (2013.01); *D04C 3/38* (2013.01); *D04C 3/42* (2013.01); *D04C 3/44* (2013.01); *D04C 3/46* (2013.01); *H02K 15/045* (2013.01)

(58) Field of Classification Search
CPC ... D04C 3/04; D04C 3/22; D04C 3/24; D04C 3/30; D04C 3/32; D04C 3/36; D04C 3/38; D04C 3/42; D04C 3/48
See application file for complete search history.

(56) References Cited

U.S. PATENT DOCUMENTS

| | | | | |
|---|---|---|---|---|
| 4,258,813 | A * | 3/1981 | Rubel ................. | G05D 1/0265 318/587 |
| 6,045,319 | A * | 4/2000 | Uchida ............... | H02K 41/031 414/676 |

(Continued)

*Primary Examiner* — Shaun R Hurley
(74) *Attorney, Agent, or Firm* — Wilson Sonsini Goodrich & Rosati

(57) ABSTRACT

An apparatus for manipulating a material is provided. The apparatus may comprise a magnetic device arranged in a three-dimensional configuration. The apparatus may comprise a surface on which at least one carrier is configured to move. The magnetic device may be configured to provide a magnetic field for driving the carrier on the surface to manipulate a material. The apparatus may comprise a controller configured to control the magnetic device to modulate the magnetic field. The controller may be further configured to detect a position and/or motion of the carrier.

20 Claims, 34 Drawing Sheets

Related U.S. Application Data continuation of application No. PCT/US2017/067038, filed on Dec. 18, 2017.

(60) Provisional application No. 62/437,910, filed on Dec. 22, 2016.

(56) References Cited

U.S. PATENT DOCUMENTS

| | | | |
|---|---|---|---|
| 10,378,132 B2* | 8/2019 | Jarrell | D04C 3/12 |
| 10,640,897 B2* | 5/2020 | Jarrell | D04C 3/36 |
| 11,008,683 B2* | 5/2021 | Jarrell | D04C 3/18 |
| 2012/0012620 A1* | 1/2012 | Mejia | D04C 3/00 |
| | | | 223/35 |
| 2013/0034410 A1* | 2/2013 | Heise | G01N 35/04 |
| | | | 414/222.13 |

* cited by examiner

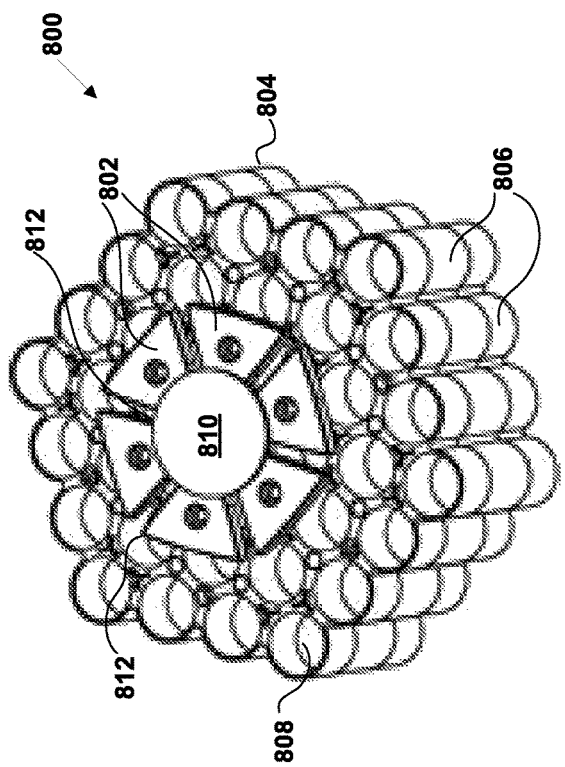
FIG. 8A
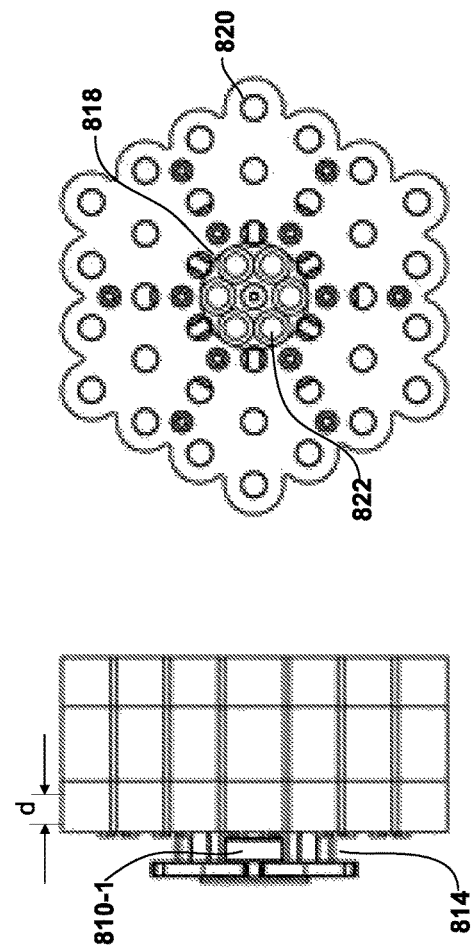
FIG. 8D
FIG. 8C
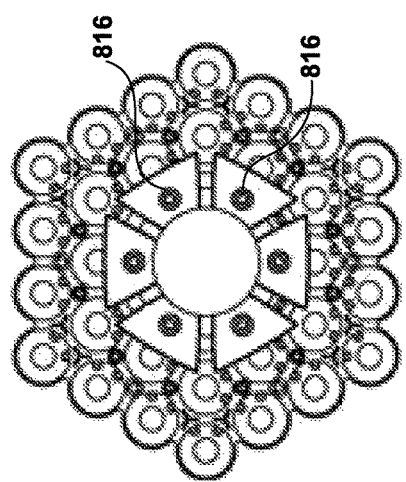
FIG. 8B

Section A-A

Section B-B

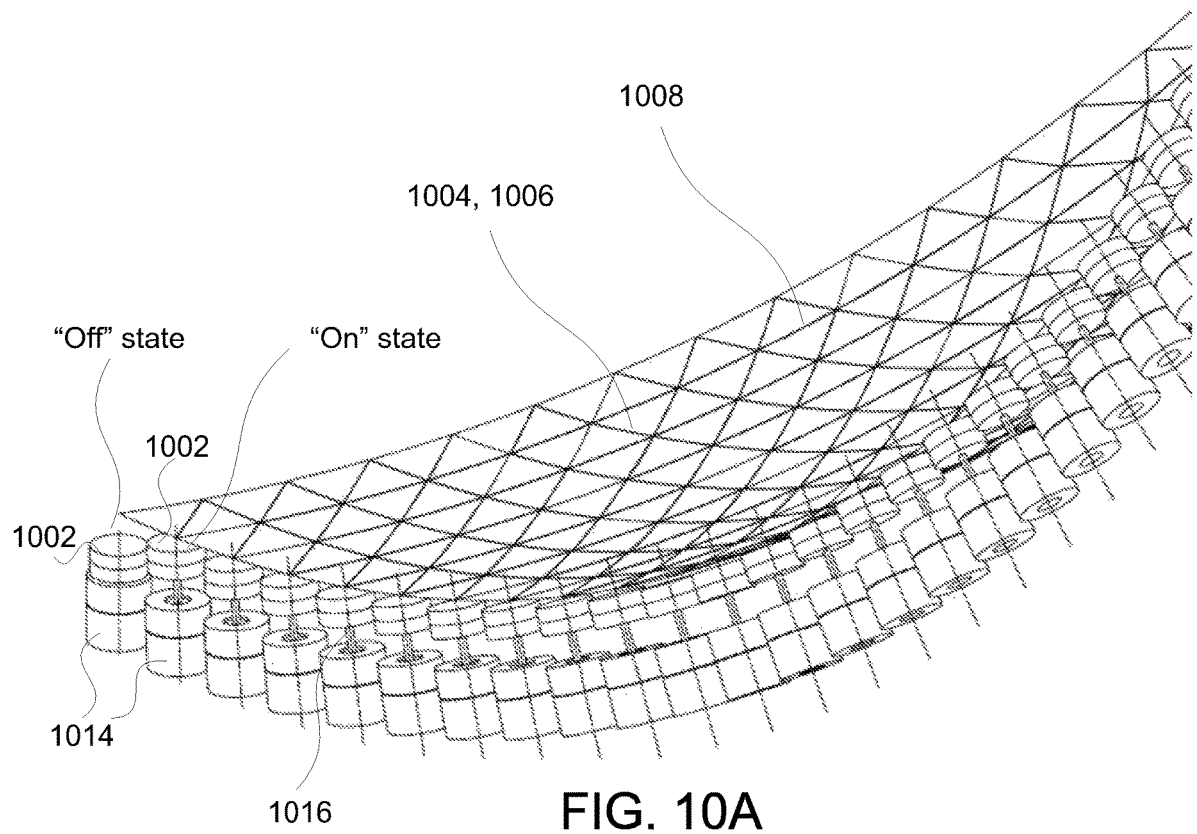
FIG. 10A
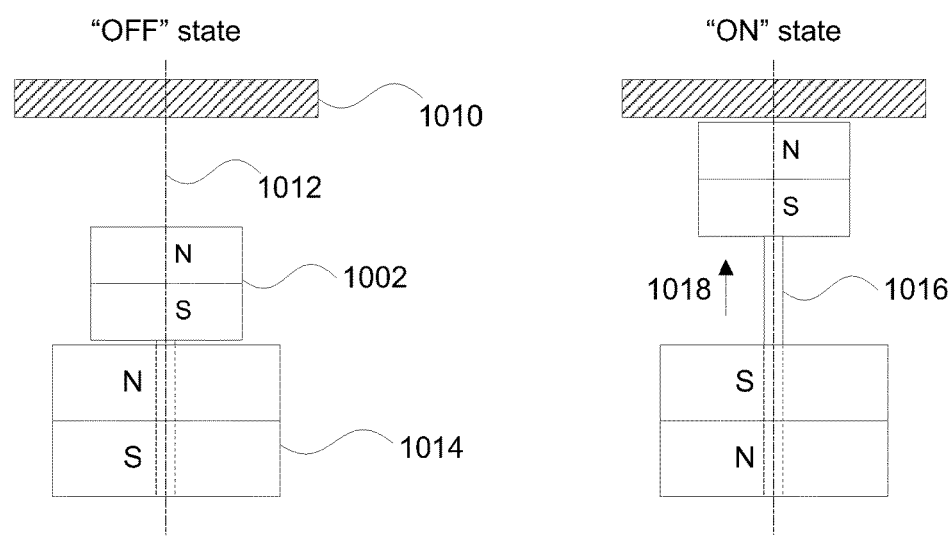
FIG. 10B
FIG. 10C

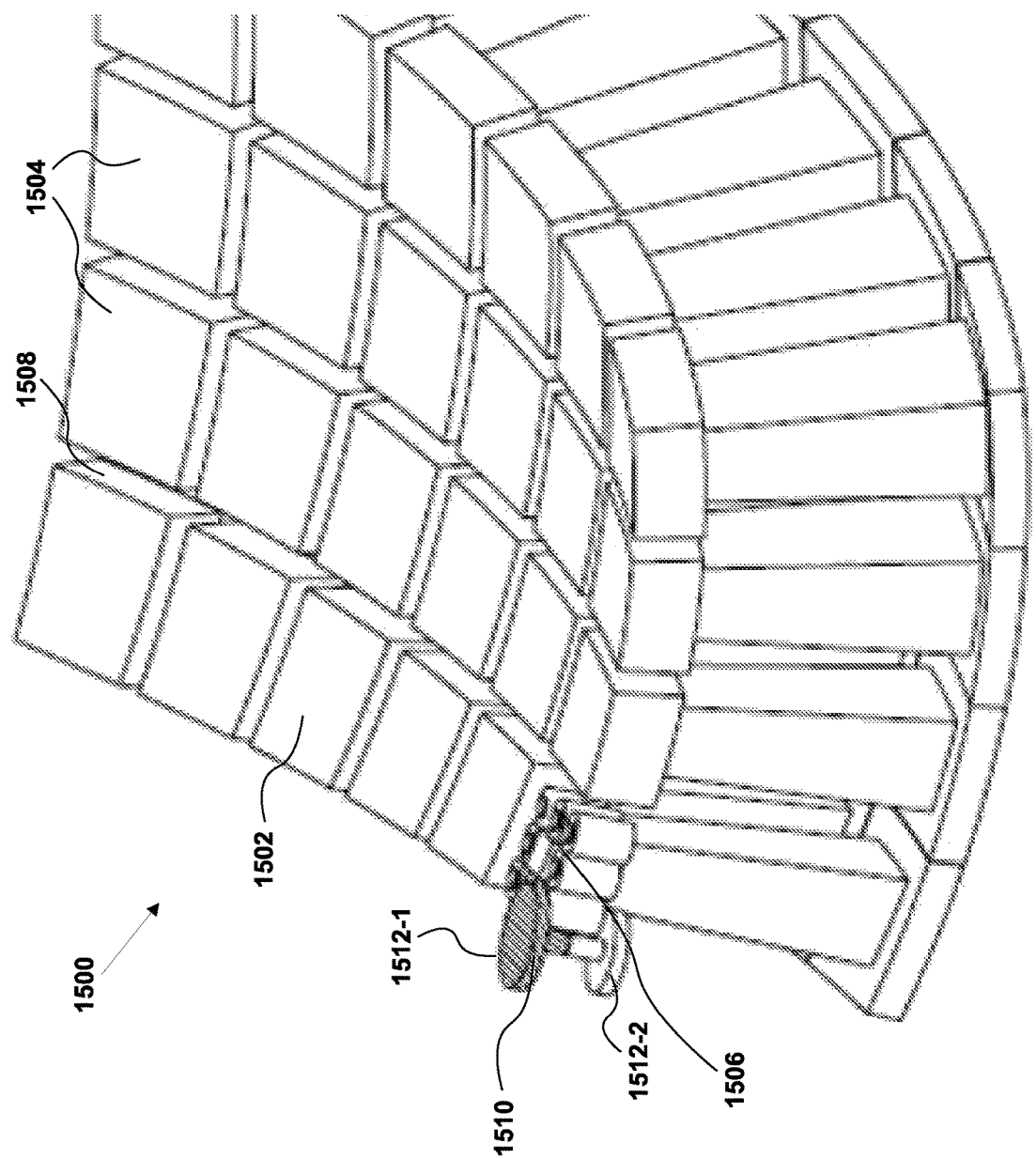

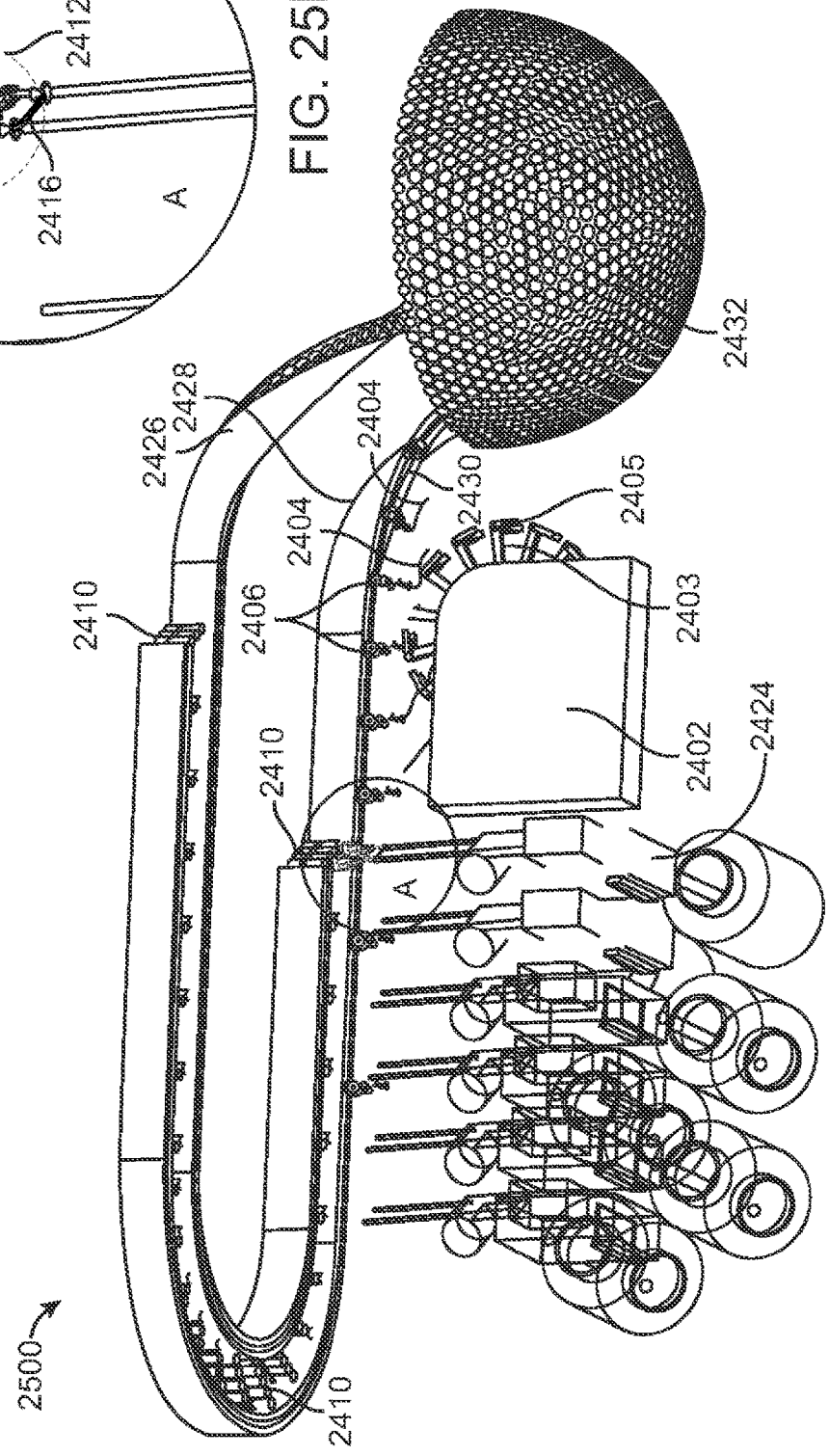
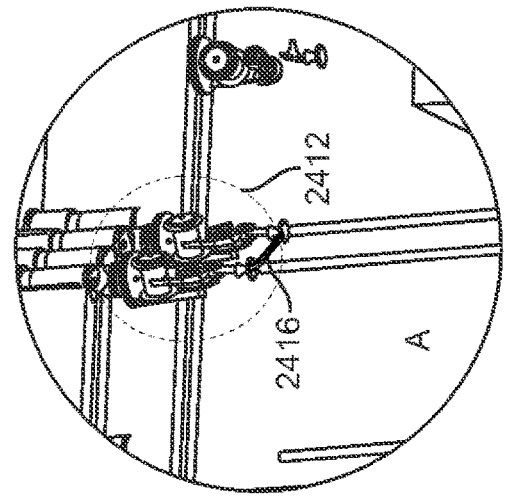

APPARATUS AND METHODS FOR MATERIAL MANIPULATION

CROSS-REFERENCE

This application is a continuation application of U.S. application Ser. No. 16/845,410 filed on Apr. 10, 2020 and issued as U.S. Pat. No. 11,008,683, which application is a continuation application of U.S. application Ser. No. 16/517,249 filed on Jul. 19, 2019 and issued as U.S. Pat. No. 10,640,897, which application is a continuation application of U.S. application Ser. No. 16/197,256 filed on Nov. 20, 2018 and issued as U.S. Pat. No. 10,378,132, which application is a continuation application of International Application No. PCT/US2017/067038 filed on Dec. 18, 2017, which application claims priority to U.S. Provisional Patent Application No. 62/437,910 filed on Dec. 22, 2016, which applications are entirely incorporated herein by reference for all purposes.

BACKGROUND

Mechanical systems have long been used for material manipulation and transport. As an example, mechanical systems can be used to generate simple two-dimensional ("2D") braided preforms such as rope and sleeve constructions. However, these systems are not easily configurable and often suffer from poor adaptability. In particular, existing mechanical systems may be unable to meet some of the challenges and requirements associated with three-dimensional ("3D") braiding. In 3D braiding, fiber is routed through complex paths using moving carriers, in order to capitalize on the specific strength of the fiber in certain directions.

Complex mechanical systems may enable a higher degree of carrier path adaptability, and can be used for 3D braiding. However, such systems are difficult to implement due to limitations in scale, as well as the dimensional complexity of parts that need to be manufactured. For example, challenges arise in manufacturing parts that can hold, move and pass carriers in a precise manner through a variety of complex paths.

In some cases, a greater degree of carrier path adaptability may be attainable by replacing a mechanical system with an electromagnetic system. However, existing electromagnetic systems have shortcomings, such as an inability to maintain line tension during motion of a carrier, which can increase the risk of carrier ejection or misalignment. This renders existing electromagnetic systems unsuitable for 3D braiding applications that require proper line tension or precise alignment. From the above, it is seen that an improved apparatus and method for enabling a high degree of carrier path adaptability is desired.

SUMMARY

An improved apparatus and method for material manipulation and transport is disclosed. The apparatus may include an electromagnetic actuation system that can move materials or parts around. For example, the apparatus can include a surface with underlying stator coils that generate an electromagnetic field over the surface. The stator coils can be arranged in a 2D planar configuration or a 3D configuration. In some cases, the stator coils may be replaced by movable permanent magnets or switchable permanent magnets. One or more carriers for holding materials or parts can be coupled to the surface of the apparatus. These carriers can be controlled to move on the surface in a variety of complex paths, at different speeds and accelerations, using forces exerted by the electromagnetic field. The apparatus provides a high degree of carrier path adaptability and can be easily configured for different applications. In one example, the apparatus can be used to form complex 3D structures such as 3D braided structures or 3D printed structures. This can be achieved, for example, by using the carriers on the surface to transport and dispense materials in complex motion paths. Examples of materials that can be manipulated by the apparatus include fiber, powder, inks, liquid polymers, or composite materials. In another example, parts can be transported around on the surface of the apparatus in a conveyor-like fashion, and can even be assembled together to form intermediary or finished products. The apparatus may be formed from a number of discrete components that can be easily assembled and disassembled. This permits scaling of the apparatus to meet different manufacturing requirements. For example, the apparatus can be used to manufacture products having a wide range of shapes, sizes, and functionalities.

The apparatus may include a surface on which at least one carrier is configured to move. A magnetic device may be provided in a 3D configuration in the apparatus. The 3D configuration may include a spherical or a polyhedral configuration. The magnetic device may be configured to provide a magnetic field for driving the carrier on the surface. The magnetic device may include stator coils, movable permanent magnets, or switchable permanent magnets. In some cases, a position and/or orientation of one or more components in the magnetic device may be adjustable or movable to alter a state of the magnetic field. In some examples, the magnetic device may include stator coils that have the same or different coil diameters. Optionally, the stator coils may be arranged having different spacings between the coils. Different densities of stator coils may be provided beneath the surface of the apparatus in the 3D configuration.

The surface may comprise a plurality of carrier guides arranged in a grid pattern. The carrier guides may be spaced apart by gaps that define a plurality of tracks. The carrier can be configured to move along the tracks in a translational or rotational manner. The tracks may also permit the carrier to change its direction during motion. In some cases, tracks need not be provided on the surface. For example, a surface may comprise a trackless bearing layer on which one or more carriers can move.

A controller can be configured to activate the magnetic device to provide the magnetic field. The controller can drive the carrier on the surface of the apparatus by modulating the magnetic field. The controller can also drive the carrier on the surface to move in three dimensions, and along predetermined paths. In some cases, the controller can be configured to detect a position and/or motion of the carrier. Optionally, one or more sensors may be configured to detect a position and/or motion of the carrier. Examples of sensors may include magnetic field sensors, optical sensors, and/or inertial sensors.

The carrier may include a magnet that interacts with the magnetic field provided by the magnetic device. The magnet may be a permanent magnet or an electromagnet. The magnet may be configured to interact with the magnetic field, so as to drive the carrier on the surface. The carrier can be driven on the surface to manipulate materials. Examples of materials may include fibers, liquid polymers, powder materials, and/or inks. The materials can be manipulated to form objects having 3D braided structures, 3D printed structures, and/or 3D assembled structures.

The carrier may include a base configured to support one or more devices that are configured to manipulate the materials. The devices may include bobbins, assembly robots, material sprayers, or matrix injectors. The carrier may also include a coupling member that couples the carrier to the surface of the apparatus, such that the carrier is capable of moving on the surface. The carrier may be configured to be driven on the surface, in response to the magnetic field provided by the magnetic device. The carrier can be driven on the surface in three dimensions, and can move on the surface in a translational or rotational manner.

It shall be understood that different aspects of the disclosure can be appreciated individually, collectively, or in combination with each other. Various aspects of the disclosure described herein may be applied to any of the particular applications set forth below or for any other types of systems and methods for manipulating materials to form 3D structures, or for transportation or assembly of components.

Other objects and features of the present disclosure will become apparent by a review of the specification, claims, and appended figures.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 3A-1, 3A-2, 3B-1, 3B-2, 3C-1, 3C-2, 3D, and 3E illustrate movement of a carrier on a surface having a hexagonal grid;

FIGS. 4A-1, 4A-2, 4B-1, 4B-2, 4C-1, 4C-2, 4D, and 4E illustrate the movement of a carrier on a surface having a square grid;

FIGS. 5A-1, 5A-2, 5B-1, 5B-2, 5C-1, 5C-2, and 5D illustrate the movement of a carrier on a surface having a square grid;

FIGS. 8A, 8B, 8C, 8D, 8E-1, 8E-2, 8E-3, and 8F illustrate a hexagonal unit array of carrier guides;

FIGS. 10A, 10B, and 10C illustrate an example of an array of reciprocating permanent magnets;

FIG. 15 illustrates a curved surface having a square grid pattern;

FIGS. 24, 25A, and 25B illustrate carrier loading systems in accordance with some embodiments.

DETAILED DESCRIPTION

Figure 1:
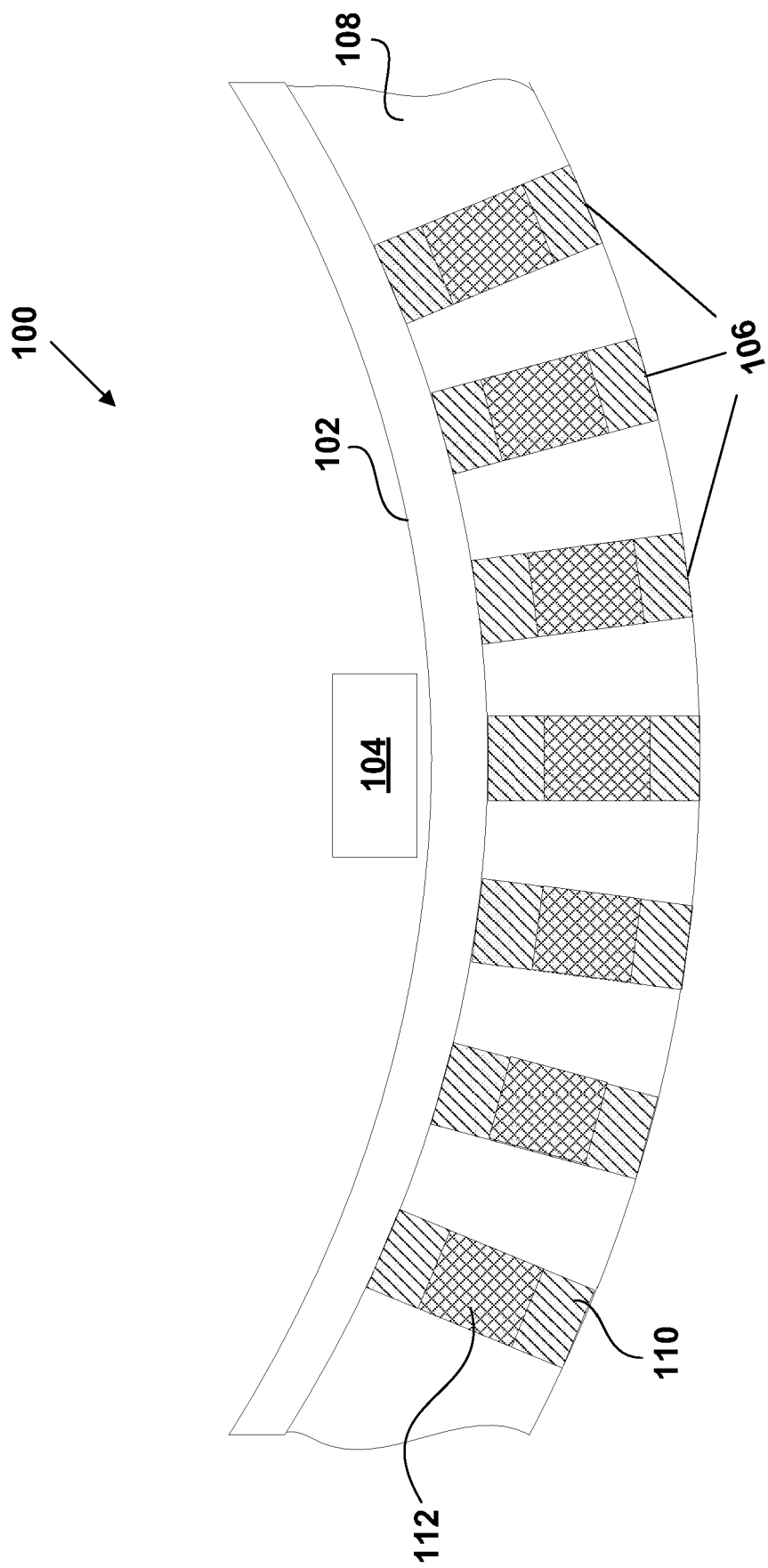
FIG. 1 illustrates a schematic cross-section of an apparatus having a surface on which a carrier can move.

Reference will now be made in detail to exemplary embodiments of the disclosure, examples of which are illustrated in the accompanying drawings. Wherever possible, the same reference numbers will be used throughout the drawings and disclosure to refer to the same or like parts.

The following is an overview of the contents in this disclosure:
   I. General
   II. Actuation Principle
   III. Traveling Surface
      A. Hexagonal Grid
      B. Orthogonal Grid
      C. Polar Grid
   IV. Examples of 3D Traveling Surfaces
      A. Guided Surface
      B. Unguided Surface
   V. Control Systems
   VI. 3D Manipulation of Materials
      A. 3D Braiding
      B. 3D Printing
      C. Transportation and Assembly of Components

I. General

The present disclosure provides apparatus and methods for enabling transportation of a carrier upon which a variety of articles can be placed. The carrier can be transported to any number of predetermined positions on a 3D surface within the apparatus. Materials, parts, or manufactured articles can be transported on the carrier, as can braider bobbins supplying yarn to be braided into braided structures in a braiding machine. Examples of materials may include fibers, liquid polymers, powder materials, or inks. Although the apparatus is described herein primarily with regard to braiding, it is readily apparent that the apparatus may also be used for printing or layered deposition of materials, conveyance, or components assembly. Other uses of the apparatus will be apparent to those of ordinary skill in the art.

The apparatus and methods described herein can be used to enable 3D braiding and 3D printing. 3D manufacturing technologies have received much attention in recent years, and can simplify and streamline manufacturing processes. For example, 3D printing can make a manufacturing process more efficient and cost-effective, by eliminating 2D planar processing (such as cutting and stacking together multiple 2D layers) which can be labor-intensive. 3D manufacturing technologies can also be used to produce more complex and more reliable products, by manipulating materials via complex paths or patterns to leverage desirable material properties (for example, excellent tensile strengths in certain directions). As an example, 3D braided preforms can provide unique structural features and performance characteristics to composites. Such desirable characteristics may include delamination suppression, improved damage tolerance, impact resistance, fatigue life, improved torsional resistance, improved bolt bearing strength, improved pull-off strength, etc.

It is recognized that in the field of braiding, the technical complexities of 3D braiding methods and machines are much higher than those of 2D braiding. For example, it can be challenging and expensive to machine a large number of metallic parts to a complex shape, that fit perfectly in an assembly, and that are capable of moving smoothly in a continuous braiding operation to form a 3D braided structure.

To improve manufacturability, the apparatus described herein employs a stator coil array with no or few moving parts. The stator coil array is capable of generating an electromagnetic field to move carriers along various paths, for example to form 3D structures. The number of mechanical moving parts in the above apparatus can be significantly reduced by using the stator coil array, as compared to using conventional gearing mechanisms. Accordingly, the scalability and operation of the apparatus can be significantly improved.

The stator coil array can be arranged in a 3D configuration, and may be integrated into a bedplate. The bedplate may include a surface on which a carrier is coupled to. The carrier can be configured to move on the surface. For example, the carrier may carry a magnet, which provides a driving force to move the carrier under the influence of an electromagnetic field generated by the stator coil array. A high degree of carrier path adaptability can be achieved by selectively activating (powering on/off) individuals coils within the stator coil array. The high degree of carrier path adaptability allows carriers to be moved along various complex paths with a high level of precision. Accordingly, the apparatus can be easily configured for different applications, and to meet different manufacturing requirements and product types.

The arrangement of the stator coil array may also permit a user easy access to the coils. This may be useful in some instances, for example when a coil in the array needs to be replaced or repaired. In contrast, conventional gearing systems generally have a large number of moving parts coupled together in a serial manner, which makes it cumbersome for a user to access. The integration of the stator coil array into the bedplate permits the form factor of the apparatus to be reduced, making it relatively compact.

FIG. 1 illustrates an apparatus 100 shown in cross-section. The apparatus may comprise a surface 102 on which a carrier 104 is configured to move. The surface also provides a rigid support for the carrier. Essentially, any conceivable material may be employed in forming the surface. The surface may be made of metals, plastics, composites, glass, organic materials, inorganic materials, or a combination of any of these, existing as plates, sheets, pads, slices, films, slides, bearing layers, etc. The surface may have any convenient shape, such as a curved shape, spherical, hemispherical, square, circle, cuboid, trapezoidal, disc, etc. The surface may be smooth, or may take on a variety of alternative surface configurations. For example, in some cases, the surface may contain raised or depressed regions. Tracks can be formed on the surface, as described in detail later in the specification. By way of example, the tracks may include grooves, trenches, mesa structures, or the like. The carrier can be configured to move along the tracks on the surface. The surface may comprise a number of discrete pieces arranged together leaving gaps therebetween to form the tracks. Alternatively, the tracks may be machined or etched onto the surface using well-known techniques to provide for desired surface features. For example, machining processes such as milling, laser cutting, water jets, etc. can be employed in the formation of the tracks on the surface.

A stator coil array 106 may be provided beneath the surface of the apparatus. The stator coil array may be disposed on a bedplate 108 of the apparatus. In some cases, the stator coil array may be embedded within the bedplate. The bedplate may be part of a frame of the apparatus. The bedplate may provide a surface for a carrier to move on. Alternatively, the surface (on which the carrier moves) may be provided via as a separate layer over the bedplate. The stator coil array may be composed of ferromagnetic materials, such as magnetically conductive iron, iron alloys, or the like. The stator coil array may comprise a plurality of stator coils. Each stator coil may comprise a core 110 which is a magnetically conductive body. Enclosed or wrapped around each core is a coil 112. The coil may also be shaped to conform to the core. In some cases, the coil may be tubular. Alternatively, the coil need not be cylindrical or tubular. The stator coil array is comprised by extending the stator units along the bedplate in three dimensions underneath the surface. Each coil may function independently from other coils via a controller (not shown in FIG. 1) which magnetizes or demagnetizes each of the coils. Different coils can be selectively magnetized or demagnetized using the controller. Passing a current through a coil in one direction causes the stator unit to generate an electromagnetic field having a first polarity (e.g., north N). The polarity can be switched by reversing the current to flow in the opposite direction. For example, passing the current through the coil in the opposite direction causes the electromagnetic field to change to a second polarity (e.g., south S), that is opposite to the first polarity.

The stator coil array may be provided in a regular pattern or an irregular pattern. Examples of patterns may include square, circle, polygonal such as hexagonal, etc. The stator units can be spaced apart from one another at a fixed pitch or at a variable pitch. Different densities of stator units may be provided in different sections of the apparatus. For example, a portion of the surface may have a higher density of underlying stator units, whereas another portion of the surface may have a lower density of underlying stator units.

A carrier can be configured to travel along the surface of the apparatus above the stator coil array. The carrier may be coupled to the surface but permitted to move on the surface. Alternatively, the carrier can be detachably coupled to the surface. The actuation of the carrier on the surface is next described with reference to FIG. 2.

II. Actuation Principle

Figure 2A:
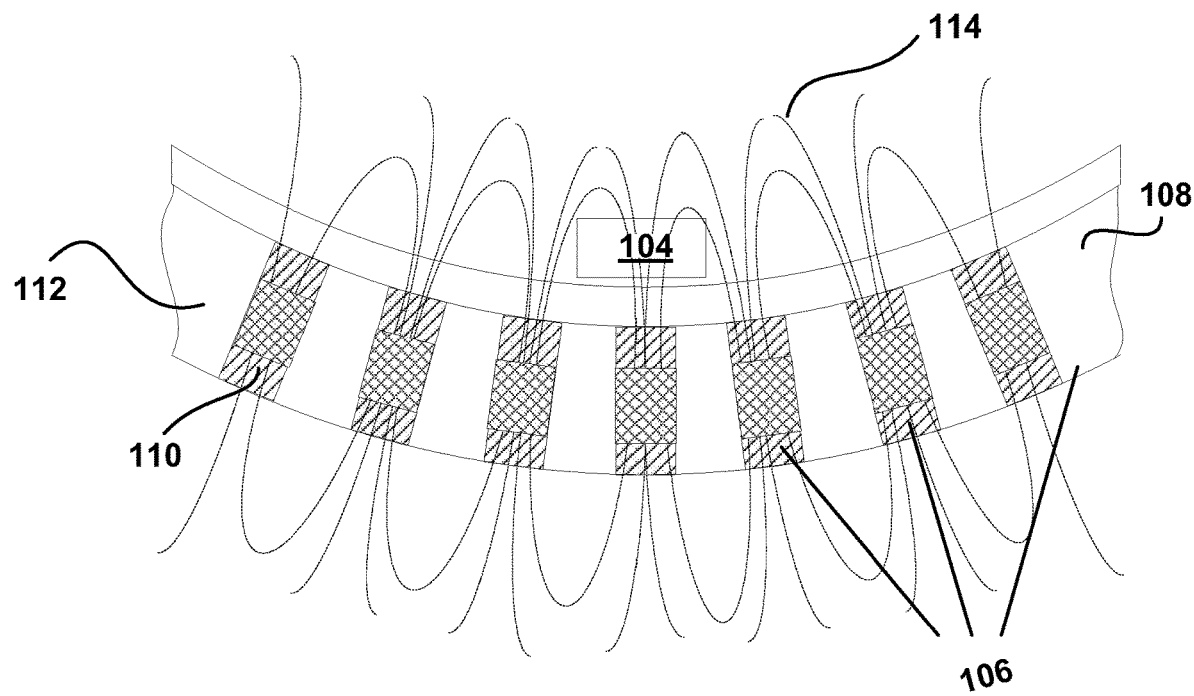
FIGS. 2A and 2B illustrate the movement of a carrier on a surface of an apparatus under the influence of an electromagnetic field.

The stator coil array can generate an electromagnetic field to drive the carrier along the surface. Referring to FIG. 2A, the coils in the stator coil array are energized by sending currents through the coils, thereby generating an electromagnetic field having the flux lines 114 as shown. The flux lines extend longitudinally through the cores of the stator coils and intersect with one another. Essentially, the electromagnetic field is formed over the surface of the apparatus.

The carrier may include a magnet disposed thereon. The magnet may be attached onto the carrier, or may be formed as part of the carrier. The magnet may be a permanent magnet. A driving force is generated when the magnet is in proximity to the electromagnetic field. The driving force is generated by the interaction of the magnet's own magnetic field with the stator coil array's electromagnetic field. The driving force can include attractive forces, repulsive forces, or a combination of attractive and repulsive forces. Attractive forces are generated between opposite polarities (e.g., N-S or S-N), while repulsive forces are generated between like polarities (e.g., N-N or S-S). As an example, a north pole of the magnet on the carrier would be attracted to a section of the electromagnetic field having an S-polarity. This attractive force can cause the magnet-carrier to move towards the S-polarity section of the electromagnetic field. Conversely, the north pole of the magnet would be repelled by another section of the electromagnetic field having an N-polarity. This repulsive force can cause the magnet/carrier to move away from the N-polarity section of the electromagnetic field. In some cases, a combination of attractive and repulsive forces can be applied to hold the carrier at a particular spot on the surface, to counter the effect of gravitational forces acting on the carrier.

The driving force on the carrier can be controlled by adjusting the currents delivered to the stator coil array. For example, increasing the magnitude of the currents can increase the strength of the driving force in a corresponding manner. Increasing the driving force can cause the carrier to move faster, such as increased speed and/or acceleration. In a similar fashion, decreasing the magnitude of the currents can lower the strength of the driving force. Lowering the driving force can cause the carrier to move slower, such as decreased speed and/or deceleration. The driving force can also be modified by using magnets of different strengths on the carrier.

The direction of the driving force can be altered by reversing the flow of currents to individual stator units. This can result in switching of polarities within the electromagnetic field. The switching of polarities can cause the carrier to move in an opposite direction. Alternatively, it can provide a braking force to decelerate the carrier's motion. Accordingly, a range of motion characteristics (different speeds, accelerations, decelerations) are attainable by the carrier, by controlling the strengths and polarities of the electromagnetic field over the surface of the apparatus.

Figure 2B:
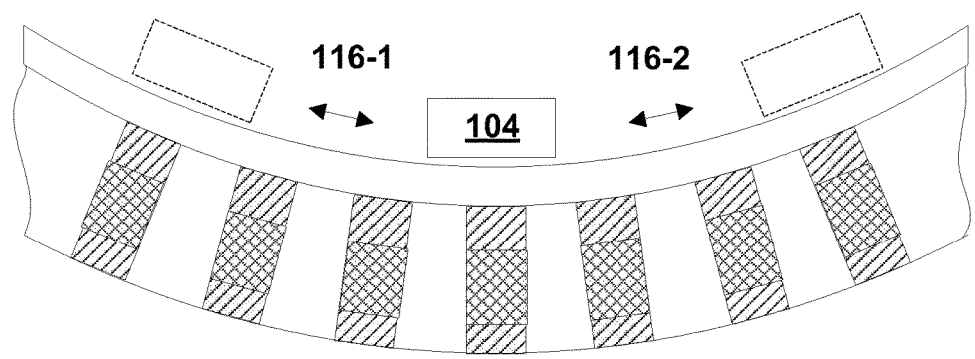

The carrier can be driven in a translational, rotational, or curvilinear manner on the surface. The carrier can also be driven to move in different directions on the surface. For example, the electromagnetic field of FIG. 2A can be controlled to drive the carrier in a first direction 116-1 or a second direction 116-2, as shown in FIG. 2B. The directions can be parallel, orthogonal, opposite, or oblique to one another. The carrier can be driven out-of-plane in three dimensions on the surface. Alternatively, the carrier can be driven in-plane in two dimensions on a planar surface. The carrier can be driven from one point to another point on the surface. In some examples, the carrier can be controlled to move along a predefined motion path. The path may be a closed loop or an open-end loop. In some cases, a plurality of carriers can be controlled to move on the surface along a series of motion paths that intersect with one another at different points in time. This can be useful, for example, in 3D braiding applications in which yarn or fiber is braided in complex 3D patterns.

The carrier can be configured to carry or dispense materials such as fibers, liquid polymers, powder materials, and/or inks, either directly or using a device attached to the carrier. As described later in the specification, one or more carriers can be driven on the surface to manipulate materials to form objects, such as 3D braided structures or 3D printed structures.

III. Traveling Surface

A. Hexagonal Grid

Figures 1, 3A:
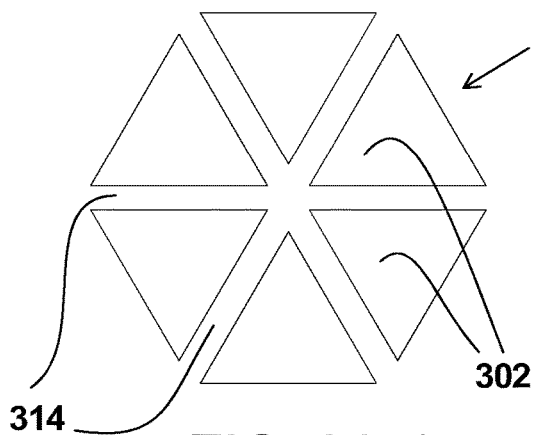

As previously described, tracks can be formed on the surface of the apparatus, to provide pathways for a carrier. In some cases, the surface may be composed of a plurality of carrier guides adjacently spaced apart from one another by gaps that form the tracks. The carrier guides may be formed having any shape and/or size, and may be arranged in a grid pattern. For example, FIG. 3A-1 shows a plurality of triangular-shaped carrier guides 302 arranged in a hexagonal pattern. Since a minimum of six triangular-shaped carrier guides of the same size are needed to form the hexagonal pattern, FIG. 3A-1 therefore shows a unit hexagonal array 304 of carrier guides. Tracks 314 are provided by the gaps between adjacently-spaced carrier guides. The tracks may be disposed at a 60 degree angle relative to each other due to the hexagonal arrangement of carrier guides.

Figures 2, 3A:
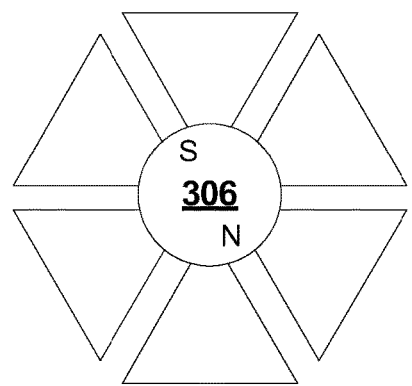

A carrier may be located anywhere on the tracks, and can be configured to move along the tracks. For example, FIG. 3A-2 shows a carrier 306 located at the center of the unit hexagonal array. The carrier may comprise a magnet disposed thereon having a North (N) pole and a South (S) pole. The poles may be located anywhere on the carrier depending on the spatial position and structure/type of magnet. As an example, the poles may be located at opposite ends of the carrier as shown in FIG. 3A-2, although the invention is not limited thereto.

Figures 1, 3B:
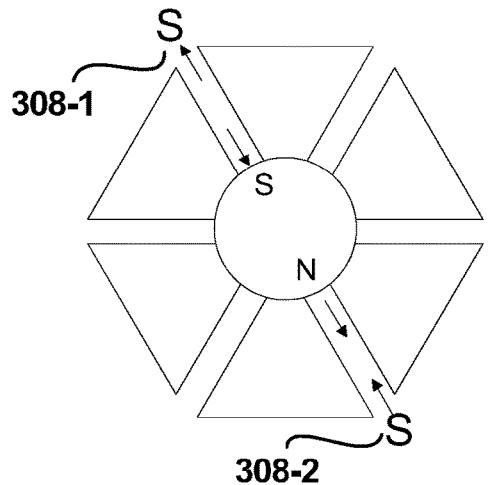
Figures 2, 3B:
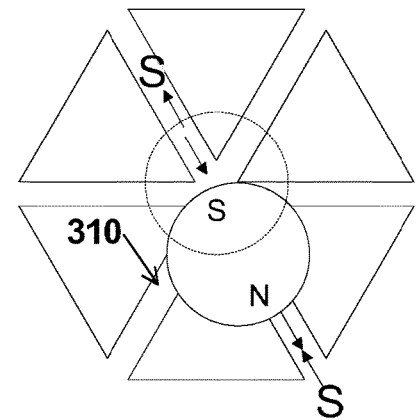

The carrier guides and the carrier may be located above a stator coil array, e.g. the stator coil array 106 shown in FIG. 1. Electromagnetic fields of different polarities can be generated by the stator coil array. For example, as shown in FIG. 3B-1, an S-polarity field is generated at location 308-1, and another S-polarity field is generated at location 308-2. The interaction between the S-polarity field at 308-1 and the S pole of the magnet generates a repulsive force that pushes the carrier away from location 308-1. Conversely, the interaction between the S-polarity field at 308-2 and the N pole of the magnet generates an attractive force that pulls the carrier towards location 308-2. The attractive and repulsive forces collectively provide a driving force that moves the carrier in the direction 310 shown in FIG. 3B-2, to translate by a distance along the track. Accordingly, driving forces can be generated in a plurality of different directions along the tracks, by modulating the polarities of the electromagnetic fields at different locations on the surface of the apparatus. The amount of distance traveled by the carrier, point-to-point travel, speed, acceleration, deceleration, and other motion characteristics of the carrier can be controlled by adjusting various aspects of the electromagnetic fields, such as strengths, polarities, locations, and directions of the electromagnetic fields.

Figures 1, 3C:
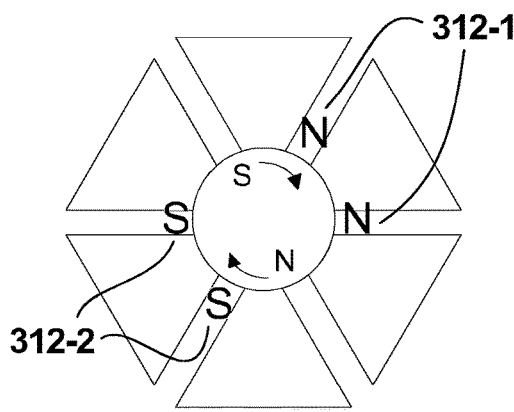
Figures 2, 3C:
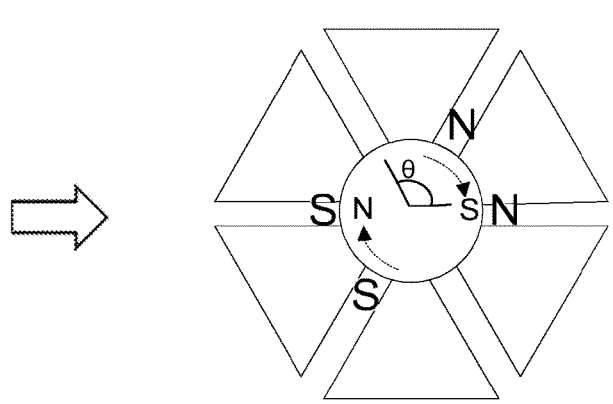

In addition to translation, a carrier may also be configured to rotate. For example, as shown in FIG. 3C-1, N-polarity fields may be generated at locations 312-1, and S-polarity fields may be generated at locations 312-2. The interaction between the S-polarity fields at 312-2 and the S pole of the magnet, and between the N-polarity fields at 312-1 and the N pole of the magnet, generate a repulsive force. Conversely, the interaction between the S-polarity fields at 312-2 and the N pole of the magnet, and between the N-polarity fields at 312-1 and the S pole of the magnet, generate an attractive force. The attractive and repulsive forces collectively provide a driving force that rotates the carrier in the clockwise direction shown in FIG. 3C-2, by an angle θ of 120 degrees. In the unit hexagonal array, an angle of 120 degree may correspond to two track spacings.

Figure 3D:
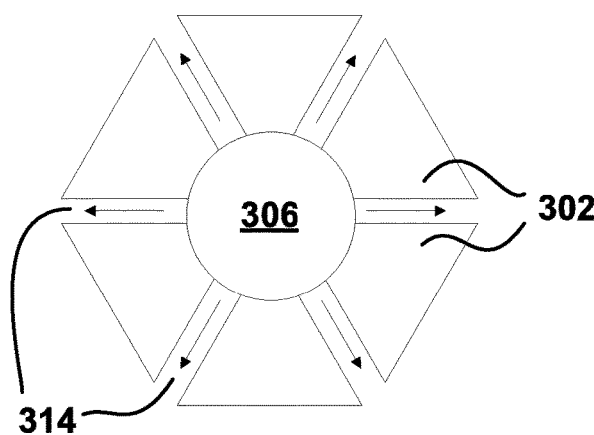

FIG. 3D shows a carrier 306 that is capable of moving along any of the plurality of tracks 314 in the unit hexagonal array. The tracks may be disposed at a 60 degree angle relative to each other. Accordingly, the carrier can be configured to move at a 60, 120, 180, 240, 300, or 360 degree angle along the respective tracks.

Figure 3E:
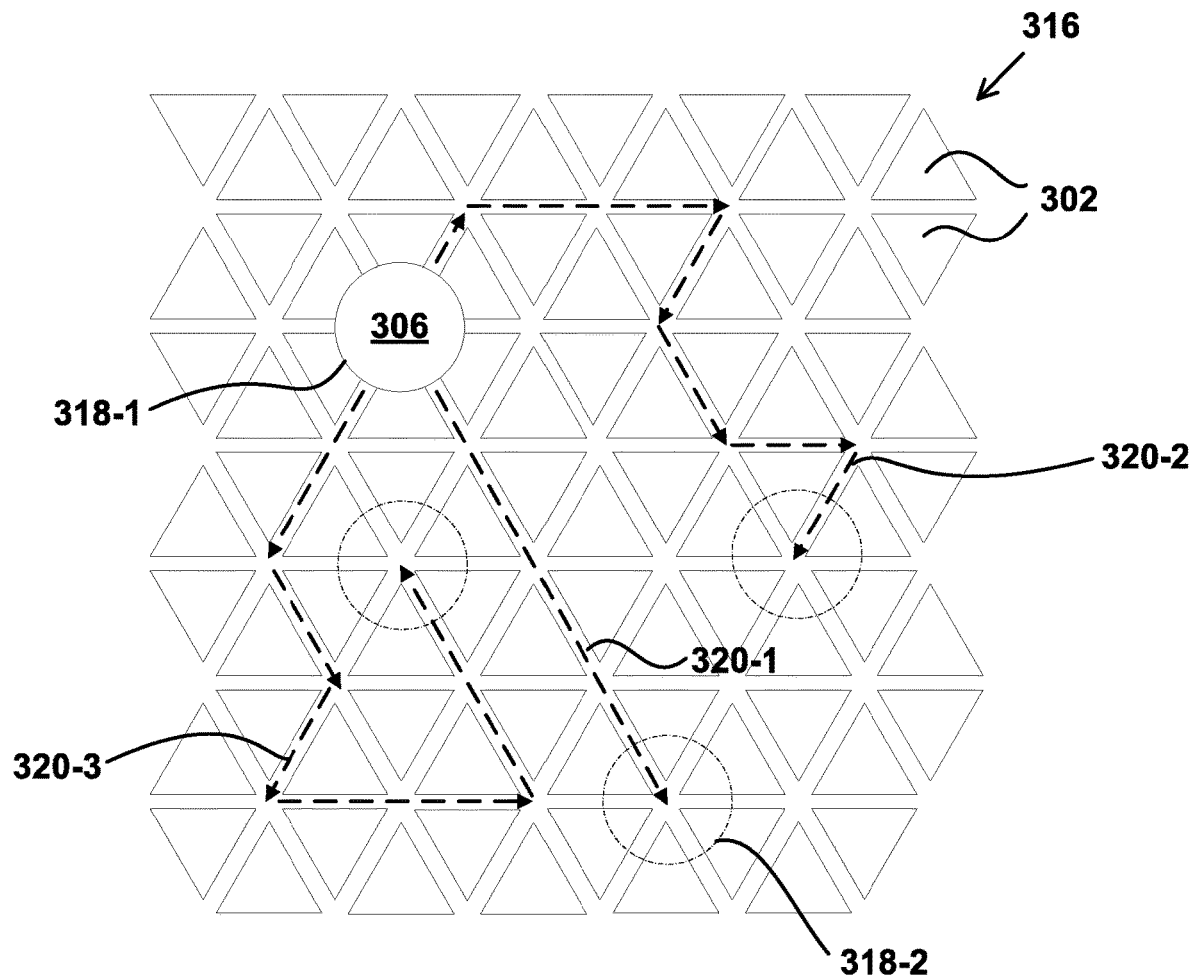

FIG. 3E shows a surface 316 having a hexagonal pattern of carrier guides 302. The surface may be comprised of a plurality of unit hexagonal arrays. A carrier 306 may be configured to move on the surface in different motion paths. For example, the carrier may move in a straight path 320-1 from location 318-1 to location 318-2. Alternatively, the carrier may move in a non-linear path, for example in a zig-zag manner as shown by paths 320-2 and 320-3. At the center of each hexagonal unit array (or intersection of tracks), the carrier can switch direction in multiples of 60 degree angle (e.g., at 60 degree, 120, 180, 240, 300, or 360 degrees). The hexagonal arrangement of the carrier guides allows the carrier to move in different complex motion paths on the surface, thus providing higher carrier path adaptability.

B. Orthogonal Grid

Figures 1, 4A:
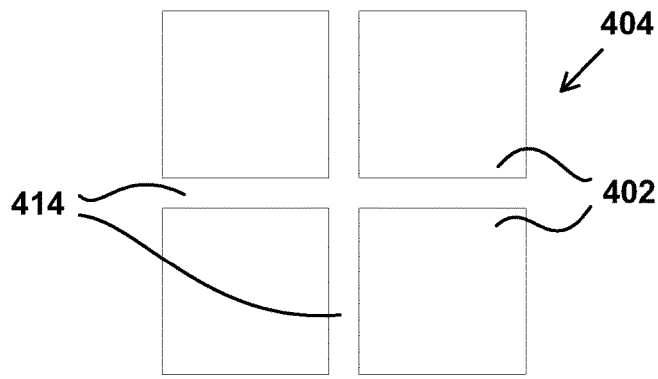
Figures 2, 4A:
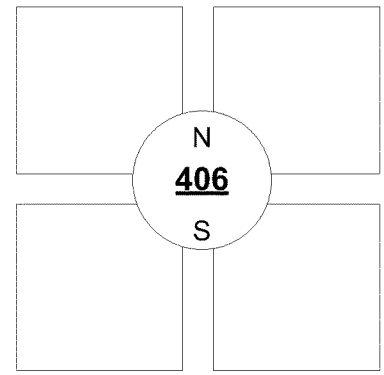

The carrier guides can have other shapes besides triangular shape. A change in the shape of the carrier guides may result in a change in the grid pattern. For example, FIG. 4A-1 shows a plurality of square-shaped carrier guides 402 arranged in a square pattern. Since a minimum of four square-shaped carrier guides of the same size are needed to form the square pattern, FIG. 4A-1 therefore shows a unit square array 404 of carrier guides. Tracks 414 are provided by the gaps between adjacently-spaced carrier guides. In contrast to the hexagonal arrangement in FIG. 3A-1, the tracks 414 in FIG. 4A-1 may be disposed at a 90 degree angle relative to each other due to the square arrangement of carrier guides.

Similarly, a carrier may be located anywhere on the tracks, and can be configured to move along the tracks. For example, FIG. 4A-2 shows a carrier 406 located at the center of the unit square array. The carrier may comprise a magnet disposed thereon having a North (N) pole and a South (S) pole, as previously described.

Figures 1, 4B:
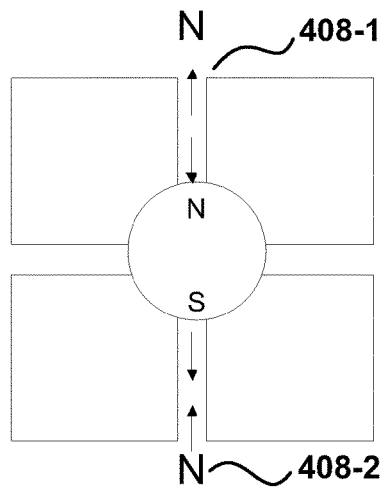
Figures 2, 4B:
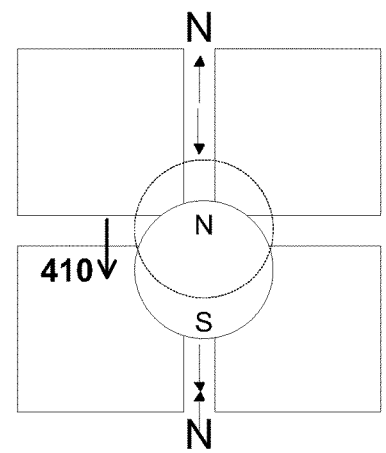

The carrier guides and the carrier may be located above a stator coil array, e.g. the stator coil array 106 shown in FIG. 1. Electromagnetic fields of different polarities can be generated by the stator coil array. For example, as shown in FIG. 4B-1, an N-polarity field is generated at location 408-1, and another N-polarity field is generated at location 408-2. The interaction between the N-polarity field at 408-1 and the N pole of the magnet generates a repulsive force that pushes the carrier away from location 408-1. Conversely, the interaction between the N-polarity field at 408-2 and the S pole of the magnet generates an attractive force that pulls the carrier towards location 408-2. The attractive and repulsive forces collectively provide a driving force that moves the carrier in the direction 410 shown in FIG. 4B-2, to translate by a distance along the tracks. Accordingly, driving forces can be generated in a plurality of different directions along the tracks, by modulating the polarities of the electromagnetic fields at different locations on the surface of the apparatus. The amount of distance traveled by the carrier, point-to-point travel, speed, acceleration, deceleration, and other motion characteristics of the carrier can be controlled by adjusting various aspects of the electromagnetic fields, such as strengths, polarities, locations, and directions of the electromagnetic fields.

Figures 1, 4C:
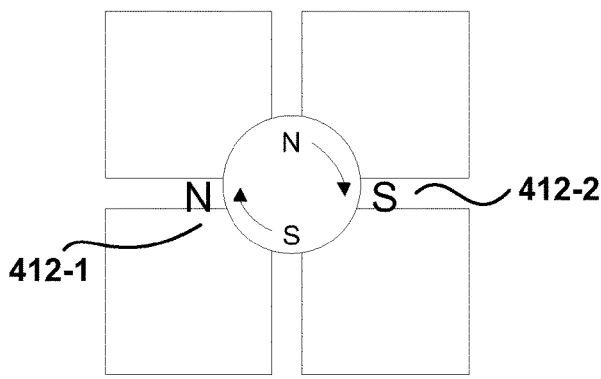
Figures 2, 4C:
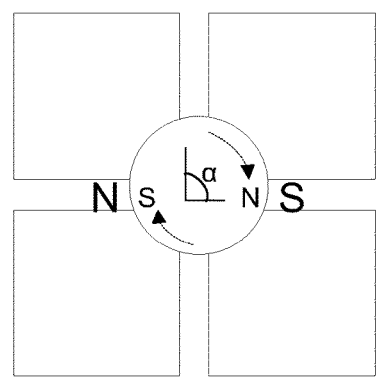

The carrier may also be configured to rotate in the square unit array. For example, as shown in FIG. 4C-1, an N-polarity field may be generated at location 412-1, and an S-polarity field may be generated at location 412-2. The interaction between the S-polarity field at 412-2 and the S pole of the magnet, and between the N-polarity field at 412-1 and the N pole of the magnet, generate a repulsive force. Conversely, the interaction between the S-polarity field at 412-2 and the N pole of the magnet, and between the N-polarity field 412-1 and the S pole of the magnet, generate an attractive force. The attractive and repulsive forces collectively provide a driving force that rotates the carrier in the clockwise direction shown in FIG. 4C-2, by an angle α of 90 degree. In the unit square array, an angle of 90 degree may correspond to one track spacing.

Figure 4D:
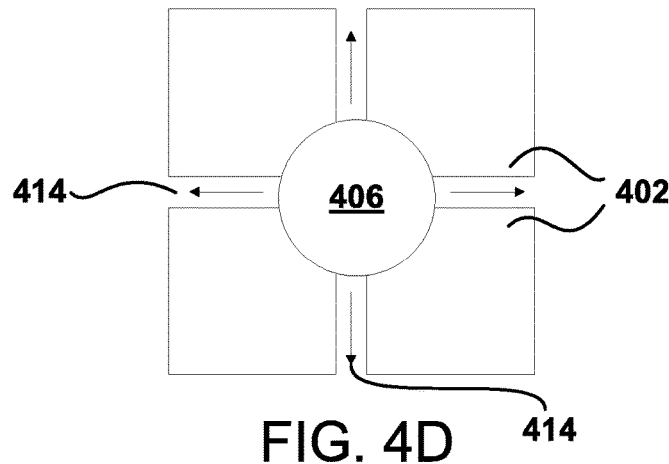

FIG. 4D shows a carrier that is capable of moving along any of the plurality of tracks 414 in the unit square array of carrier guides 402. The tracks may be disposed at a 90 degree angle relative to each other. Accordingly, the carrier can be configured to move at a 90, 180, 270, or 360 degree angle along the respective tracks.

Figure 4E:
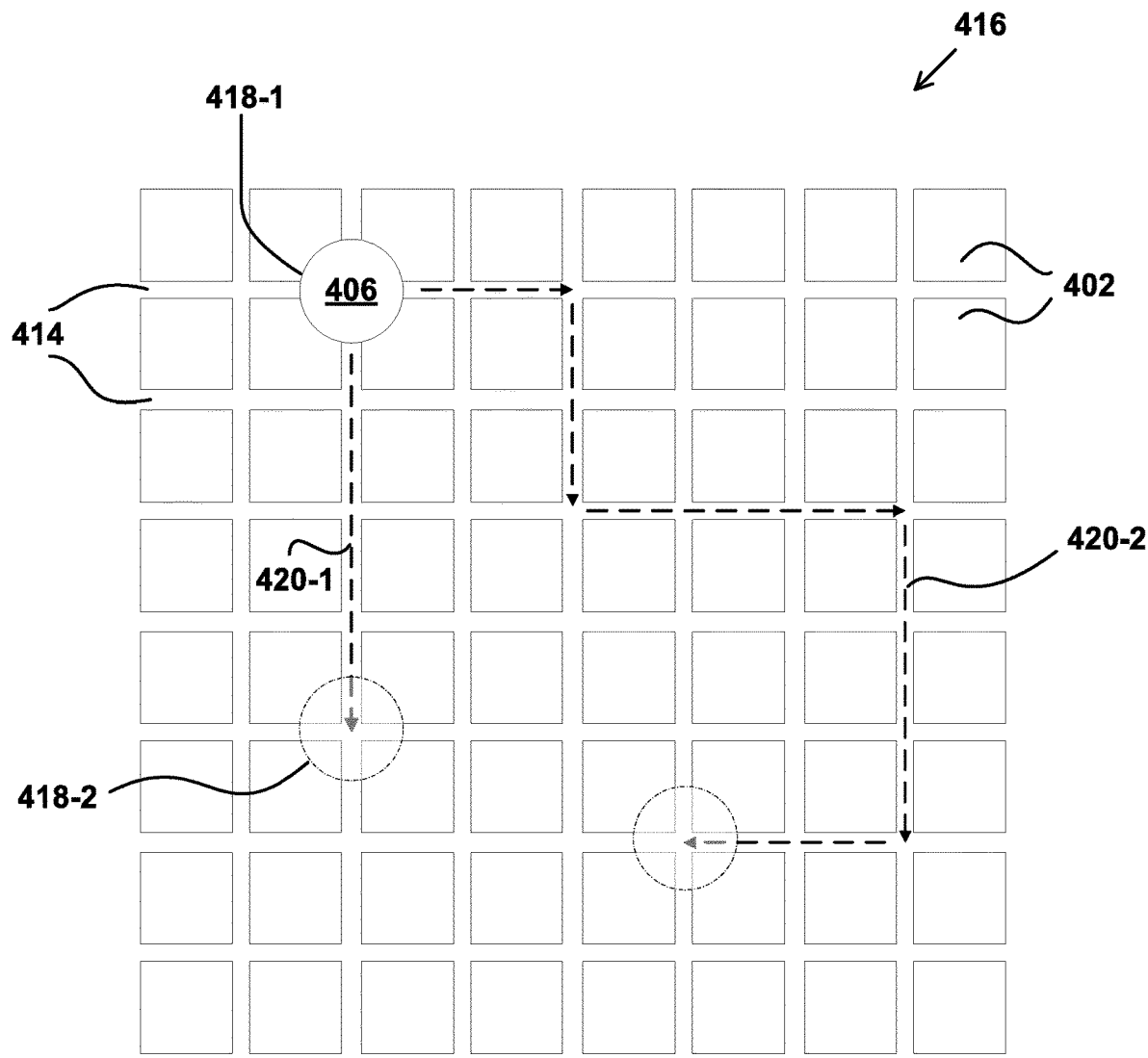

FIG. 4E shows a surface 416 having a square pattern of carrier guides 402. The surface may be comprised of a plurality of unit square arrays. The surface may comprise tracks 414 arranged in rows and columns. A carrier 406 may be configured to move on the surface in different motion paths. For example, the carrier may move in a straight path 420-1 from location 418-1 to location 418-2. Alternatively, the carrier may move in a non-linear path, for example as shown by path 420-2. At the center of each square unit array (or intersection of tracks), the carrier can switch direction in multiples of 90 degree angle (e.g., at 90, 180, 270, or 360 degrees). Thus, the square arrangement of the carrier guides may provide lower carrier path adaptability compared to the hexagonal arrangement.

C. Polar Grid

Figures 1, 5A:
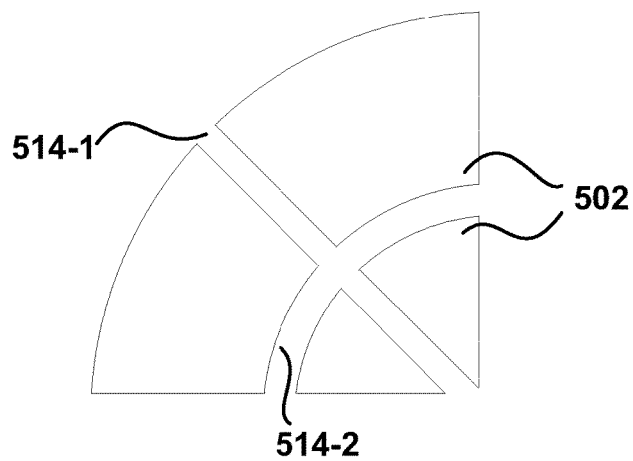
Figures 2, 5A:
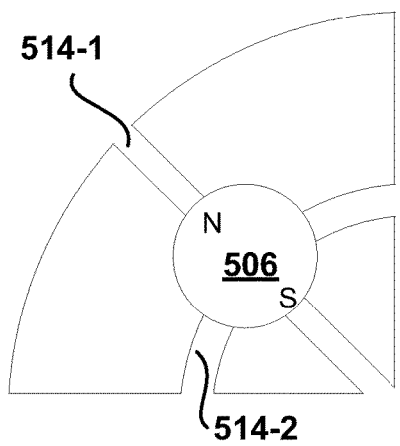

As previously noted, the surface of the apparatus can have different grid patterns. In addition to the above-described hexagonal and orthogonal grids, the surface of the apparatus can be formed having a polar grid. For example, FIG. 5A-1 shows a plurality of carrier guides 502 arranged in a circular concentric pattern. The carrier guides generally may extend radially outward from a common center point (not shown). The carrier guides may have different shapes and sizes. For example, carrier guides located closer to the center point may have smaller sizes compared to carrier guides that are located further away from the center point. Due to the outward radial pattern, the density of carrier guides may decrease as the distance from the center point increases. Tracks 514-1 and 514-2 are provided by the gaps between adjacently-spaced carrier guides. The tracks may form a polar grid that extends radially outward from the center point in concentric circles.

A carrier may be located anywhere on the tracks, and can be configured to move along the tracks. For example, FIG. 5A-2 shows a carrier 506 located at a point where a radial track 514-1 and a circular track 514-2 intersects. The carrier may comprise a magnet disposed thereon having a North (N) pole and a South (S) pole, as previously described.

Figures 1, 5B:
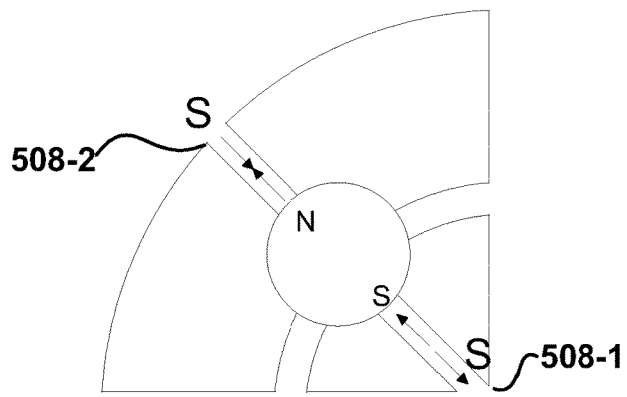
Figures 2, 5B:
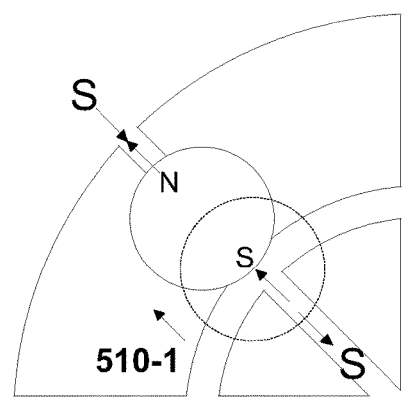

The carrier guides and the carrier may be located above the stator coil array. Electromagnetic fields of different polarities can be generated by the stator coil array. For example, as shown in FIG. 5B-1, an S-polarity field is generated at location 508-1, and another S-polarity field is generated at location 508-2. The interaction between the S-polarity field at 508-1 and the S pole of the magnet generates a repulsive force that pushes the carrier away from location 508-1. Conversely, the interaction between the S-polarity field at 508-2 and the N pole of the magnet generates an attractive force that pulls the carrier towards location 508-2. The attractive and repulsive forces collectively provide a driving force that moves the carrier in the radial direction 510-1 shown in FIG. 5B-2, to translate by a distance along the tracks. Accordingly, driving forces can be generated in a plurality of different directions along the tracks, by modulating the polarities of the electromagnetic fields at different locations on the surface of the apparatus. The amount of distance traveled by the carrier, point-to-point travel, speed, acceleration, deceleration, and other motion characteristics of the carrier can be controlled by adjusting various aspects of the electromagnetic fields, such as strengths, polarities, locations, and directions of the electromagnetic fields.

Figures 1, 5C:
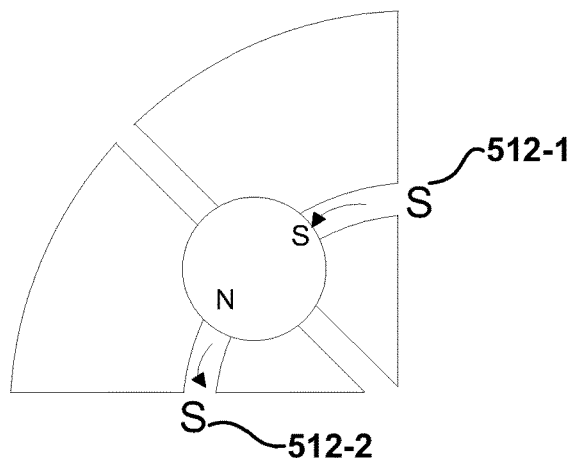
Figures 2, 5C:
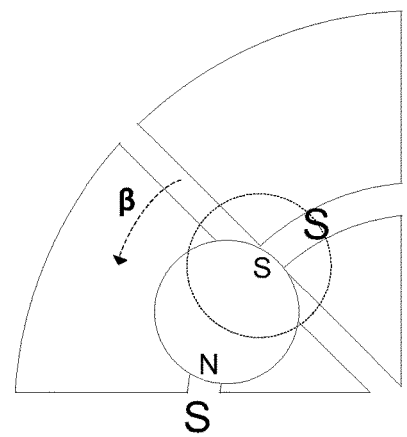

The carrier may also be configured to move in a circular direction along the tracks. For example, as shown in FIG. 5C-1, an S-polarity field is generated at location 512-1, and another S-polarity field is generated at location 512-2. The interaction between the S-polarity field at 512-1 and the S pole of the magnet generates a repulsive force that pushes the carrier away from location 512-1. Conversely, the interaction between the S-polarity field at 512-2 and the N pole of the magnet generates an attractive force that pulls the carrier towards location 512-2. The attractive and repulsive forces collectively provide a driving force that moves the carrier in the arc (circular) direction shown in FIG. 5C-2, to rotate by an angle (3.

Figure 5D:
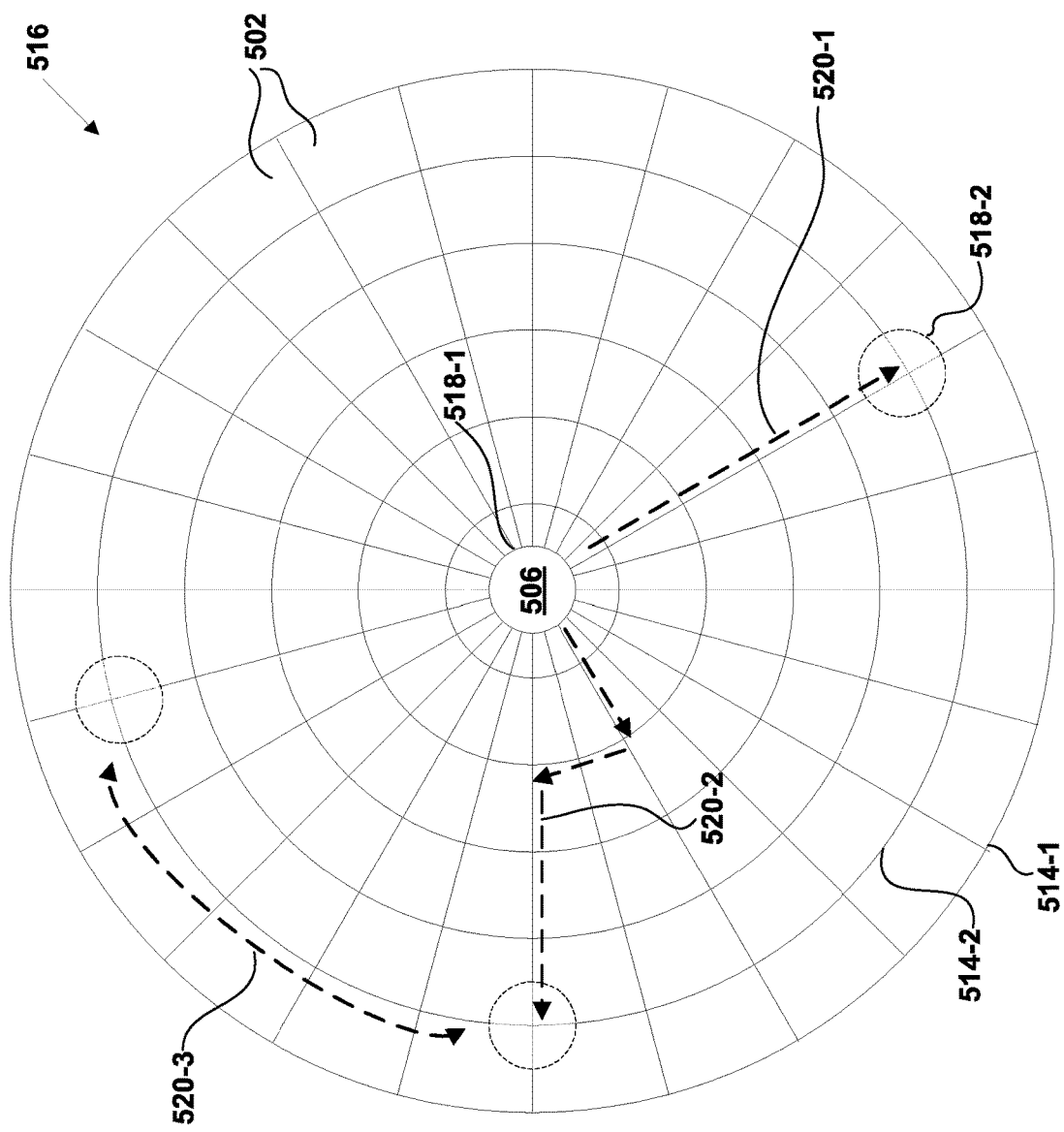

FIG. 5D shows a surface 516 having a polar grid of carrier guides 502. The surface may be comprised of a plurality of carrier guides arranged in a concentric circular pattern. The surface may comprise tracks 514 arranged in radial directions (514-1) and in a concentric manner (514-2). A carrier 506 may be configured to move on the surface in different motion paths. For example, the carrier may move in a straight path 520-1 from location 518-1 to location 518-2. Alternatively, the carrier may move in a non-linear zig-zag path, for example as shown by path 520-2. The carrier may also move in an arc, for example as shown by path 520-3. The carrier can switch directions at the intersections of radial tracks and circular tracks. The polar grid arrangement of carrier guides may be useful, example in producing a 3D braided article having cylindrical shape or features.

IV. Examples of 3D Traveling Surfaces

Figure 6A:
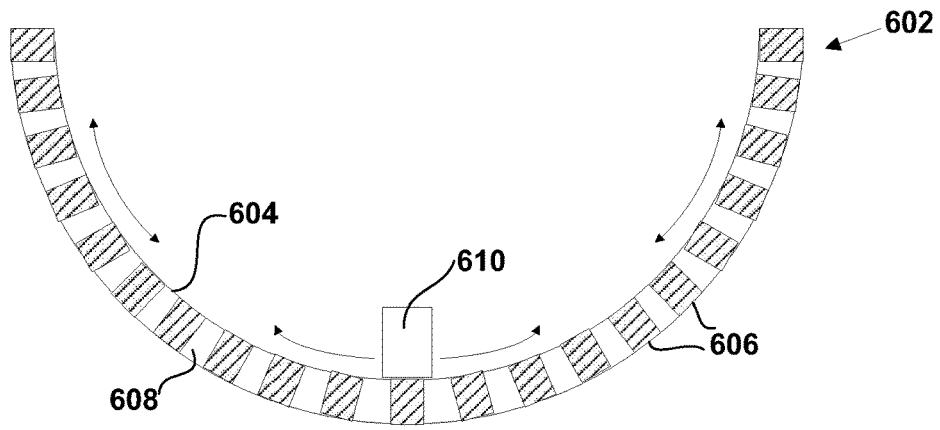
FIGS. 6A through 6C illustrate examples of different shapes of a 3D traveling surface.

The surface of the apparatus disclosed herein can be provided in different shapes, for example curved, spherical, hemispherical, cylindrical, cuboid, trapezoidal, etc. FIG. 6A illustrates an example of an apparatus 602 having a curved surface 604. The surface may be located on an inside of the apparatus, and may be concave. The surface may be an open-faced hemisphere or an open-faced half-cylinder. In some cases, the surface may be located inside a hollow hemisphere or a hollow half-cylinder.

A stator coil array 606 may be located beneath the surface. For example, the stator coil array may be disposed on or embedded within a bedplate 608 of the apparatus. The stator coil array may comprise a plurality of stator coils arranged in a 3D configuration, such that the stator coils substantially conform with the curvature of the surface. The stator coil array is capable of generating an electromagnetic field over the surface. The electromagnetic field can be used to drive a carrier to move on the surface, as described below.

Referring to FIG. 6A, a carrier 610 may be disposed on the surface, and configured to move on the surface. The carrier may be detachably coupled to the surface. The carrier may include a magnet disposed thereon. As previously described, the carrier can be driven to move on the surface using the electromagnetic field generated by the stator coil array. The carrier may be driven in a translational, rotational, or curvilinear manner on the surface. The carrier may also be driven to move in different directions on the surface. The carrier can be configured to move in-plane (2D) or 3D (out-of-plane) on the surface. An object, such as a 3D braiding structure a 3D printed structure, can be formed by driving the carrier on the surface to manipulate various materials, e.g., as fibers, liquid polymers, powder materials, and/or inks.

Figure 6B:
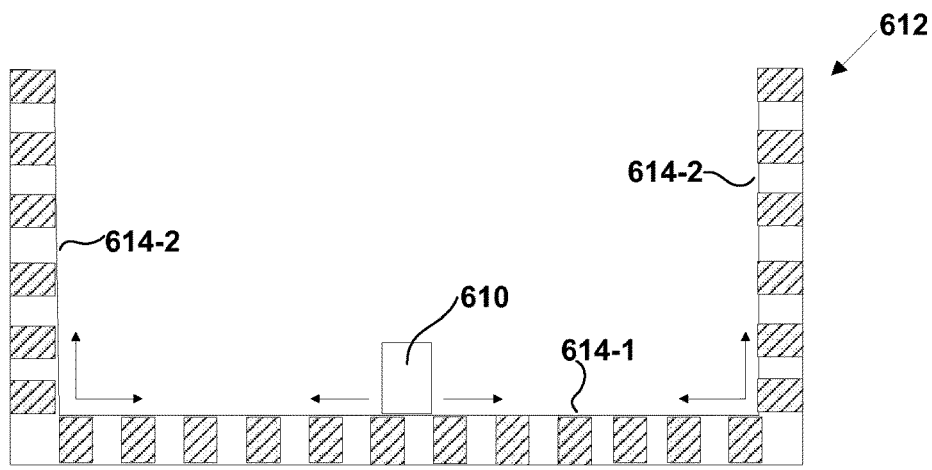

FIG. 6B illustrates an example of an apparatus 612 having a surface. The surface may comprise a plurality of adjoining sub-surfaces 614-1 and 614-2. Two or more of the adjoining sub-surfaces may be orthogonal to one another. For example, sub-surface 614-1 may be orthogonal to sub-surfaces 614-2. The surface may correspond to an internal surface of an open-faced cube or an open-faced cylinder. A carrier 610 can be configured to move in-plane (2D) or 3D (out-of-plane) on the surface in the directions shown in FIG. 6B. For example, the carrier can move in-plane on sub-surface 614-1. Additionally, out-of-plane motion can occur as the carrier traverses orthogonally between sub-surfaces 614-1 and 614-2.

Figure 6C:
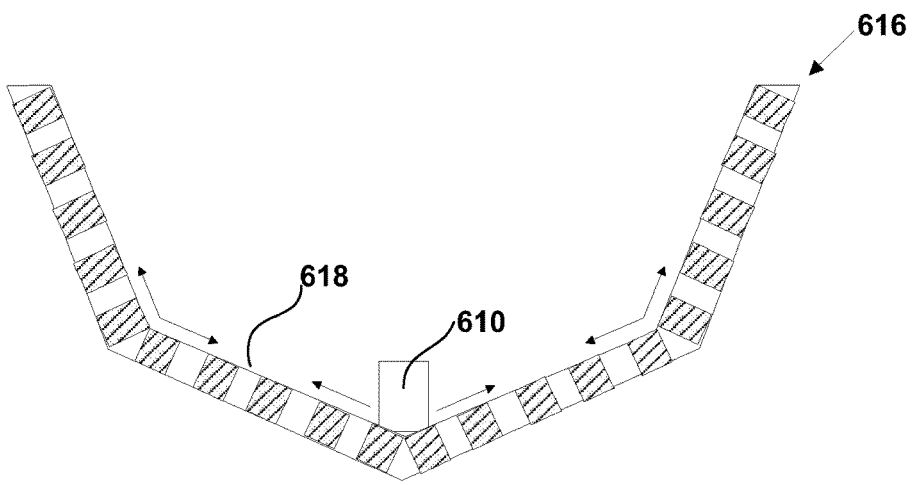

An apparatus may also comprise a polygonal surface, for example as shown by apparatus 616 in FIG. 6C. A surface 618 may comprise a plurality of discrete sub-surfaces such that the surface becomes multi-faceted. In some cases, the surface may be mapped to the faces of a polyhedron. Any number of faces and/or type of polyhedron may be contemplated. A sphericity of the surface generally increases with the number of mapped faces of the polyhedron. For example, the surface may start to approximate a substantially spherical surface when mapped to a polyhedron having a large number of faces (e.g., when mapped to an icosahedron). A carrier 610 can be configured to move in-plane (2D) or 3D (out-of-plane) on the surface in the directions shown in FIG. 6C.

A. Guided Surface

Various grid patterns may be provided on a 3D traveling surface. These grid patterns may include hexagonal (e.g., FIG. 3E), orthogonal (e.g., FIG. 4E), or polar (e.g., FIG. 5D). The grid patterns result in guided surfaces, that permit carriers to be moved (guided) on the surface. The mapping of these grid patterns on a surface of an apparatus is described as follows.

Figure 7C:
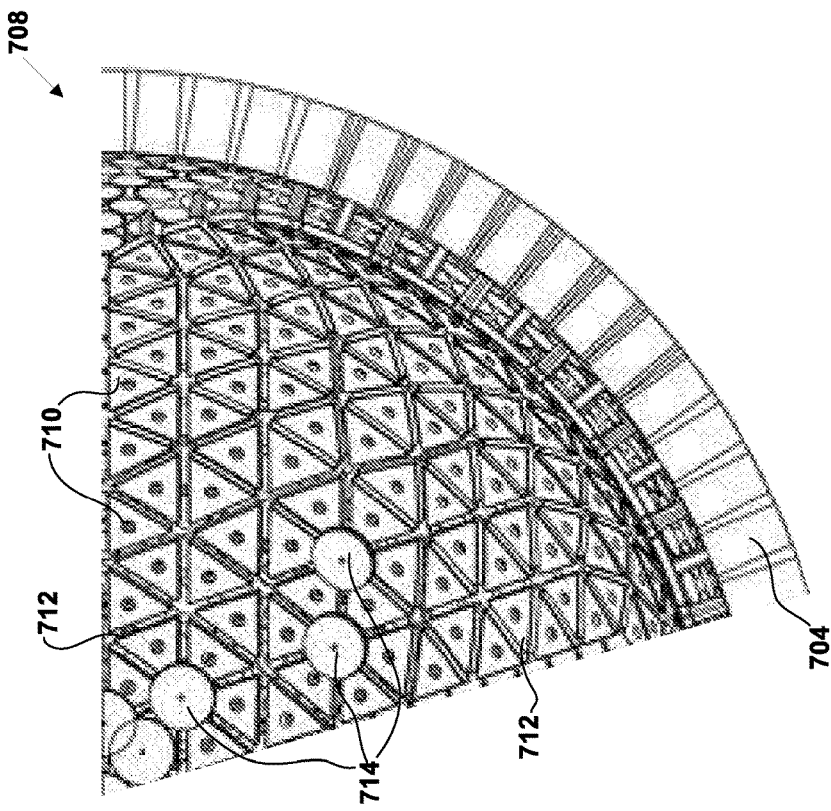
FIGS. 7A through 7C illustrate an example of a hemispherical surface having a hexagonal grid pattern.
Figure 7A:
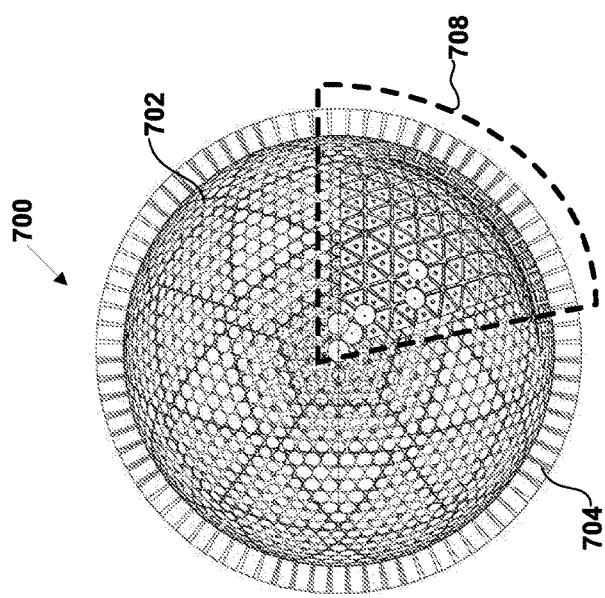
Figure 7B:
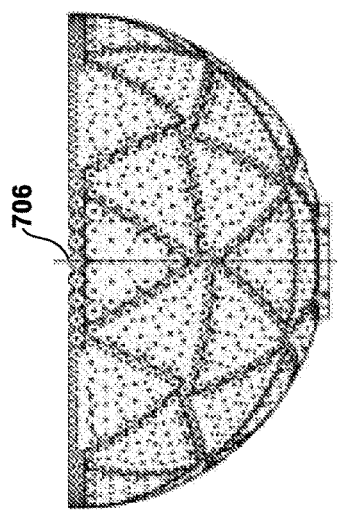

FIG. 7A illustrates a top view of an apparatus 700 comprising a substantially hemispherical inner surface 702. The surface may have a hexagonal grid pattern. The surface may be concave. A stator coil array 704 may be disposed beneath the surface. The stator coil array may comprise a plurality of stator coils arranged in a 3D configuration, such that the stator coils substantially conform with the curvature of the surface. A shape of the surface may also depend on the 3D configuration in which the stator coils are arranged. FIG. 7B illustrates a side view of the apparatus. Referring to FIGS. 7A and 7B, the stator coil array may be arranged in a hemispherical array circumferentially below the surface. A common center point 706 may be defined with respect to the apparatus. The stator coils may be oriented such that their longitudinal axes point radially towards the center point. As a result, the stator coils may be oriented at different angles relative to one another.

The stator coil array and the surface may be provided in a range of sizes. For example, a diameter of the surface may range from about 300 mm to about 500 mm. However, the invention is not limited thereto, and the diameter of the surface can be less than 300 mm, or greater than 500 mm in some cases.

FIG. 7C illustrates a magnified view of section 708 of FIG. 7A. Referring to FIG. 7C, the surface may comprise a plurality of triangular-shaped carrier guides 710 arranged in a hexagonal array. The carrier guides may be arranged to some faces of a polyhedron. Any number of faces and/or type of polyhedron may be contemplated. For example, the polyhedron may be a convex regular icosahedron. Among all regular polyhedrons, the icosahedron distributes the $4\pi$ angular defect evenly over the most number of vertices, thus minimizing the distortion of the spherical triangles near these vertices. As such, it is advantageous to subdivide the surface with an icosahedron. To render the surface substantially hemispherical, the carrier guides may be arranged in an icosahedral-hexagonal grid pattern. This discretizes the surface of the apparatus into a hexagonal array of carrier guides. Also, the icosahedral-hexagonal grid pattern enables the carrier guides to be mapped to the hemispherical stator coil array.

The discretization of the surface of the apparatus into many discrete parts has several advantages. Challenges in manufacturing a smooth curved surface that has good continuity are well-known. To overcome these challenges, the examples described herein provide for the subdivision of a curved surface (e.g., a hemispherical surface) into a plurality of discrete faces that collectively approximate the curved surface. This can be achieved through global tiling (tessellation) of the curved surface, which is based on numerical analysis techniques such as finite differences method. These techniques can enable an area of interest (in this case the surface on which a carrier is configured to move) to be subdivided into a grid. For example, a geodesic grid can be used to model the surface of a sphere with a subdivided polyhedron, which may be an icosahedron. The polyhedron can be subdivided into any level of granularity. For example, an icosahedron can be subdivided a different number of times to achieve different spherical node densities.

The surface 702 of the apparatus (on which a carrier is configured to move) can include a geodesic hemispherical grid generated by the subdivision of a platonic solid into cells, or by iteratively bisecting the edges of the polyhedron and projecting the new cells onto a hemispherical surface. In this geodesic grid, each of the vertices of the resulting geodesic hemispherical surface corresponds to a cell. An icosahedron can be used as the base polyhedron with hexagonally-arranged cells.

The tessellation of a curved surface into an icosahedral-hexagonal grid pattern also provides several advantages over conventional rectangular grids (e.g., Gaussian grids). For example, (i) the icosahedral-hexagonal grid pattern may be largely isotropic, (ii) node densities (resolution) of the grid can be increased by binary division, (iii) the icosahedral-hexagonal grid does not suffer from over-sampling near the poles (of the sphere or hemisphere), (iv) the icosahedral-hexagonal grid does not result in dense linear systems compared to spectral methods, and (v) there are no single points of contact between neighboring grid cells. In addition, the cells in the icosahedral-hexagonal grid can be both minimally distorted and near-equal-area. In contrast, square or rectangular grids may not be equal in area when mapped to a curved surface. Conversely, equal-area rectangular or square grids can vary in shape from equator to the poles of a hemispherical surface due to the curvature of the surface.

A longitudinal axis of a central or polar stator coil may be oriented towards the center of an icosahedral face or the vertex of an icosahedral face. The center of the hemispherical surface may be located on a point (vertex), or a face of the icosahedron. The faces of a subdivided icosahedron may be mapped to the hemispherical surface. The mapping may occur such that the hemispherical surface covers a number of faces of the subdivided icosahedron. For example, the hemispherical surface may cover x faces of the icosahedron. The hemispherical surface may cover full faces and/or fractional faces of the icosahedron. For example, the hemispherical surface may cover y number of full faces and z number of fractional faces of the icosahedron. The values for x, y, and z may be any integer. Each of x, y, and z can be any value ranging from 1 to 20. In some cases, a useful/operable apparatus can be obtained even with x=1, y=0, and z=1.

In the example of FIG. 7C, the surface may be in the form of an icosahedral-hexagonal grid. The icosahedral-hexagonal grid can be generated by dividing the faces of an icosahedron (formed from 20 congruent equilateral plane triangles) into a triangle mesh and projecting the vertices of the mesh onto the surface formed by the hemispherical array of stator coils. The relevant topology may include a mesh of triangles and hexagonal Voronoi cells.

The sphericity of the surface of the apparatus generally increases with the number of faces of the polyhedron to which the surface is mapped. For example, the surface may approximate a substantially (hemi)-spherical surface when mapped to a polyhedron having a large number of faces (e.g., an icosahedron having a sphericity of about 0.940). A simple icosahedron comprises 20 faces which can be further subdivided into a number of faces (e.g., 4*20 faces, 9*20 faces, and so forth). An icosahedral grid can be constructed by recursive construction or nonrecursive construction. Recursive construction bisects, projects, and subdivides the initial 20 plane equilateral triangles in a simple icosahedron, and repeats the procedure on the subdivided plane triangles recursively to create a grid having a desired resolution. The nonrecursive construction subdivides the 20 initial plane equilateral triangles, then projects the intersection points onto a surface of a sphere. By splitting each icosahedron edge into s line segments, and by projection of the intermediate points back onto a sphere, each triangle is split into $s^2$ smaller triangles. A volume filling factor $f_s$ relative to the volume of the circumscribed sphere approaches 1 as s goes to infinity, as shown in the table below. The volume filling factor $f_s$ can be indicative of the sphericity of the subdivided surface.

| s | $f_s$ | Icosahedral grid |
|---|---|---|
| 1 | 0.605 | Simple icosahedron with 20 faces |
| 2 | 0.873 | Subdivision with 4*20 faces |
| 3 | 0.941 | Subdivision with 9*20 faces |

The icosahedral tessellation of the surface can result in irregularities within the hexagonal grid. In subdividing an icosahedron, the ratio between the longest and shortest sides in the triangle mesh increases with the grid level, and converges to about 1.195114 (which translates to a grid irregularity of slightly under 20%). To compensate for the grid irregularity, the stator coils in the present disclosure may be designed to have different coil diameters and spacings, resulting in different densities of stator coils over the surface. For example, stator coils of relatively larger coil diameters may be located at a center of a face of the icosahedron. Conversely, stator coils of relatively smaller coil diameters may be located at points with increased spherical node densities. The spacings between the coils can be adjusted to vary slightly under 20% (to compensate for the grid irregularity), and the coil diameters can be adjusted accordingly. The coil diameters can be designed having a range of values. For example, the coil diameters may range from about 18 mm to about 23 mm. In some cases, the coil diameters may be less than 18 mm or greater than 23 mm.

The carrier guides 710 can be mapped to the underlying stator coils 704 in any configuration. For example, each carrier guide may be mapped to a unique interstitial location between adjacently-spaced stator coils. The carrier guides can be mapped to the stator coils in a 1:m configuration, an n:1 configuration, or an m:n configuration, where m and n can be any integer that is greater than 1. Any values for m and n may be contemplated. The densities of carrier guides and stator coils in the apparatus may be same or different.

The carrier guides 710 may be spaced apart from one another by gaps. These gaps correspond to tracks 712 that provide pathways for one or more carriers 714 to move on the surface. The gaps can have fixed widths or variable widths. In some examples, the gaps can have a width of about 5 mm. In other instances, the gaps may have widths ranging from about 2 mm to about 15 mm. Optionally, the gaps may have widths on the sub-millimeter scale.

The carriers 714 can move on the surface 702 along the tracks 712, similar to that shown in FIG. 3E. For example, the carriers can move in straight paths, zig-zag lines, and/or switch directions on the surface. The hexagonal grid pattern allows the carriers to switch directions at 60, 120, 180, 240, 300, or 360 degrees, at the intersections between tracks. In some particular instances in which the surface is mapped to a regular icosahedron, the carriers may switch directions at the intersections between tracks, except at the 5-sided intersections present at the intersections of the icosahedron.

The carriers can be moved and controlled to manipulate materials to form an object, such as a 3D braided structure or a 3D printed structure. Optionally, the carriers can be used to transport materials from one point on the surface to another point, or for assembly of components. Examples of materials may include fibers, liquid polymers, powder materials, and/or inks.

Figures 1, 8E:
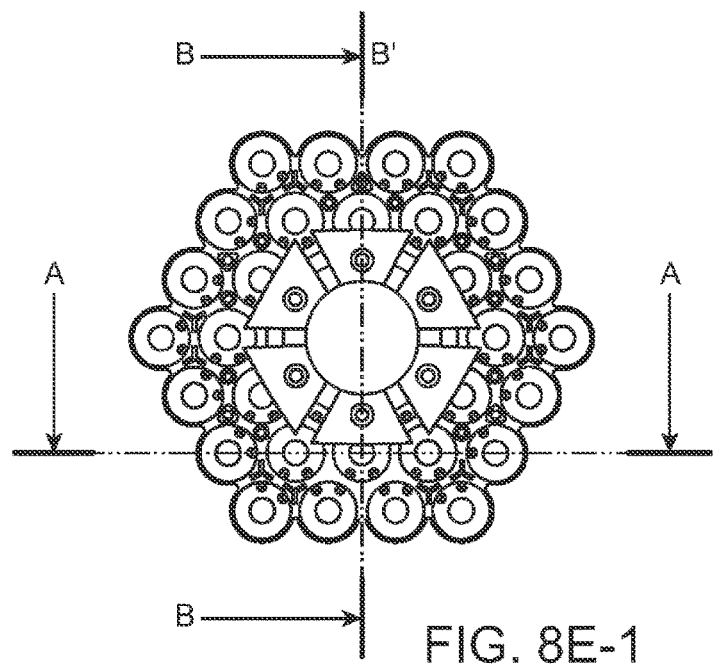
Figures 2, 8E:
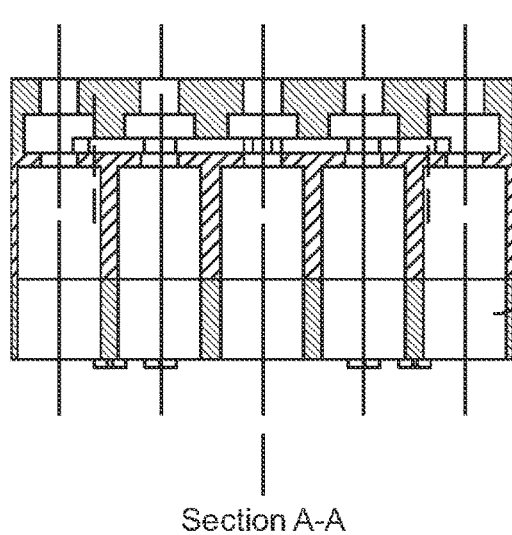
Figures 3, 8E:
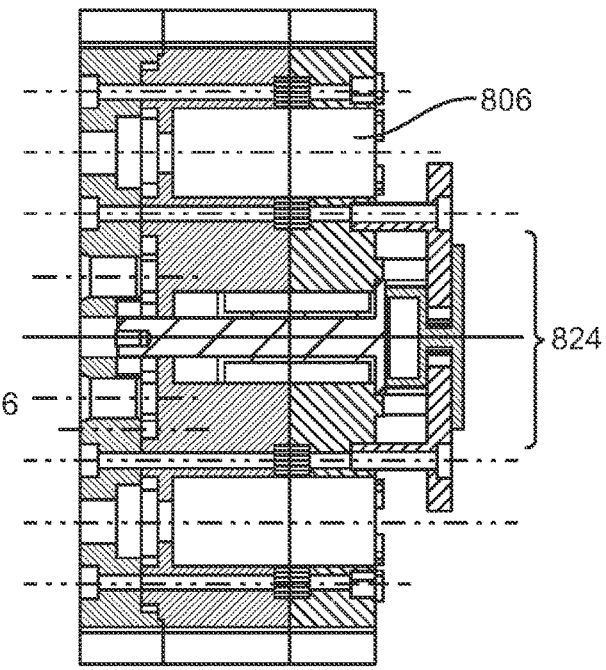
Figure 8F:
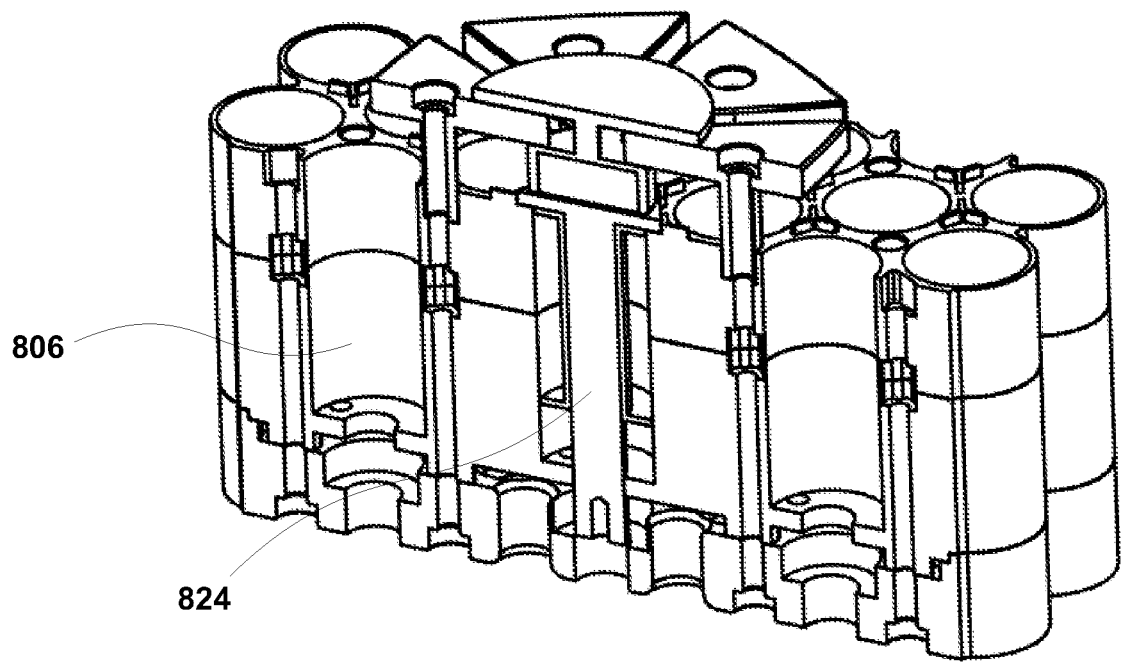

A unit array of carrier guides, similar to the one shown in FIG. 3D, is next described with reference to FIGS. 8A through 8F. FIG. 8A shows a perspective view; FIG. 8B shows a top view; FIG. 8C shows a side view; FIG. 8D shows a bottom view; and FIGS. 8E and 8F illustrate different cross-sectional views. Although the above figures illustrate a substantially planar configuration, it should be appreciated that the above configuration can be easily modified to the curved surface or polygonal surface shown in FIGS. 6A and 6C.

Referring to the above figures, a unit array 800 may comprise six triangular-shaped carrier guides 802 arranged in a hexagonal pattern above a stator coil housing 804. The housing may comprise a plurality of cylinders 806 arranged in a matching hexagonal configuration. Each cylinder may include a cavity 808 configured to hold a stator coil (not shown). The cavity may be formed having any shape. For example, the cavity may be cylindrical in shape.

The carrier guides may be located interstitially between the stator coils. An interstitial point may be defined at the center of an equilateral triangle, that has vertices located at the centers of three adjacently-spaced stator coils. The carrier guides may be spaced apart from one another by gaps that provide tracks for a carrier to move. The tracks may be disposed at a 60 degree angle relative to each other.

Referring to FIGS. 8A and 8B, a carrier 810 may be located at the center of the unit array where tracks 812 converge. The carrier can be configured to move along any of the tracks, as previously described. The carrier may be capable of moving in different directions, by moving along different tracks. The hexagonal arrangement of the carrier guides allows the carrier to change direction with less path deviation (e.g., at 60 degree angle, as opposed to the 90 degree angle in an orthogonal arrangement). Also, the hexagonal arrangement allows for higher density coil nesting, thus greater power density.

The carrier guides may be located above the stator coil housing by a separation distance d. An undercut region 814 may be defined between the carrier guides and the stator coil housing. A height of the undercut region may be given by the separation distance d. The carrier may include a lower portion 810-1 located in the undercut region below a top surface of the carrier guides. The lower portion of the carrier may be located in the undercut region to maintain a position and/or alignment of the carrier. Additionally, the lower portion of the carrier may include a magnet located in proximity to the stator coil housing (stator coils), so that the magnet has greater interaction with the electromagnetic field generated by the underlying stator coils. The magnet of the carrier may be disposed in proximity to the stator coils, for example by a distance ranging from about 0.1 mm to about 8 mm when the carrier is located directly above a stator coil. The proximity distance may vary depending on the geometry and material of the magnetic core used in the stator coil, as well as the coil geometry and current to be passed through the coil. The interaction of the magnet with the electromagnetic field provides a driving force to move the carrier along the tracks, as previously described.

A through-hole 816 may be provided in each of the carrier guides. For example, a through-hole may be located at the center of each carrier guide. The through-holes can provide delivery paths for non-moving fiber supplies located underneath the stator coil housing. The non-moving fiber supplies may be routed from below the stator coil housing, through a hole 818 on a baseplate 820 to the carrier guides. A plurality of channels may be provided for routing the fiber supplies to the plurality of carrier guides. For example, as shown in FIG. 8D, six different channels 822 may be provided for routing fiber supplies separately to the six carrier guides 802 in the hexagonal unit array. As described later in the specification, a plurality of fiber-carrying carriers can be configured to move along predetermined paths on the surface of the apparatus, so as to generate a 3D braided structure.

In some examples, the holes can provide pathways for electrical and/or mechanical components. For example, the hole 818 and channels 822 can provide pathways for the aggregated wiring of the 19 coil cavities in the unit array. Screws may be inserted into the through-holes 816 to secure the carrier guides to the housing. In some examples, non-moving fiber supplies can be routed via a through-hole formed in the carrier guide, depending on a size (e.g., diameter) of the carrier relative to the underlying carrier guide.

Referring to FIG. 8E, a cross-sectional view A-A is taken along a line A' passing through the centers of a straight row of five adjacently spaced cylinders of the stator coil housing. Accordingly, a cross-sectional view of the five cylinders 806 is shown in view A-A. The cylinders may be empty (i.e., does not contain stator coils). Cross-sectional view B-B is taken along another line B' that is orthogonal to the line A', and FIG. 8F shows a perspective of the cross-sectional view B-B. The line B' passes through a central stator coil 824 located directly underneath the center of the unit array of carrier guides, and also passes through two empty cylinders 806 located on opposite sides to the central stator coil. The central stator coil may be associated with the unit array, and can be used generate an electromagnetic field over the unit array.

The stator coils may be rigidly fixed in position once they are arranged in a 3D configuration (e.g., spherical array). Optionally, one or more of the stator coils may be movable after they are in the 3D configuration. A position and/or orientation of the one or more stator coils may be adjustable. As an example, one or more of the stator coils may be configured to tilt at different angles within the spherical array configuration. In some cases, one or more of the stator coils may be capable of tilting at angles ranging from about 0.1° to about 15°. Optionally, a stator coil may be capable of tilting at an angle of more than 15°. The stator coils may be tilted at different angles using actuators. Examples of actuators may include levers, screw-drives, electromagnets, or piezoelectric actuators.

In some cases, one or more of the stator coils may be replaced with permanent switchable magnets. The permanent switchable magnets may include one or two rotatable cores to achieve different magnetic field states. The use of permanent switchable magnets may be advantageous for larger scale apparatus, due to the high power requirement for a large scale array of stator coils. The permanent switchable magnets can be driven using motors, which typically consume less power, as compared to powering a large scale array of stator coils to generate an electromagnetic field. In some examples, the electric current is only used to change the state of a magnetic field, and need not be constantly applied to maintain the magnetic field.

Figure 9B:
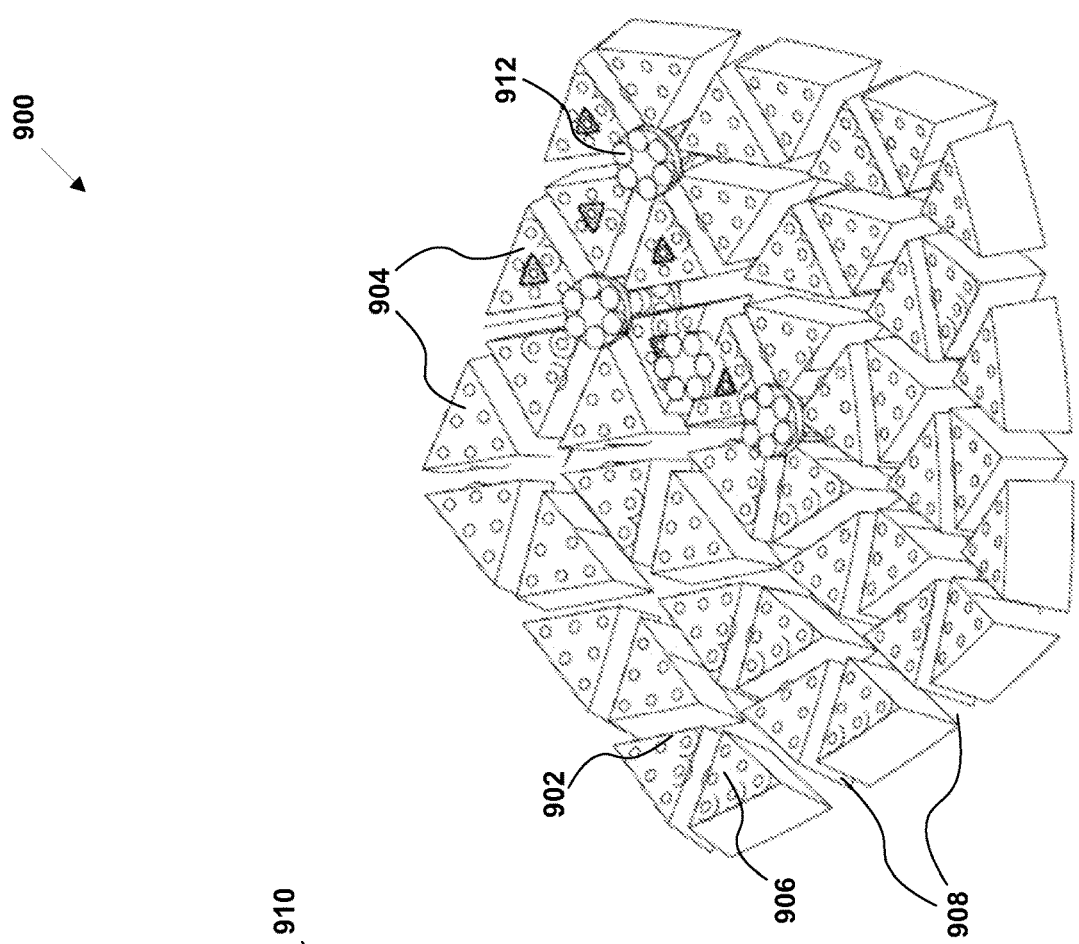
FIGS. 9A and 9B illustrate carriers located on the tracks between a hexagonal array of carrier guides.
Figure 9A:
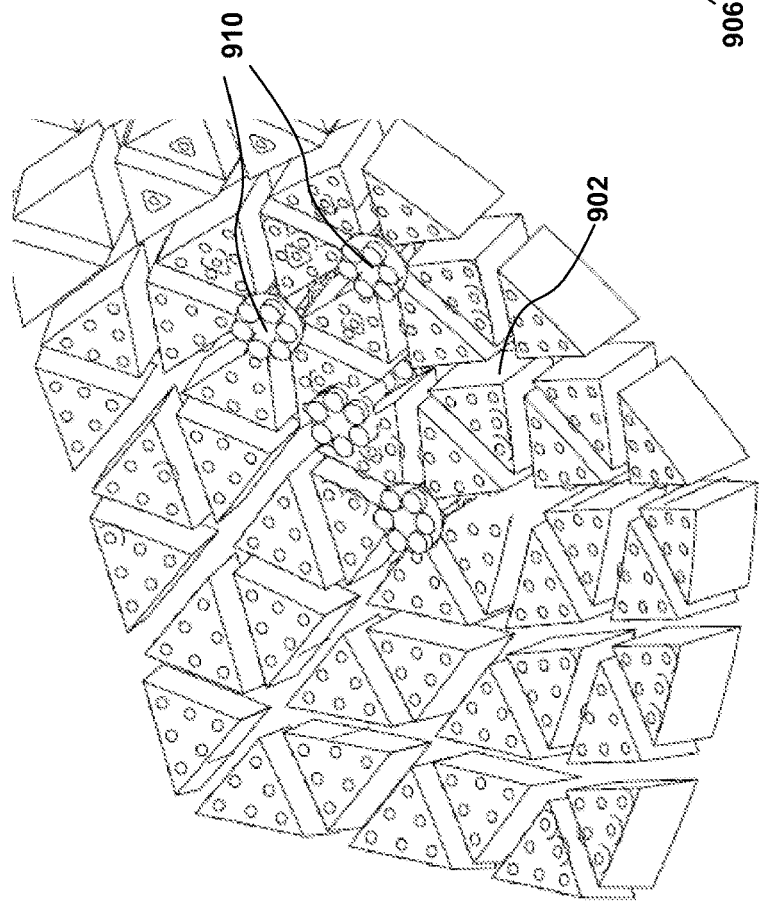

FIGS. 9A and 9B illustrate a portion of a surface 902 of an apparatus 900. The surface may comprise a plurality of triangular-shaped carrier guides 904. Each carrier guide may comprise a plurality of stator coils 906 embedded within. Tracks 908 may be provided between adjacently-spaced carrier guides. A plurality of carriers 910 may be disposed on the surface. Each carrier may comprise a plurality of magnets 912 disposed thereon. The carriers can be configured to move along the tracks when the electromagnetic force generated by the stator coils interacts with the magnets on the carriers. Switching of polarities of the electromagnetic field can also cause the carriers to rotate.

The surface in FIGS. 9A and 9B depicts an 8-subdivision triangular icosahedral field where, essentially, the stator coils are disposed in enlarged triangle carrier guides. This makes more efficient use of the coil energy by driving carriers with the field on both ends of the stator coils. Also, the area below the carrier guides is available for placing carrier sensing and communication hardware, as well as additional carrier envelope behind the guides, which allows balancing the carrier hardware on either side of the guides to reduce carrier torsion. As an example, the battery and control electronics of the carrier can be located behind the field to counterbalance bobbin and drive/motor hardware on the inbound side. A bobbin drive motor can also drive the bobbin from behind the guides through a central axle inside the carrier. The configuration of the carrier guides, stator coils, and carriers in FIGS. 9A and 9B may result in wider gaps (tracks) between the guides.

In the previous examples, the stator coils are electromagnets that can be turned on or off by controlling the flow of current through the coils. Passing a current through a coil causes the stator coil to generate an electromagnetic field. The electromagnetic field is removed when current is no longer delivered to the coils.

In some instances, moving permanent magnets may be used in place of stator coils for modulating the magnetic field. FIG. 10A illustrates an example of an array of movable permanent magnets 1002 for modulating a magnetic field. The array of movable permanent magnets may be provided below a surface 1004 of an apparatus. The surface may correspond to an active motion plane on which one or more carriers are configured to move.

Each permanent magnet may be an axially magnetized disc magnet having a N pole and a S pole. The permanent magnets may be made of a strong magnetic material, e.g., neodymium. The permanent magnets provide a magnetic field that extends over the surface of the apparatus. The magnetic field can be modulated by moving the permanent magnet relative to the surface, as described below. The surface may comprise a plurality of carrier guides 1006 with tracks 1008 located therebetween. In some cases, the carrier guides may include magnetic tiles 1010. The magnetic tiles may be configured to focus the magnetic field towards the active motion plane. The magnetic tiles can also mitigate the magnetic interaction/interference between adjacent permanent magnets.

Each permanent magnet may be configured to move along a reciprocating axis 1012 beneath a corresponding magnetic tile. A reciprocating axis for a movable permanent magnet may extend normally to the portion of the surface beneath where the movable permanent magnet is located. Each permanent magnet 1002 may be operably coupled to a gate 1014 via an extendable member 1016. The extendable member permits the permanent magnet to move relative to the gate along the reciprocating axis. The extendable member may be an extendable shaft. For example, the extendable member may be part of a solenoid or a piston.

The movement of the permanent magnet along the reciprocating axis can be enabled using different actuation mechanisms. In some cases, the reciprocation may be enabled pneumatically using a piston. A reciprocating magnet may be fluid actuated (using for example air) instead of electrical-based actuation to motivate the magnet. In other cases, the reciprocation may be enabled using the attraction and repulsion forces generated by an electromagnet, for example as shown in FIGS. 10B and 10C. The gates 1014 are configured to encourage or discourage motion of the permanent magnet 1002 along the reciprocating axis 1012. Referring to FIG. 10B, the gate 1014 may be an electromagnet. When current is passed through coils of the electromagnet, the gate may possess the polarities shown in FIG. 10B. An attractive force is generated by the N pole of the gate 1014 being in proximity to the S pole of the permanent magnet 1002. When the permanent magnet is in the position shown in FIG. 10B, the permanent magnet may be in an "OFF" state because the magnetic flux is directed away from the surface of the apparatus towards the poles of the electromagnet. The magnetic flux of both the permanent magnet and the electromagnet are routed internally beneath the surface of the apparatus. When the permanent magnet is in the "OFF" state, the magnetic field above the surface is relatively weak and may be insufficient to provide a driving force to drive a carrier on the surface.

Conversely, when the flow of current through the coils of the electromagnet is reversed, the gate may switch polarities as shown in FIG. 10C. A repulsive force is generated between the S pole of the gate 1014 and the S pole of the permanent magnet 1002, which causes the permanent magnet to move along the reciprocating axis in the direction 1018 towards the magnetic tile 1010. When the permanent magnet is in the position shown in FIG. 10C, the permanent magnet may be in an "ON" state because the magnetic flux is now re-directed towards the surface of the apparatus away from the electromagnet. The magnetic flux from the permanent magnet can be enhanced by the magnetic tile to create a stronger magnetic field on the surface of the apparatus. When the permanent magnet is in the "ON" state, the magnetic field above the surface is relatively strong and may be sufficient to provide a driving force to drive a carrier on the surface. Accordingly, by controlling the magnitude and directions of currents delivered to the electromagnets (gates), a plurality of permanent magnets can be controlled in a collective manner to alternate between "OFF" and "ON" states by reciprocating back and forth relative to the active motion plane. Essentially the gates function as "magnetic switches." This method of control allows the magnetic field on the surface of the apparatus to be easily modulated.

Figure 10D:
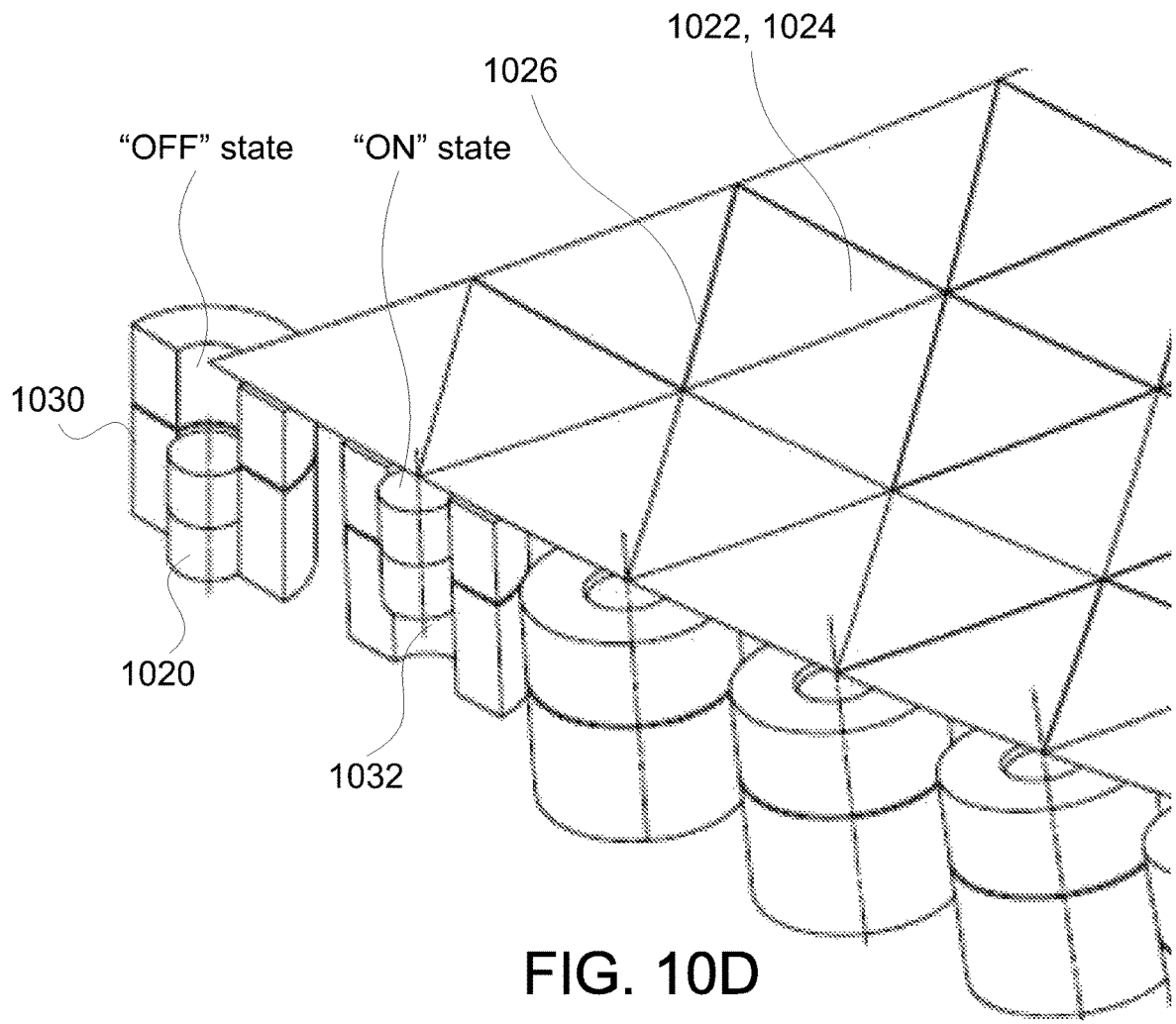
FIGS. 10D, 10E, and 10F illustrate another example of an array of reciprocating permanent magnets.
Figure 10E:
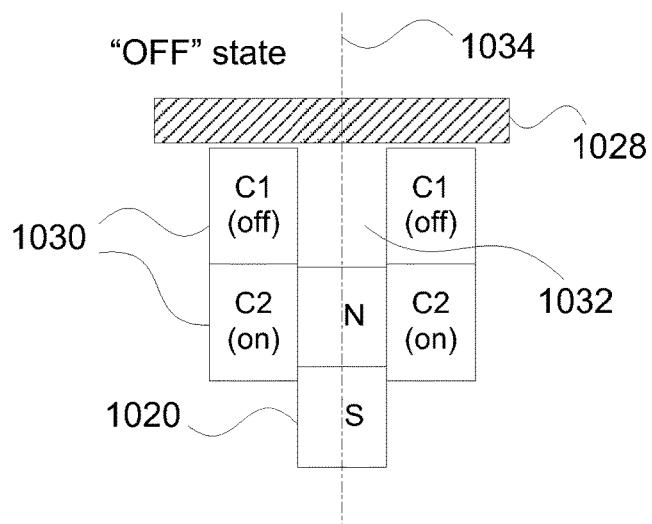
Figure 10F:
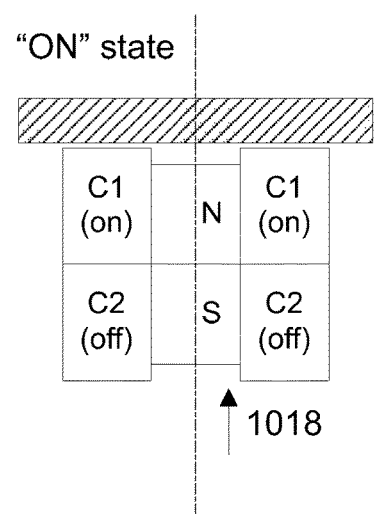

FIGS. 10D, 10E, and 10F illustrate another example of an array of movable permanent magnets 1020 for modulating a magnetic field. The array of movable permanent magnets may be provided below a surface 1022 of an apparatus. The surface may correspond to an active motion plane on which one or more carriers are configured to move. Each permanent magnet may be an axially magnetized rod magnet having a N pole and a S pole. The permanent magnets may be made of a strong magnetic material, e.g., neodymium. The permanent magnets provide a magnetic field that extends over the surface of the apparatus. The magnetic field can be modulated by moving the permanent magnets relative to the surface, as described below.

The surface may comprise a plurality of carrier guides 1024 with tracks 1026 located therebetween. In some cases, the carrier guides may include magnetic tiles 1028. The magnetic tiles may be configured to focus the magnetic field toward the active motion plane. The magnetic tiles can also mitigate the magnetic interaction/interference between adjacent permanent magnets.

Each movable permanent magnet 1020 may be operably coupled to a gate 1030. For example, the permanent magnet may be located within a reciprocating cavity 1032 of the gate. The permanent magnet may be configured to move along a reciprocating axis 1034 extending longitudinally within the cavity. The gate may include one or more electromagnets. For example, as shown FIGS. 10E and 10F, the gate may comprise a first coil C1 and a second coil C2. The first coil C1 may be proximal to the active motion plane, and the second coil C2 may be distal to the active motion plane. The reciprocation of the permanent magnet within the cavity may be enabled using attractive forces generated respectively by the coils C1 and C2. Referring to FIG. 10E, when current is passed through coil C2 and no current is passed through coil C1, the permanent magnet may be attracted to the coil C2. When the permanent magnet is in the position shown in FIG. 10E, the permanent magnet may be in an "OFF" state because the magnetic flux is directed away from the surface of the apparatus towards the coil C2. The magnetic flux of the permanent magnet and the coil C2 is routed internally beneath the surface of the apparatus. When the permanent magnet is in the "OFF" state, the magnetic field above the surface is relatively weak and may be insufficient to provide a driving force to drive a carrier on the surface.

Conversely, when current is passed through coil C1 and no current is passed through coil C2, the permanent magnet may be attracted to the coil C1. When the permanent magnet is in the position shown in FIG. 10F, the permanent magnet may be in an "ON" state because the magnetic flux is now re-directed towards the surface of the apparatus away from the electromagnet. The magnetic flux from the permanent magnet can be enhanced by the magnetic tile to create a stronger magnetic field on the surface of the apparatus. When the permanent magnet is in the "ON" state, the magnetic field above the surface is relatively strong and may be sufficient to provide a driving force to drive a carrier on the surface. The magnetic field allows for both driving and retention (e.g., fixing a position) of a carrier on the surface of the apparatus. Accordingly, by controlling the magnitude and directions of currents delivered to the coils C1 and C2 (gates), a plurality of permanent magnets can be controlled in a collective manner to alternate between "OFF" and "ON" states by reciprocating back and forth relative to the active motion plane within the gates. Essentially the gates function as "magnetic switches." This method of control allows the magnetic field on the surface of the apparatus to be easily modulated.

In some examples, the reciprocation of the permanent magnet 1020 along the reciprocating axis within the cavity of the gate can be enabled using different actuation mechanisms. For example, the reciprocation may be enabled pneumatically using a piston instead of an electromagnet.

The arrays of movable permanent magnets described above can be configured to work with a magnetic guide plane, as well as a non-magnetic guide plane. A magnetic guide plane may be tiled such that each permanent magnet effects a single tile, or a group of tiles. The guide plane may utilize triangular carrier guides for high tension applications.

In the examples of FIGS. 10A-10F, the movable permanent magnets are configured to alternate between binary states ("ON" and "OFF" states). In some cases, tri-state switchable permanent magnets can be used, for example as shown by an array of switchable permanent magnets 1102 in FIGS. 11A-11F. These switchable permanent magnets may be capable of alternating between three states—(1) "OFF" state, (2) "ON" state (attractive force), and (3) "ON" state (repulsive force)—by rotating a diametrically magnetized permanent magnet within a gate. The gate may be, for example a magnetic housing.

Referring to FIGS. 11A-11F, the array of switchable permanent magnets 1102 may be provided below a surface 1104 of an apparatus. The surface may correspond to an active motion plane on which one or more carriers are configured to move. Each permanent magnet may be a diametrically magnetized permanent magnet having a N pole and a S pole. The permanent magnets may be made of a strong magnetic material, e.g., neodymium. The permanent magnets provide a magnetic field that extends over the surface of the apparatus. The magnetic field can be modulated by moving the permanent magnet relative to the surface, as described below.

The surface 1104 may comprise a plurality of carrier guides 1106 with tracks 1108 located therebetween. In some cases, the carrier guides may include magnetic tiles 1114. The magnetic tiles may be configured to focus the magnetic field toward the active motion plane. The magnetic tiles can also mitigate the magnetic interaction/interference between adjacent permanent magnets.

Each permanent magnet may be operably coupled to a gate 1110. For example, the permanent magnet may be located within a cavity 1112 of the gate. In some cases, the cavity may be cylindrical, although any shape may be contemplated. The permanent magnet may be configured to rotate about an axis within the cavity. Rotation of the permanent magnet about different angles in different directions can result in different magnetic states. For example, referring to FIGS. 11A and 11D, the permanent magnet may be initially in the position shown. In this position, the permanent magnet may be in an "OFF" state because the magnetic flux is directed away from the surface of the apparatus. For example, the magnetic flux of the permanent magnet may be routed beneath the surface of the apparatus such that it is trapped within the cavity of the gate. When the permanent magnet is in the "OFF" state, the magnetic field above the surface is relatively weak and may be insufficient to provide a driving force to drive a carrier on the surface.

Figure 11C:
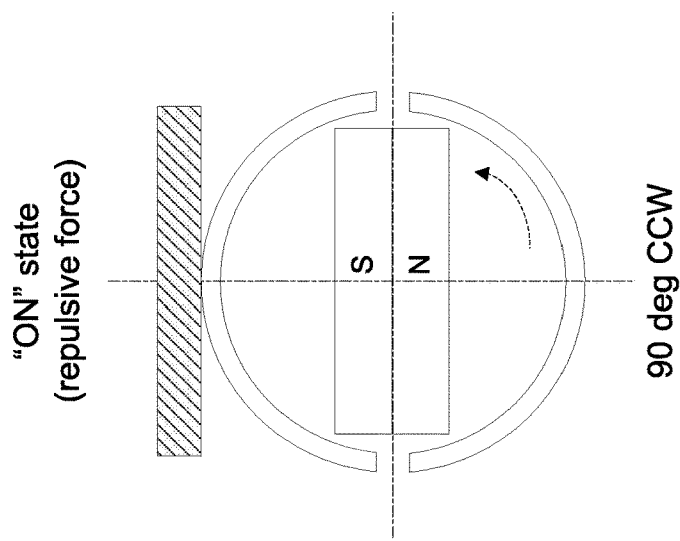
FIGS. 11A, 11B, 11C, 11D, 11E, and 11F illustrate an example of an array of switchable permanent magnets.
Figure 11B:
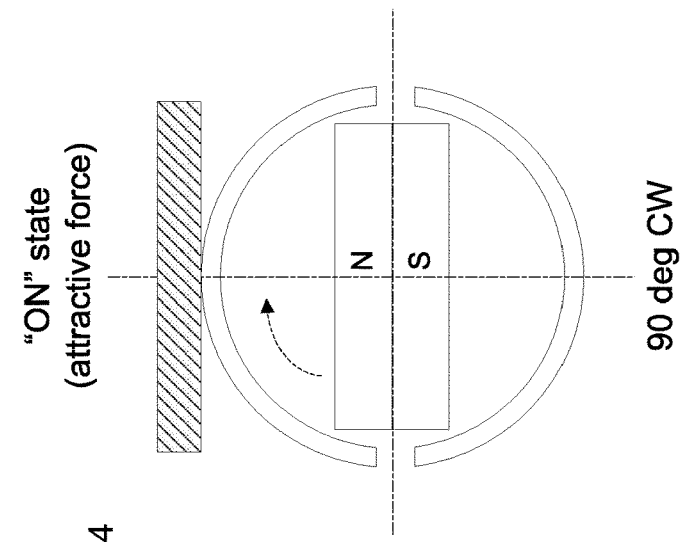
Figure 11A:
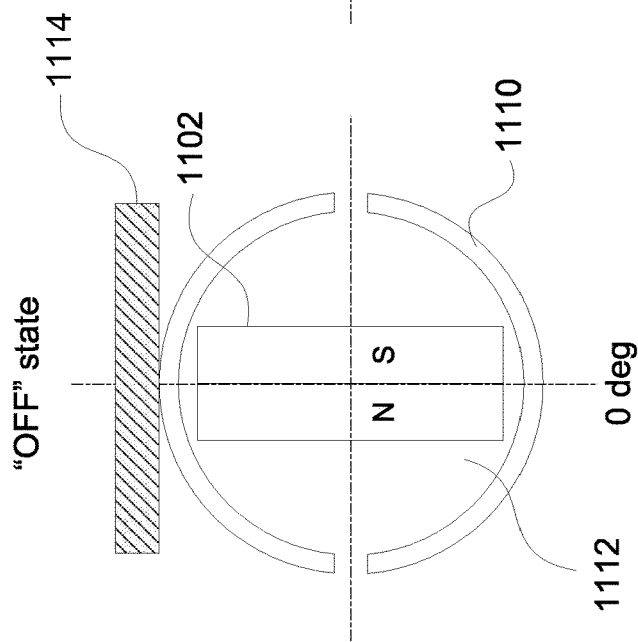
Figure 11D:
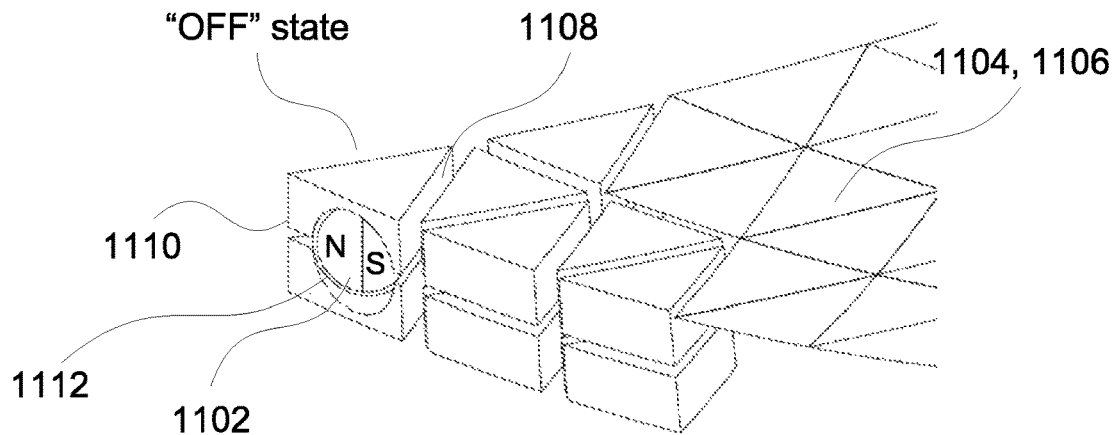
Figure 11E:
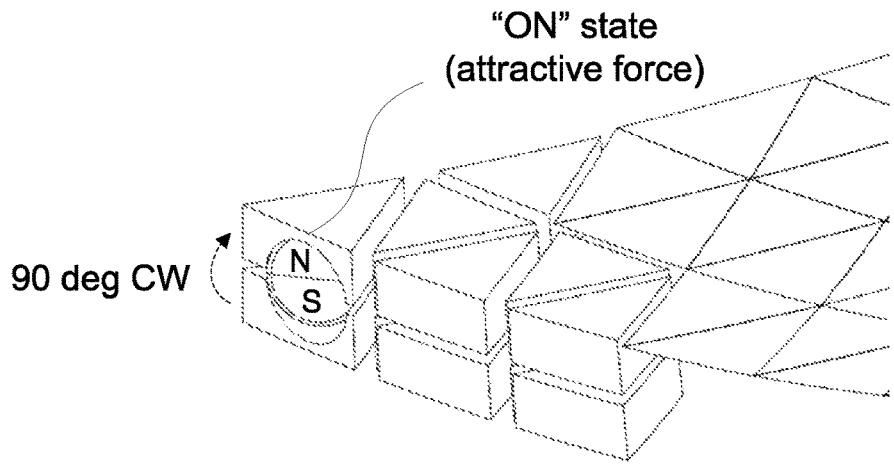
Figure 11F:
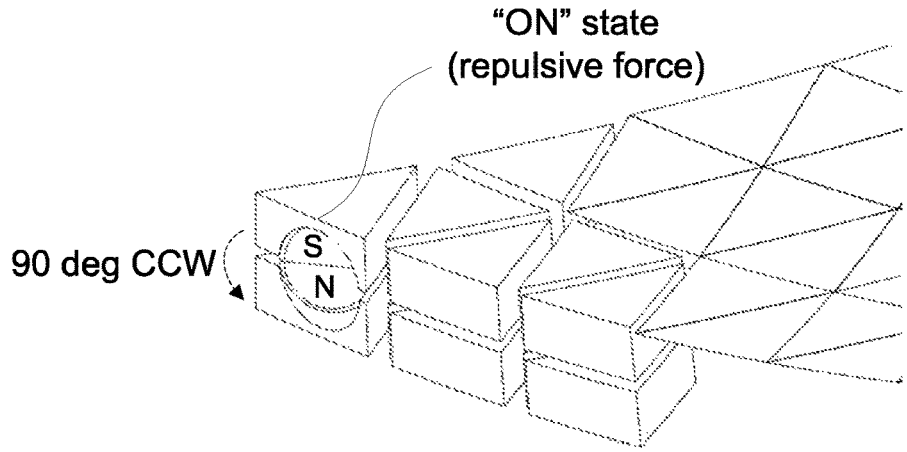

The permanent magnet can be configured to rotate within the cavity of the gate using different actuation mechanisms, e.g., motors, electromagnets, etc. Referring to FIGS. 11B and 11E, when the permanent magnet is rotated from its initial position by 90 degrees in a clockwise (CW) direction, the permanent magnet may be in the "ON" state because the magnetic flux is now re-directed towards the surface of the apparatus and out from the gate. In the position shown in FIG. 11B, the permanent magnet may provide an attractive force to hold a carrier on the surface of the apparatus, or cause another carrier to move towards the permanent magnet.

Similarly, when the permanent magnet is rotated from its initial position by 90 degrees in a counter-clockwise (CCW) direction, the permanent magnet may be in the "ON" state because the magnetic flux is also re-directed towards the surface of the apparatus and out from the gate. However, in the position shown in FIGS. 11C and 11F, the permanent magnet may instead provide a repulsive force to release a carrier, or cause another carrier to move away from the permanent magnet.

The magnetic field allows for both driving and retention (e.g., fixing a position) of a carrier on the surface of the apparatus. Accordingly, a plurality of permanent magnets can be controlled in a collective manner to alternate between an "OFF" state, an "ON" state (attractive force), and an "ON" state (repulsive force), by rotating relative to the active motion plane within the gates. Essentially the gates function as "magnetic switches." This method of control allows the magnetic field on the surface of the apparatus to be easily modulated.

In some examples, the above-described (rotatable) permanent switchable magnets may be replaced by electropermanent magnets which switch polarities when electrically excited. This can eliminate the necessity of moving components, and potentially consume less power compared to electromagnets. For example, electropermanent magnets require no power source to maintain the magnetic field.

An electropermanent magnet may comprise (1) a magnet and (2) a wire wound around a portion of the magnet. An external magnetic field can be switched on or off by a pulse of electric current in the wire winding around the portion of the magnet. The magnet comprises a first section made of "hard" (high coercivity) magnetic material and a second section made of "soft" (low coercivity) material. The direction of magnetization in the second section can be switched by a pulse of current in the wire winding. When the magnetically soft and hard materials have opposing magnetizations, the magnet produces no net external field across its poles. Conversely, when the directions of magnetization of the magnetically soft and hard materials are aligned, the magnet produces an external magnetic field. Accordingly, the magnetic field on the surface of an apparatus can be switched to an "ON" state or an "OFF" state, by using a pulse of current to reverse magnetization of the second section of the magnet.

Figure 12:
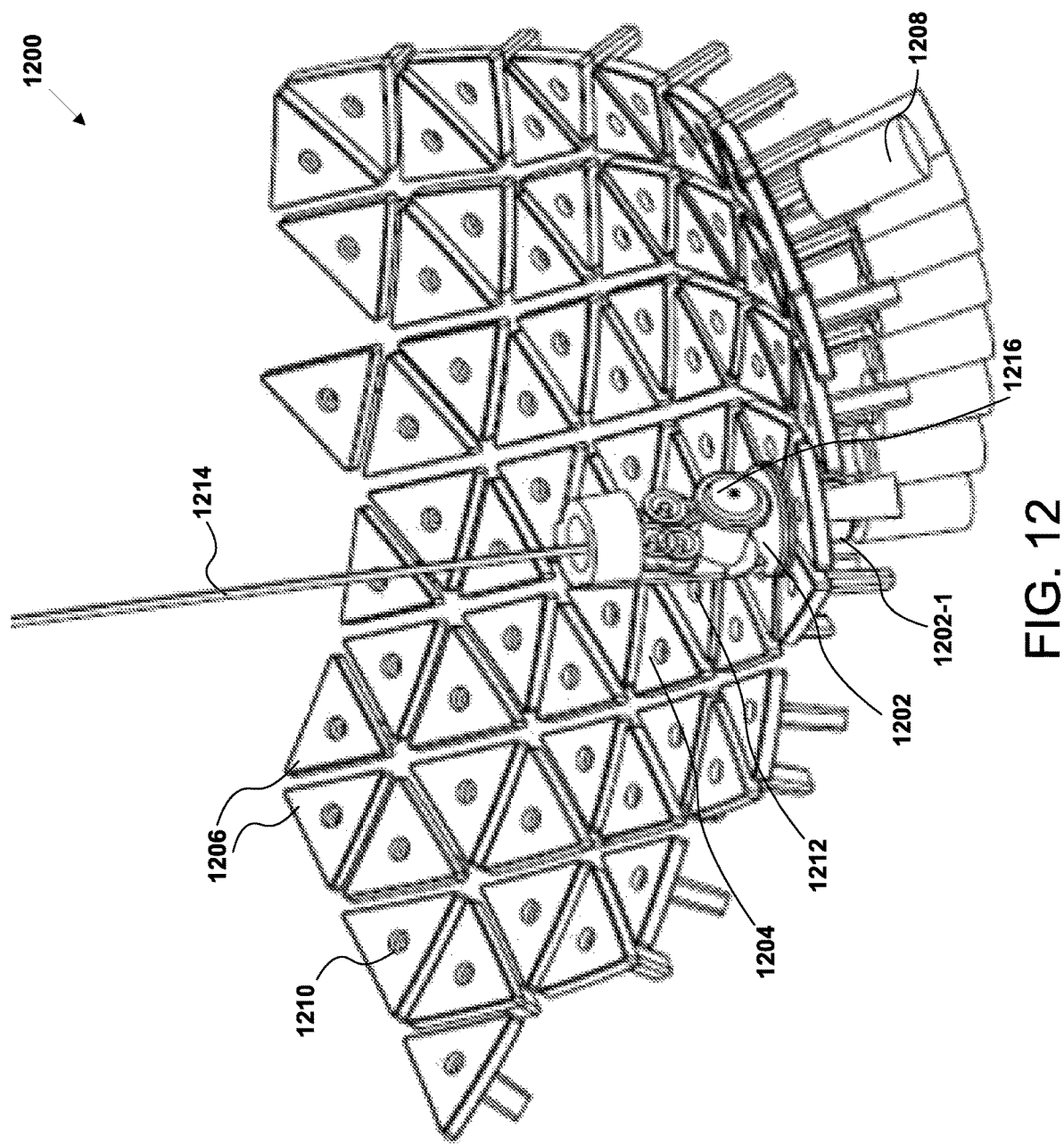
FIG. 12 illustrates a carrier on which a fiber-carrying bobbin is attached.

FIG. 12 illustrates a carrier 1202 disposed on a surface 1204 of an apparatus 1200. The surface may comprise a plurality of carrier guides 1206 which may be arranged in an icosahedral-hexagonal grid pattern. In the interest of clarity, only a portion of the housing for the stator coils beneath the surface is illustrated. The carrier may be configured to move along the tracks, as previously described. The carrier is capable of moving in different directions, by moving along different tracks.

The plurality of carrier guides may be coupled to the stator coil housing 1208. The carrier guides may be located above the housing by a separation distance d. An undercut region may be located between the carrier guides and the stator coils. A height of the undercut region may be defined by the separation distance d. In some cases, the separation distance d (or height of the undercut region) may range from about 10 mm to about 16 mm. Alternatively, the separation distance d (or height of the undercut region) may be less than 10 mm or greater than 16 mm.

The carrier may include a lower portion 1202-1 located in the undercut region below a top surface of the carrier guides. The lower portion of the carrier may be located in the undercut region to maintain a position and/or alignment of the carrier. Additionally, the lower portion of the carrier may include a magnet disposed in proximity to the stator coils. The magnet on the carrier can interact with the electromagnetic field generated by the underlying stator coils, so as to drive the carrier on the surface of the apparatus. Specifically, the interaction of the magnet with the electromagnetic field can provide a driving force to move the carrier along the tracks. As previously described, the carrier can be driven on the surface to manipulate a material to form an object, such as a 3D braided structure or a 3D printed structure.

A through-hole 1210 may be provided in each of the carrier guides. For example, a through-hole may be located at the center of each carrier guide. The through-holes can provide delivery paths for non-moving fiber supplies located underneath the plurality of stator coils.

The carrier may be configured to support one or more devices that are configured to manipulate a material. The devices may include bobbins, assembly robots, material sprayers, and/or matrix injectors or matrix catalyzing devices for manipulating the material. The carrier may also be configured to hold electronics and power supplies for the devices. The materials may comprise fibers, liquid polymers, powder materials, and/or inks.

FIG. 12 shows a bobbin 1216 supported on the carrier. The bobbin may be configured to carry fiber 1214. The bobbin may be coupled to a line tensioning device 1212 for maintaining tension of the fiber. The fiber may include, for example, soft natural fibers or synthetic fibers. In some cases, the bobbin may be configured to carry more rigid materials such as glass, carbon fiber, ceramics, metallic wires, etc. The materials can be provided having different diameters ranging from nanoscale (e.g., nanotubes) to several millimeters (e.g., heavy rope). The bobbin may be a mechanical system. For example, the bobbin may comprise one or more pulleys for drawing and regulating fiber from a source supply located on the carrier. The bobbin may also comprise other mechanisms for maintaining line tension as the fiber is passed through a braiding point to generate a structure (e.g., a 3D braided structure). Maintaining the line tension may be important for manipulating certain high stiffness materials, such as carbon fiber. The carrier can be driven on the surface of the apparatus to manipulate materials using the devices to form objects such as 3D braided structures or 3D printed structures. For example, a plurality of bobbin-carriers may be driven on the surface in complex motion paths to generate a 3D braided structure.

The carrier may comprise a coupling member that couples the carrier to the surface of the apparatus, but that permits the carrier to move about on the surface. The carrier can be driven on the surface, in response to an electromagnetic field generated by one or more stator coils in the apparatus, as previously described.

Figure 13B:
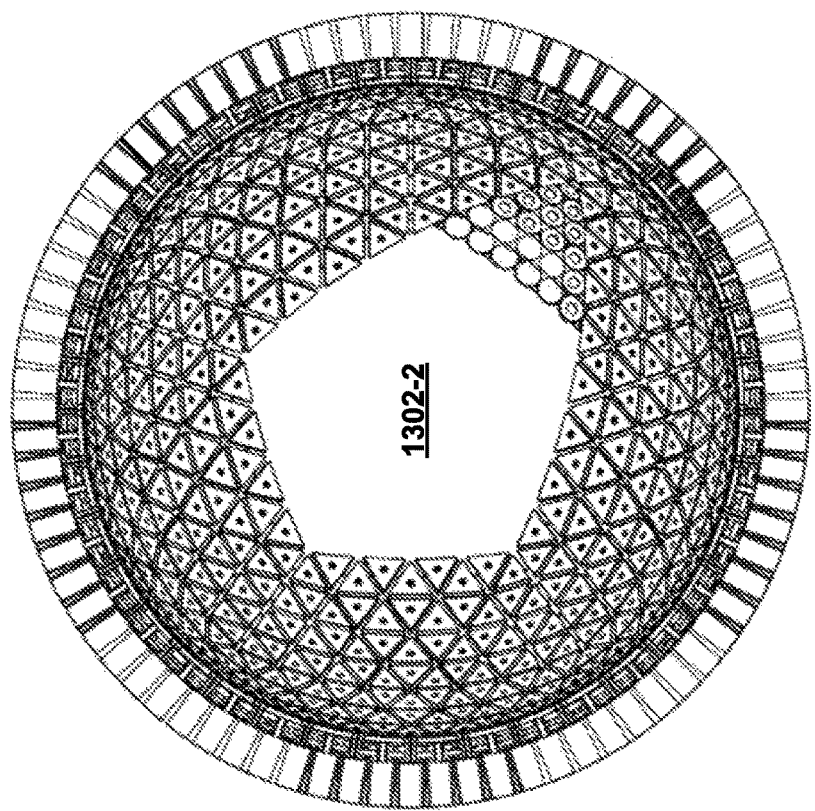
FIGS. 13A and 13B illustrate openings in a hemispherical surface of an apparatus.
Figure 13A:
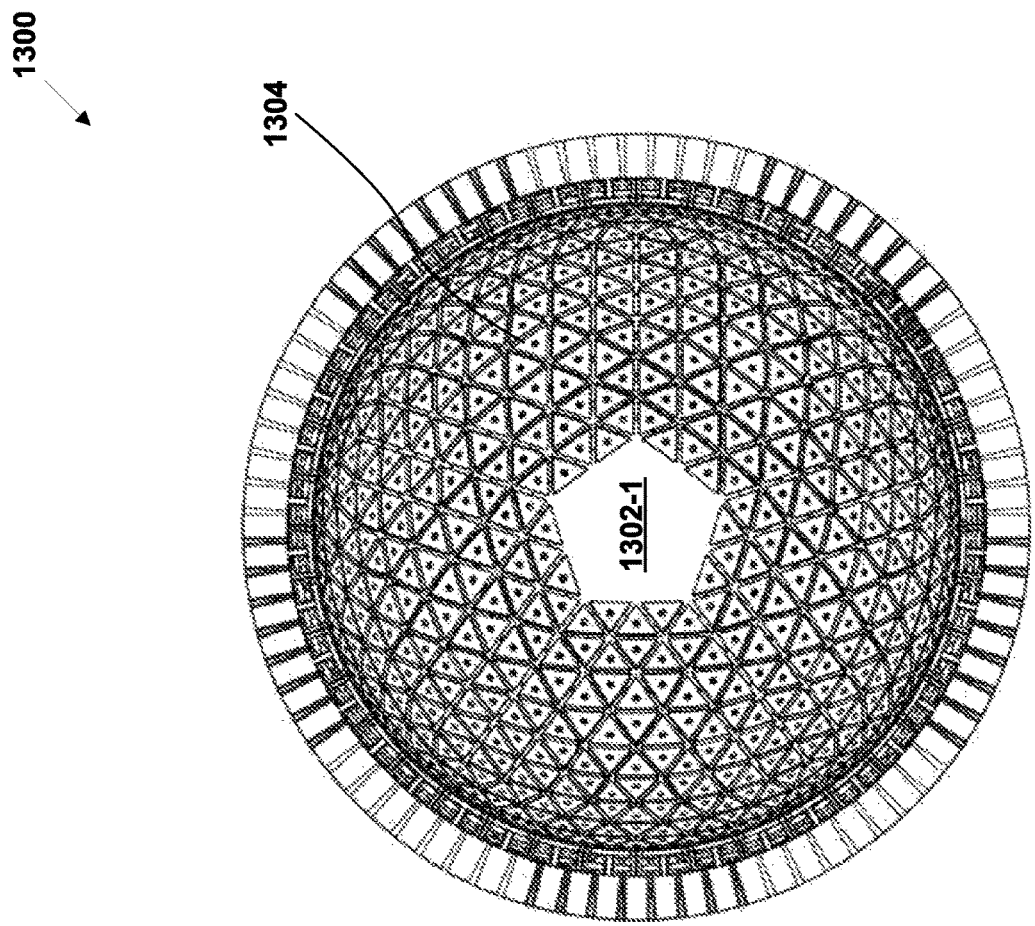

FIGS. 13A and 13B illustrate examples of an apparatus having openings in its surface. The openings can be useful for permitting materials to be directed into and/or out of the apparatus. The apparatus depicted in FIGS. 13A and 13B may be similar to the apparatus of FIG. 6A except for the following differences. In FIG. 13A, an apparatus 1300 may comprise an opening 1302-1 such that a bottom portion of the surface 1304 is truncated. The opening may be a through-hole that permits material (e.g., fiber and/or arbors) to be fed into and out of the apparatus. The opening may be formed in any shape, e.g. circular, polygon, etc. In the example of FIG. 13A, the opening may have a pentagon shape. The opening may be designed to match a pentagon that resulted from subdivision of the icosahedron. The size of the opening can vary depending on manufacturing needs/requirements. For example, an opening 1302-2 in FIG. 13B may be larger than the opening in FIG. 13A. Any shape and/or size of the openings may be contemplated.

In the previously-described examples, the surface of the apparatus may be partially spherical (e.g., an open-faced hemisphere). In some cases, an apparatus may be provided in the form of a substantially hollow sphere. For example, in FIG. 14A, the stator coil array 1402 of the apparatus 1400 may be arranged in a substantially full spherical array configuration. The apparatus may include a substantially spherical surface located therein, on which one or more carriers are configured to move.

Openings 1404 may be formed on portions of the apparatus. Any shape, size, orientation, or configuration of the openings may be contemplated. For example, the openings may be designed to respectively match top and bottom pentagons that resulted from subdivision of an icosahedron. The sizes of the openings may be the same. Optionally, the sizes of the openings may be different. The openings may be located at (diametrically) opposite ends of the apparatus. Alternatively, the openings need not be located at opposite ends of the apparatus. The openings may be formed in any shape and/or size.

Figure 14B:
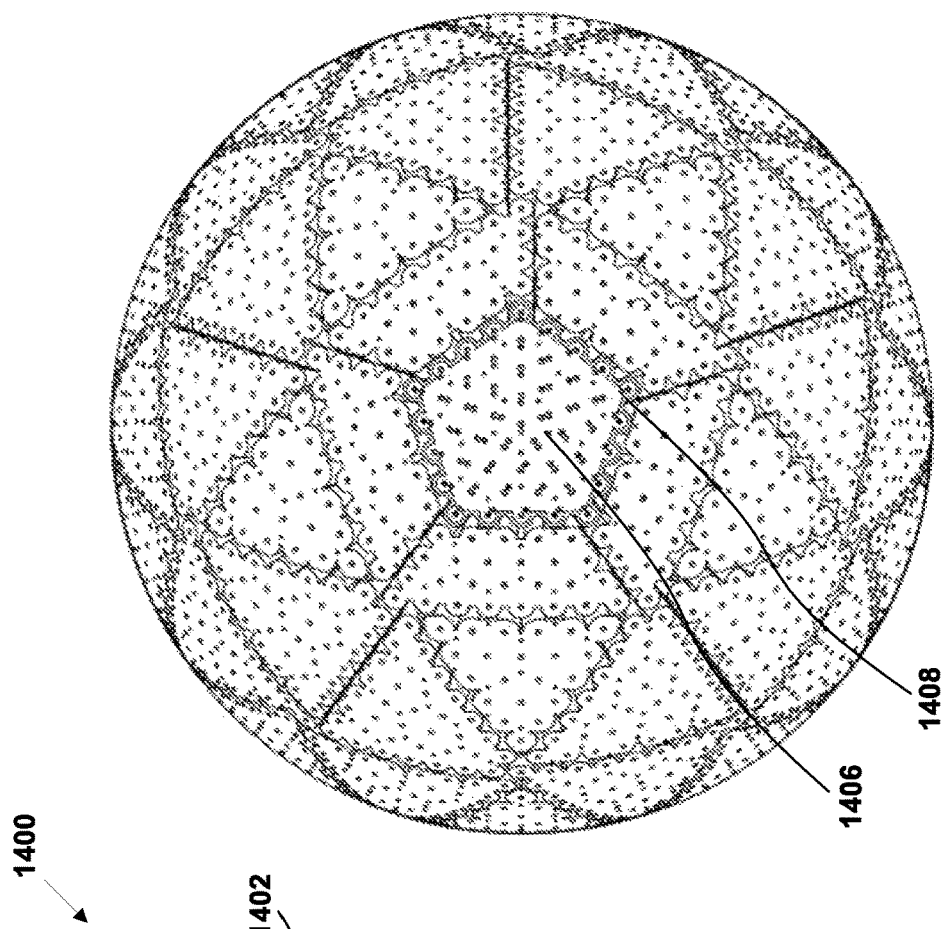
FIGS. 14A and 14B illustrate openings in a substantially spherical surface of an apparatus.
Figure 14A:
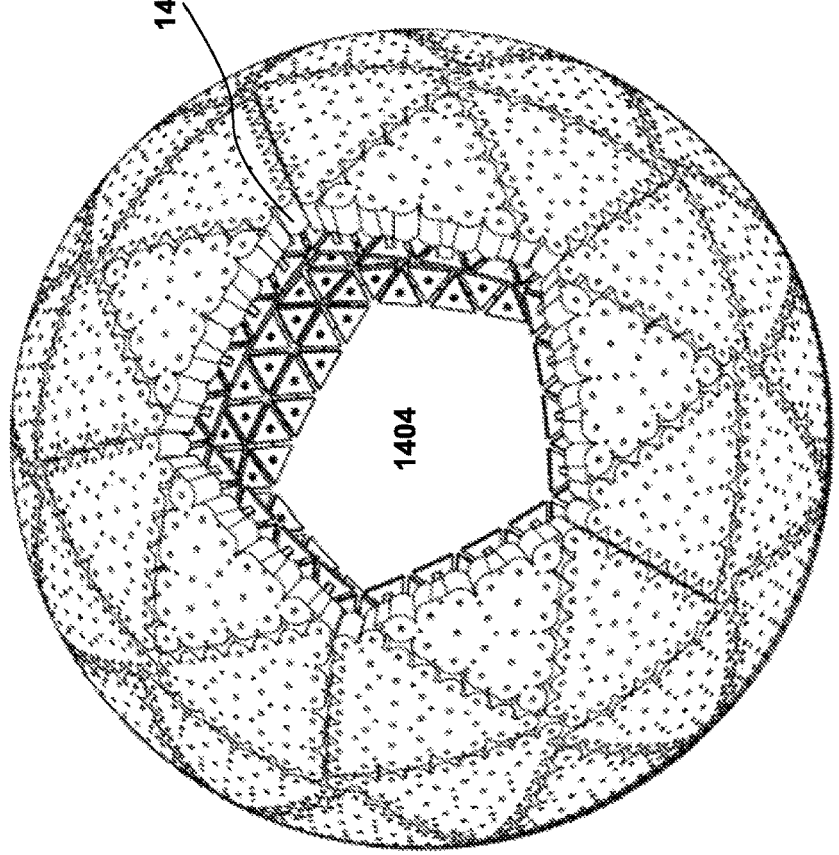

In some cases, an apparatus may also comprise a door that allows an opening to be open or closed. For example, FIG. 14B shows a door 1406 covering an opening 1408. The door can be removed to expose the opening, for example when feeding materials into the apparatus, or transporting materials out of the apparatus. The door can be physically detached from the apparatus. Optionally, the door may be pivoted to the apparatus, and may swivel to open or close the opening.

Figure 16B:
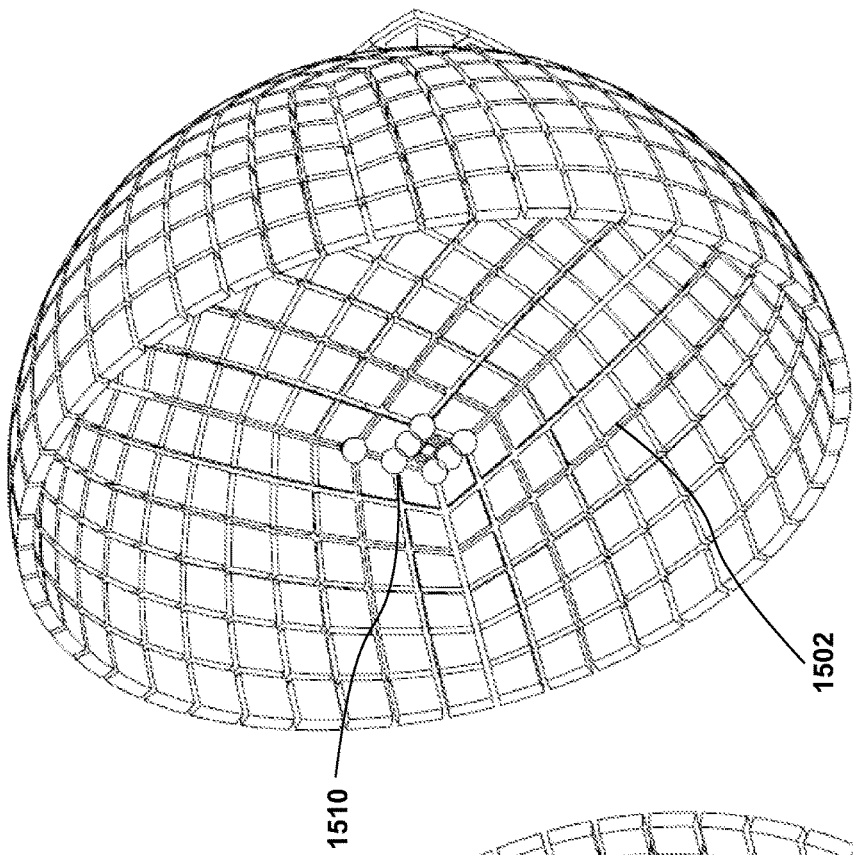
FIGS. 16A and 16B illustrate an apparatus comprising a hemispherical surface in a square grid pattern.
Figure 16A:
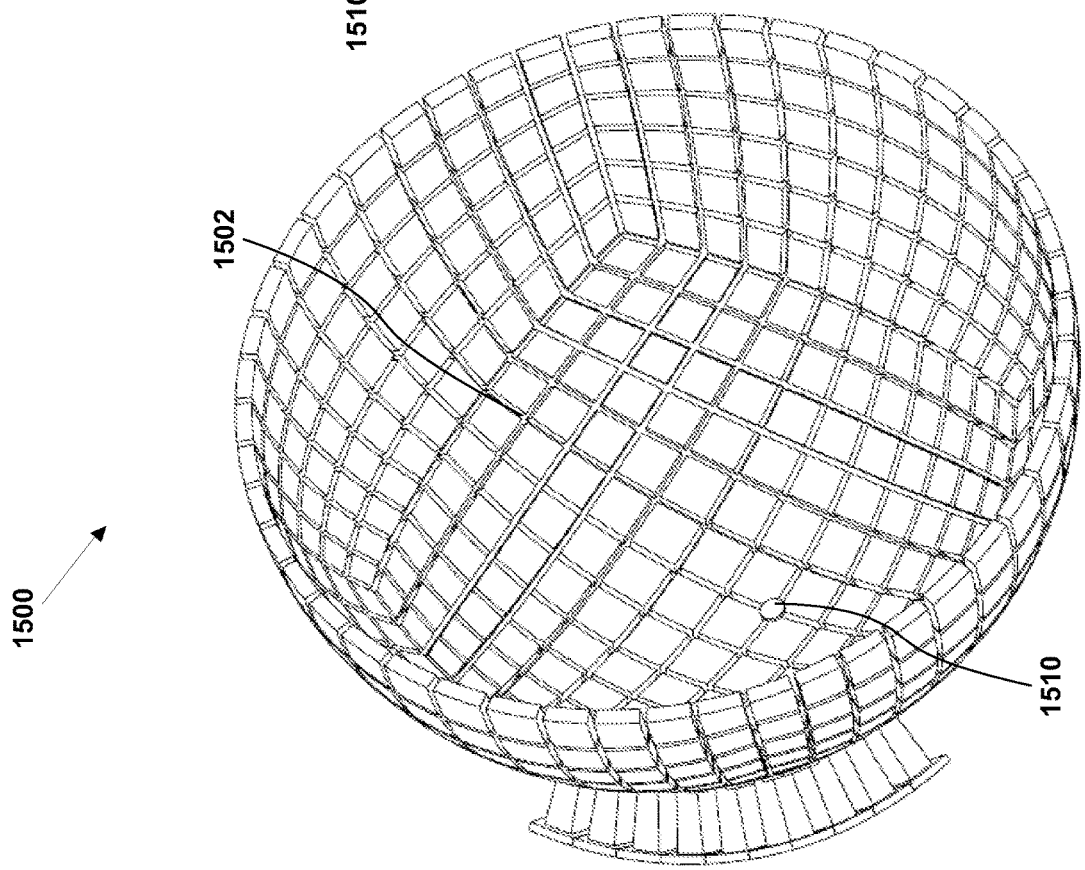

In addition to hexagonal grids, a surface of an apparatus can also be subdivided into a square grid. FIGS. 15, 16A and 16B illustrate an example of an apparatus 1500 comprising a surface 1502 that has a square grid pattern. Here, instead of triangular-shaped carrier guides, the surface may comprise a plurality of substantially square-shaped carrier guides 1504. The carrier guides may be arranged in an orthogonal array (row-column configuration). The surface may be concave. The shape of the surface may be substantially spherical-cubic. The surface may have a 12-subdivision cubic spherical projection. A stator coil array 1506 may be disposed beneath the surface. In the interest of clarity, only a portion of the stator coil array is shown in FIGS. 16A and 16B. The stator coil array may comprise a plurality of stator coils arranged in a 3D configuration, such that the stator coils substantially conform with the curvature of the surface.

The carrier guides are spaced apart from one another by gaps. These gaps are tracks 1508 that provide pathways for one or more carriers 1510 to move on the surface. The gaps can have fixed widths or variable widths. In one example, the gaps can have a width of about 5 mm. In other instances, the gaps may have widths ranging from about 2 mm to about 15 mm.

The carriers may be disposed on the surface. The carriers may be detachably coupled to the surface. The carriers may comprise single disc magnets or a fully magnetized spool. In the depicted configuration, with 1512-1 and 1512-2 representing north and south poles of a single magnet or fully magnetized spool, repulsive energization of the adjacent coils will act on three portions of the carrier drive magnet spool, exerting force on both the widened ends and the central region. Because of this, if all coils underneath the spool are in repulsion the spool will levitate in its guideway. If it is moved by attractive pulses from coils in front, but not yet underneath, and levitated and pushed by repulsive pulses underneath and trailing behind, non-contact or "maglev" motion of the carrier can be attained. The non-contact motion is less problematic in a square grid compared to a polygonal grid (e.g., hexagonal grid). A polygonal grid may include intersections of more than four tracks which may require the open gaps at those intersections to be significantly larger in width/diameter than the tracks themselves. As a result, polygonal grids may have a low force "dead zone" at intersections of multiple tracks, which is less effective in trying to maintain levitation of a carrier over the surface. Generally, grids that have 3-way (triangular) or 4-way (square) intersections can maintain a closer interaction with the underlying driving coils. The interaction of the carrier magnet with the electromagnetic field generated by the stator coils creates a driving force for the carriers. The carrier can move on the surface along the tracks, similar to that shown in FIG. 4E. For example, the carrier can move in straight paths, zig-zag lines, and/or switch directions on the surface. The square grid pattern allows the carriers to switch directions at 90, 180, 270, or 360 degrees, at the intersections between tracks.

The carriers can be moved and controlled to manipulate materials to form an object, such as a 3D braided structure or a 3D printed structure. Optionally, the carriers can be used to transport materials from one point on the surface to another point, or for assembly of components. Examples of materials may include fibers, liquid polymers, powder materials, and/or inks.

B. Unguided Surface

Figure 17:
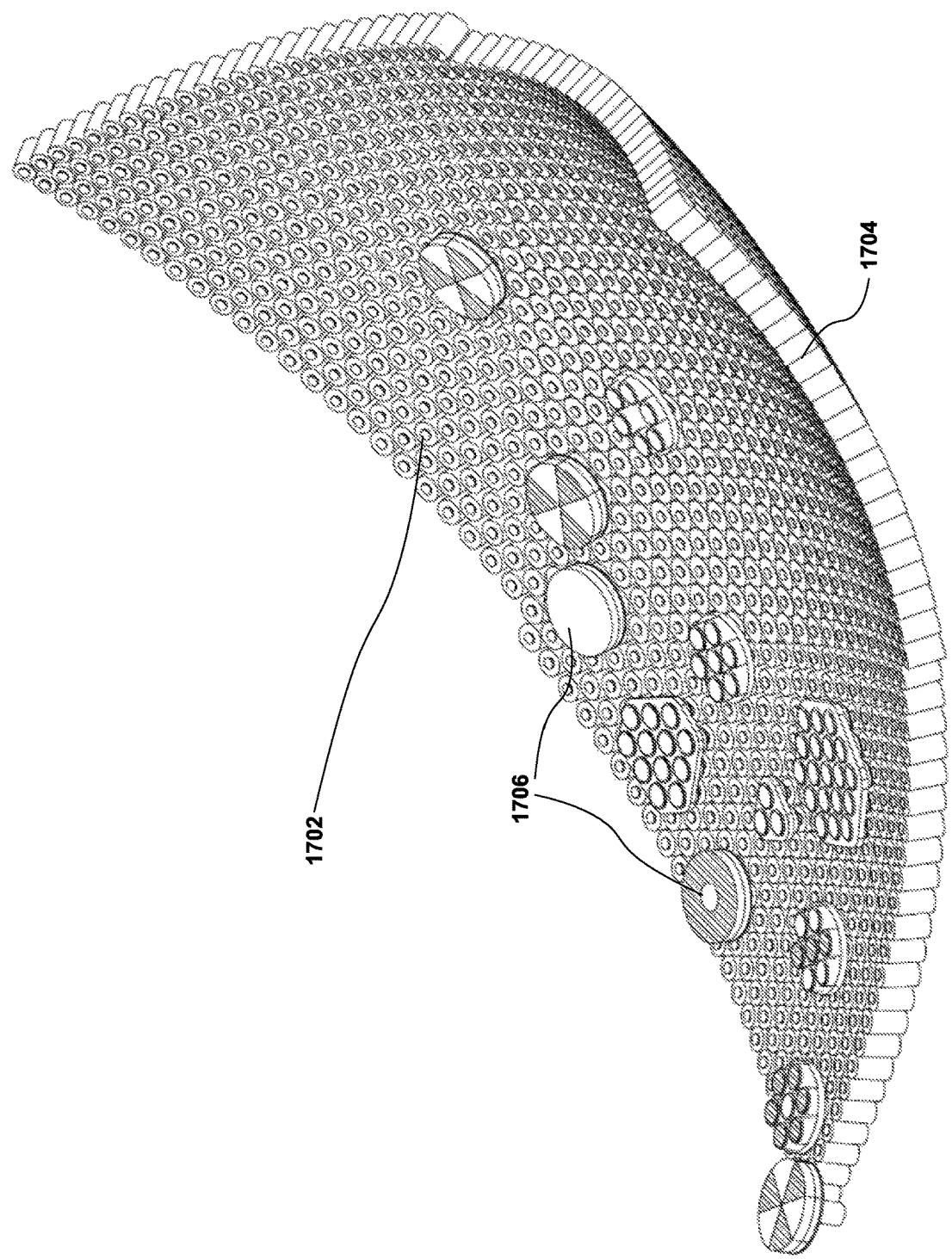
FIG. 17 illustrates an unguided trackless surface and examples of different types of carrier magnets.

A surface comprising tracks for carriers may be described as a guided surface. As previously described, the tracks are formed by the gap spacings between an array of carrier guides. In some cases, an apparatus may comprise an unguided surface. The unguided surface does not have tracks and/or carrier guides. FIG. 17 shows an example of an unguided surface 1702. Essentially, the unguided surface may correspond to the surface directly above the stator coil array 1704. In some instances, the surface can be a trackless bearing layer located above the plurality of stator coils (on an interior of the apparatus).

A plurality of carriers 1706 may be configured to move on the surface. The surface can provide higher carrier path adaptability than a guided/tracked surface, since the carriers are not constrained by tracks and/or carrier guides in their motion. However, the lack of carrier guides may necessitate a higher density stator coil array, so as to mitigate for the loss of field cohesion and reinforced perpendicularity provided by the carrier guides. The increased density in the stator coil array leads to a more controlled electromagnetic field, which can enable higher dynamic speeds and improved carrier versatility and diversity.

Due to the absence of the carrier guides, the magnets on the carriers can be located closer to the stator coil array. For example, a distance of the carriers' driving magnets to the underlying stator coils may be substantially close to zero.

Permanent magnets can be provided on the carriers in different configurations, for example as shown in FIG. 17. The carrier magnets can occlude and be driven by multiple stator coils concurrently. Magnetic poles can be arranged in a variety of patterns on both single and multiple permanent magnets. Both N-S poles can be used in different orientations relative to the driving stator coils. In some examples, a single permanent magnet disc having approximately the same diameter as the stator coils may be used on a carrier. A single, axially magnetized disc magnet may have a diameter that is sufficiently large to overlap three or more stator coils. In other examples, a plurality of magnets (or a magnet with a plurality of co-planar adjacent pole surfaces) may be disposed on a carrier in an arrangement such that the magnet(s) can interact with the electromagnetic fields generated by multiple stator coils simultaneously. The strength and configuration of the magnet(s) may be determined such that the carriers can maintain alignment and adhesion on the surface during motion (without losing alignment or being ejected from the surface).

V. Control Systems

A controller may be provided to control the stator coil array. The controller can activate one or more stator coils to generate an electromagnetic field. The controller can drive a carrier on a surface of the apparatus by changing the electromagnetic field. The controller can also drive the carrier on the surface to move in three dimensions, along a predetermined path. In some cases, the controller can detect a position and/or motion of the carrier. Optionally, the position and/or motion of the carrier can be detected using one or more sensors including magnetic field sensors, optical sensors, and/or inertial sensors.

The stator coil array may comprise a plurality of stator coils. The stator coils can be grouped into subsets of coils with corresponding control volumes. For example, the stator coils may comprise a first subset of coils, a second subset of coils, and so forth. Any number of subsets of stator coils may be contemplated. Each subset may comprise a number of stator coils. Different subsets may comprise the same or different numbers of stator coils. Any number of stator coils within each subset, and for different subsets, may be contemplated.

A control volume may be associated with a subset of stator coils, and defined by the space above the corresponding subset of coils. In some cases, adjacent control volumes may overlap each other to form a continuous control volume. A size and/or shape of the control volumes can be modified by adjusting the locations of the stator coils. The size and/or shape of the control volumes can also depend on the tolerance, sensitivity, position, and/or orientation of the stator coils. The size and/or shape of the control volumes can be adjusted to optimize the magnetic flux uniformity therein, which can help to improve interaction with a magnet disposed on a carrier.

Each subset of stator coils can be configured to generate an electromagnetic field in a control volume associated with the corresponding subset of stator coils. Each control volume may be defined by a space proximate to the corresponding subset of stator coils. The control volumes may or may not overlap with one another. In some embodiments, each control volume may comprise a local coordinate frame. Accordingly, the position and/or orientation of a carrier can be obtained based on the local coordinate frames, as the carrier moves on the surface from one control volume to the next control volume.

The controller may be configured to provide electrical current pulses to the stator coils to generate an electromagnetic field over the control volume for each subset of stator coils. The controller can selectively activate (power on) different subsets of stator coils to generate electromagnetic fields in different control volumes, by controlling one or more switches to the coils via a switch module operably coupled to the stator coils. Electrical current pulses can be provided from the controller to different subsets of stator coils via one or more switches in the switch module.

The switches may include electronic switches such as power MOSFETs, solid state relays, power transistors, and/or insulated gate bipolar transistors (IGBTs). Different types of electronic switches may be provided for controlling current to a subset of stator coils. An electronic switch may utilize solid state electronics to control current flow. In some instances, an electronic switch may have no moving parts and/or may not utilize an electro-mechanical device (e.g., traditional relays or switches with moving parts). In some instances, electrons or other charge carriers of the electronic switch may be confined to a solid state device. The electronic switch may optionally have a binary state (e.g., switched-on or switched-off). The electronic switches may be used to control current flow to the subsets of stator coils.

The controller can control the switches to activate one or more subsets of stator coils to generate electromagnetic fields in one or more control volumes. In some cases, a plurality of subsets of stator coils may be activated simultaneously. For example, the controller can simultaneously activate three subsets of stator coils to create three separate electromagnetic fields in the respective control volumes. Alternatively, a plurality of subsets of stator coils may be activated in a sequential manner. For example, the controller can sequentially activate three subsets of stator coils to sequentially generate electromagnetic fields in the respective control volumes.

The selective activation of electromagnetic fields within different control volumes may prevent interfering electromagnetic fields from being generated, and may reduce electromagnetic interference between the stator coils and other devices. Reduction in electromagnetic interference can improve the accuracy and sensitivity with which a carrier can be tracked in the different control volumes. The range of use of the apparatus can be extended by modifying the configuration of the stator coils to enable different and complex carrier motion paths.

The movement of a carrier on a surface of the apparatus can be facilitated by activating different subsets of stator coils. In some embodiments, different subsets of stator coils can be selectively activated depending on the location of the carrier on the surface. In some cases, stator coils that lie outside of the active subset(s) of stator coils may be rendered inactive, thereby preventing interfering electromagnetic fields from being generated. In some embodiments, the control volumes above adjacent subsets of stator coils may overlap so as to form a continuous global control volume over the surface of the apparatus.

The controller may be provided on or with the apparatus. Alternatively, the controller may be provided remotely from the apparatus. For example, the controller may be provided at a remote server that is in communication with the subsets of stator coils and the switch module. The controller may have software and/or hardware components included with the server. The server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

The controller may also be provided at any other type of external device (e.g., a remote controller for controlling the apparatus, any movable object or non-movable object, etc.). In some instances, the controller may be distributed on a cloud computing infrastructure. The controller may reside in different locations, where the controller is capable of controlling the switch module and selectively activating one or more subsets of stator coils based on the spatial or motion information of the carrier.

In some examples, a position sensor may be disposed on a carrier. The position sensor may be configured to generate an electrical signal (voltage or current signal) in response to changes in the electromagnetic fields generated by one or more subsets of stator coils. In some cases, the position sensor may be an electromagnetic sensor. As the position sensor moves within a control volume on the surface of the apparatus, the interaction of the position sensor with the electromagnetic field in the control volume may cause electrical signals to be generated. The electrical signals may vary as the position sensor moves between different locations within the control volume. Additionally, the electrical signals may vary as the position sensor moves between different control volumes. The controller may be configured to receive electrical signals from the position sensor. Additionally, the controller may analyze the signals to compute a local position of the position sensor. The local position of the position sensor may be computed relative to a local coordinate system. The local coordinate system may be defined at an active subset of stator coils corresponding to the control volume in which the position sensor is located. The controller may also be configured to compute a global position of the position sensor relative to the surface of the apparatus. The controller may be configured to control the switch module based on one or more inputs. The inputs may be provided by a user, and may include a set of instructions for controlling activation of the stator coils, so as to effect movement of the carrier along a path on the surface of the apparatus. The control of the switch module, and the selective activation of one or more subsets of stator coils, can be manual or automatic.

As described above, the controller can be configured to selectively activate one or more subsets of stator coils to generate electromagnetic fields in the corresponding control volumes. A carrier may comprise one or more permanent magnets. The controller can be configured to drive the carrier by adjusting a strength and/or polarity of the electromagnetic fields, by adjusting the electrical currents delivered to the one or more subsets of stator coils. The controller can be configured to adjust a timing, magnitude, direction, and/or duration of the electrical currents delivered to one or more subsets of stator coils. The controller may be configured to adjust the strength and/or polarity of the electromagnetic fields based on: (1) an orientation of the surface of the apparatus relative to gravity, (2) a mass of the carrier, and/or (3) an orientation of the carrier on the surface of the apparatus relative to gravity. The controller can be configured to drive the carrier on the surface of the apparatus at a constant speed or at variable speeds. For example, in some cases, the controller can drive the carrier on the surface of the apparatus at a speed of about 0.5 m/s. In other instances, the controller can be configured to drive the carrier on the surface of the apparatus at variable speeds ranging from about 0.1 m/s to about 1.5 m/s. The carrier may be configured move at varying speeds as it moves from one stator coil (or a subset of coils) to the next stator coil (or next subset of coils). The speed at which at the carrier can be driven may depend on the strength of the electromagnetic field generated by the stator coils, as well as the strength of a magnet disposed on the carrier. The controller can adjust the strength of the electromagnetic field by adjusting the current delivered to the stator coils.

The controller can be configured to track a carrier, by detecting changes in the electrical currents delivered to one or more subsets of stator coils as the carrier moves about on the surface of the apparatus. The changes in the electrical currents may result from changes in resistance of the one or more subsets of stator coils as the magnet on the carrier moves through the electromagnetic fields. The controller can be configured to move the carrier to a predetermined position on the surface of the apparatus upon detecting abnormal changes in the electrical currents. The abnormal changes in the electrical currents may be indicative of (i) a malfunction of the apparatus, (ii) incorrect motion paths (e.g., misalignment) of the carrier, and/or (iii) an imminent collision between the carrier and another carrier or accessory device.

In some examples, the controller can be configured to detect fluctuations in the current that powers the stator coils to drive a carrier, and to distinguish between successful and unsuccessful locomotion (movement) of the carrier based on the detected current fluctuations. By monitoring the current in a drive circuit, unsuccessful movement pulses may be detected. For example, the passage, or lack of passage, of a permanent magnet in the carrier traveling over the stator coil can alter the coil's resistance, which can cause the drive current to fluctuate. When the controller detects unsuccessful locomotion (lack of movement) of the carrier, the controller may cause the apparatus to go into a fault control state in which power delivery to the stator coils is terminated. The controller may subsequently initiate a series of mitigation steps, which may include pre-programmed attempts to return the carrier to its intended location or a default home location. The fault control state and/or mitigation steps can prevent collisions of multiple carriers that may result in catastrophic failure of the apparatus (e.g., damage to the carrier guides, tracks, and/or underlying stator coils)

One or more sensors may be configured to generate sensing signals in response to changes in the electromagnetic fields as the carrier moves on the surface of the apparatus. The sensors may comprise electromagnetic sensors, optical sensors, inertial sensors, and/or radio frequency (RF) sensors. The controller may be configured to determine a spatial position, orientation, and/or motion of the carrier on the surface, using the sensing signals. The motion of the carrier can be determined based on a velocity and/or an acceleration obtained from the sensing signals. The velocity may include a linear velocity and/or angular velocity. Likewise, the acceleration may include a linear acceleration and/or angular acceleration. The controller can be configured to track the carrier using the sensing signals. The controller can also control the motion path of the carrier on the surface of the apparatus, by selectively activating one or more subsets of stator coils in a predetermined sequence and/or based on the sensing signals. The controller may be configured to deactivate one or more subsets of stator coils that are not needed, or that are no longer useful, for driving the carrier on the surface.

One or more of the sensors may be disposed in a spacing between adjacently-spaced stator coils. Additionally or optionally, one or more of the sensors may be mounted to or disposed within one or more carrier guides. In some cases, one or more of the sensors may be embedded in through-holes located at the centers of the stator coils. Any placement or configuration of sensors in or on the apparatus may be contemplated.

Communications may be provided between one or more stator coils and a carrier. For example, a first communication unit may be disposed on top of, or laterally adjacent to a stator coil. A second communication unit may be disposed on a carrier. The first and second communication units may be in communication with each other. The first communication unit may comprise one or more transceivers for transmitting signals to and receiving signals from the second communication unit. Information transmitted and/or received between the first and second communication units may include: (1) the positional information of the carrier relative to different stator coil(s), and/or (2) signals to communicate tow tensioning and rewind commands or other commands for various carrier mounted devices. This may be useful for carriers that have electronic bobbin tensioning and winding systems. The second communication unit may include a passive radio transponder or an onboard microprocessor configured to relay signals to the underlying stator coil(s) directly underneath as the carrier moves on the surface of the apparatus. In some instances, a plurality of carriers having second communication units may be provided. Each second communication unit may be configured to generate a radio frequency identification (RFID) key for each of the carrier. Accordingly, individual identification can be granted to each carrier, and different carriers can be distinguished from one another based on their RFID keys. The position and/or motion of each individual carrier can also be tracked based on its RFID key.

Figure 18:
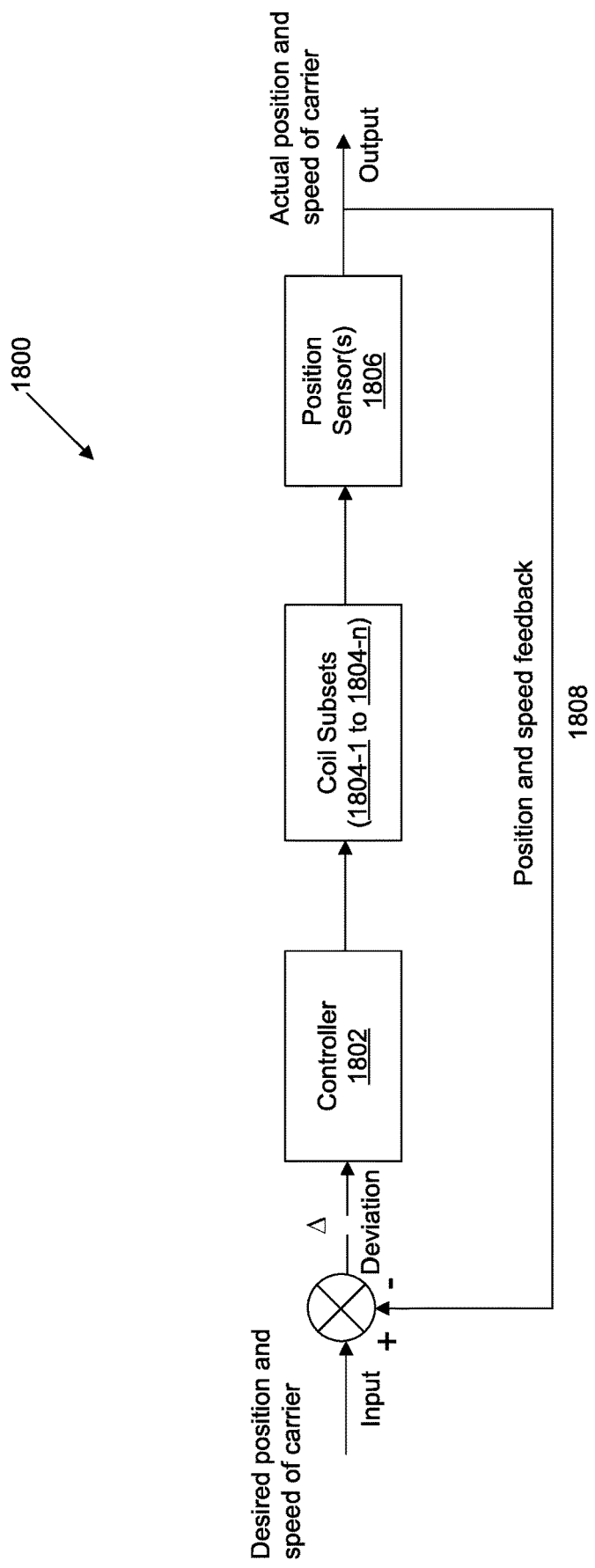
FIG. 18 illustrates a block diagram of a control system for controlling the electromagnetic field of an apparatus.

FIG. 18 illustrates a block diagram of a control system 1800. The control system may comprise a controller 1802, a plurality of subsets of stator coils 1804-1 through 1804-n, and one or more sensors 1806 that are operably connected together via a feedback loop 1808. Any number n of subsets of stator coils may be contemplated, and may depend in part on the strength of each subset of stator coils and/or a size (e.g., diameter, depth, etc.) of a surface of the apparatus. One or more carriers can be configured to move on the surface of the apparatus.

The controller may be configured to control and track the position and/or movement of a carrier, and selectively activate one or more subsets of stator coils, based on positional and speed feedback obtained from the sensors as the carrier moves between on the surface of the apparatus.

Referring to FIG. 18, an input may be initially provided to the control system. The input may comprise a desired path (which may include a desired position and/or speed) of a carrier. The controller may be configured to activate one or more subsets of stator coils, and determine a location of the carrier. Once the location of the carrier has been determined, one or more subsets of stator coils corresponding to the control volume(s) at or proximate to the location of the carrier may be activated (powered on). As previously described, different subsets of stator coils can be activated, which can reduce power consumption and electromagnetic field interference effects. The position and/or movement of the carrier may be determined based on sensing signals obtained by the sensors. The sensing signals may be generated by the sensors as the carrier moves on the surface of the apparatus. The actual path (which may include an actual position and/or speed) of the carrier may be determined based on the sensing signals, and may be compared against the input to determine an amount of deviation A (if any) from the desired path (desired position and/or speed). The controller may be configured to adjust the actual position and/or speed of the carrier by adjusting the currents and selectively delivering the currents to the stator coils, based on the amount of deviation A. Accordingly, a carrier can be controlled to move in a desired path on the surface of the apparatus using the control system of FIG. 18. The system can be configured to control the paths of a plurality of carriers and track the motion of each individual carrier as the carriers move on the surface of the apparatus.

Figure 19:
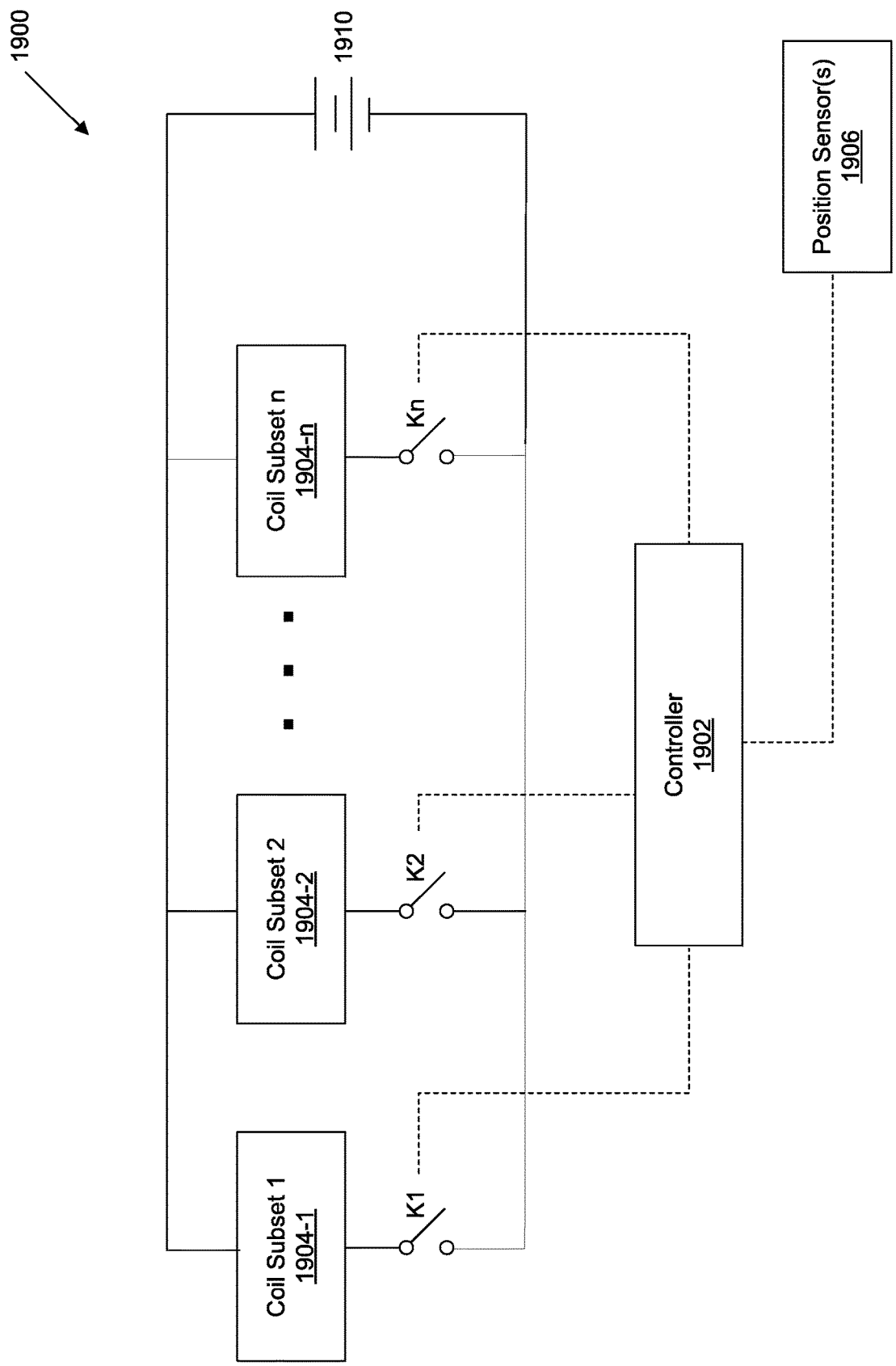
FIG. 19 illustrates a schematic circuit diagram of a control system.

FIG. 19 illustrates a schematic circuit diagram of a control system. Referring to FIG. 19, a control system 1900 may comprise a plurality of subsets of stator coils 1904-1 through 1904-n electrically connected to a power supply 1910. A controller 1902 may be in operable communication with a plurality of switches K1 through Kn, and one or more sensors 1906. The switches K1 through Kn may be located in a switch module. The controller can be configured to selectively activate one or more subsets of stator coils, either simultaneously, sequentially, alternately, or in a round-robin configuration, based on a position and/or movement of a carrier as the carrier moves on the surface of the apparatus.

The controller may be configured to control one or more switches to selectively activate one or more subsets of stator coils. For example, the controller may selectively activate the first subset of stator coils 1904-1 by closing the switch K1. Similarly, the controller may selectively activate the second subset of stator coils 1904-2 by closing the switch K2. The controller may selectively activate an nth subset of stator coils 1904-n by closing the switch Kn. In some cases, the controller may simultaneously activate two or more subsets of stator coils. For example, the controller may simultaneously activate the first and second subsets of field generator coils and by closing the switches K1 and K2. Alternatively, the controller may simultaneously activate the first and nth subsets of stator coils and by closing the switches K1 and Kn. Optionally, the controller may simultaneously activate all of the subsets of stator coils 1904-1 through 1904-*n*, by simultaneously closing the switches K1 through Kn. The controller may sequentially close the switches K1 through Kn. Alternatively, the controller may close the switches K1 through Kn in an alternating manner. The controller may close one or more of the switches at a same frequency or at different frequencies. The controller may close/open one or more switches for different lengths of time, so as to activate or power off the subsets of stator coils for different lengths of time. Accordingly, the electromagnetic fields generated by the plurality of stator coils can be controlled in a precise manner, to drive one or more carriers on the surface of the apparatus.

A spherical or hemispherical electromagnetic field has gravity in different vectors (relative to the local field normal) in different areas. Accordingly, locomotive current pulse(s) may be delivered with different timing and current magnitude to different stator coil locations (or subsets of coils), depending on where a carrier is located on the spherical surface of the apparatus and how the spherical surface is being oriented relative to gravity. In some instances, if a stator coil has sufficient magnetic mass, the carrier may not fall due to gravity (when it is perpendicular to the field normal) when the coil is in an unpowered state. However, steering the carrier along proper tracks at dynamic speeds may require different stator coil electromagnetic forces, and may depend on the vector of gravity.

As previously described, distances between adjacently-spaced stator coils may not be the same over the surface of the apparatus, due to the slightly irregular nature of icosahedral tessellation. The grid irregularities can be compensated by using larger coil diameters at the center of the icosahedral face, and smaller coil diameters toward points where node density increases. The activation of the stator coils (or control signals to the stator coils) may take into consideration the differences in coil spacing and diameters, so as to effect more precise control over the carrier path and movements.

VI. 3D Manipulation of Materials

Figure 20:
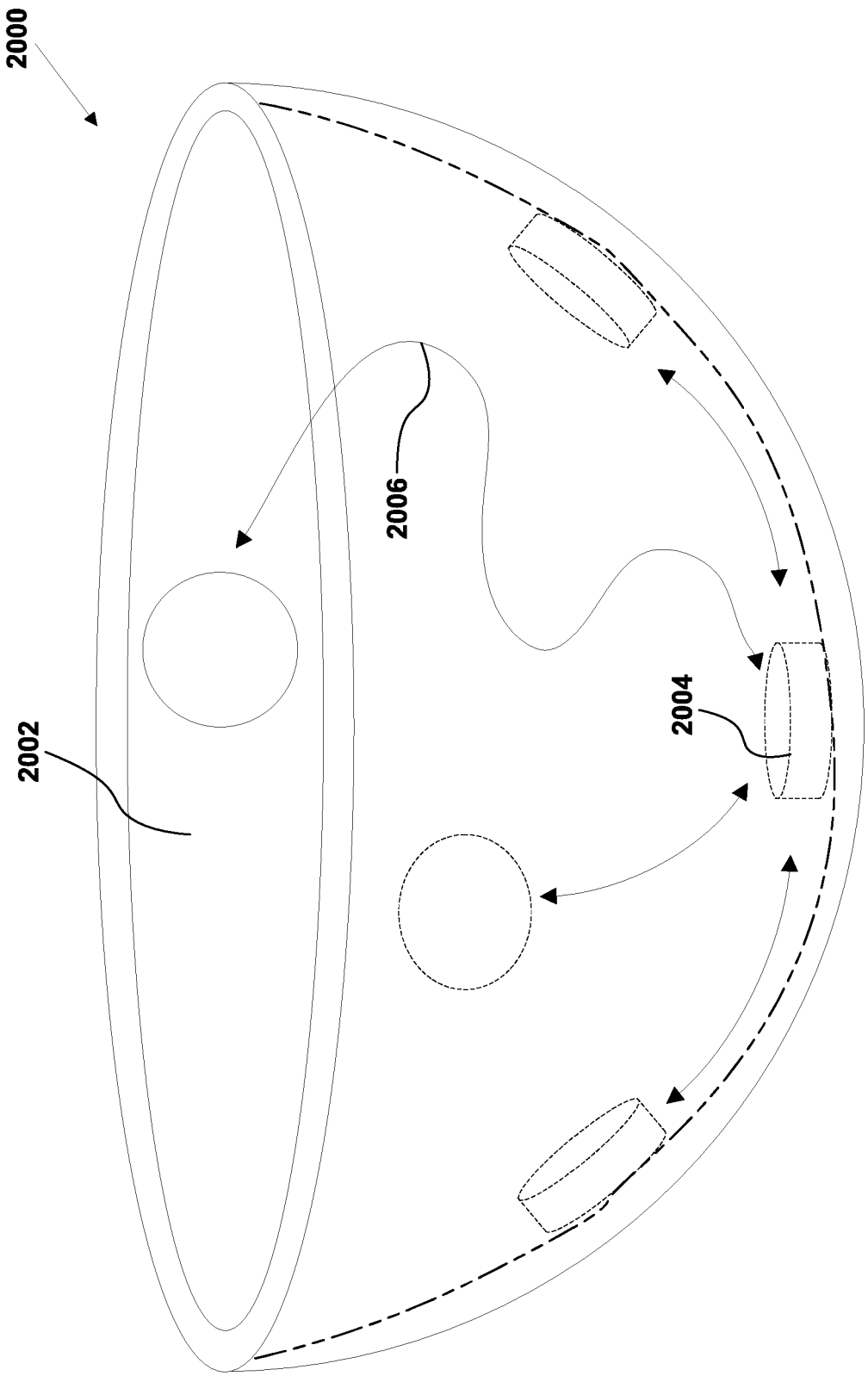
FIG. 20 illustrates examples of different motion paths of a carrier on a surface of an apparatus.

FIG. 20 illustrates different movements of a carrier 2004 on a surface 2002 of an apparatus 2000. The surface may be an inner surface of the apparatus. The apparatus and surface may include one or more of the previously-described examples. The carrier can be driven in a translational, rotational, or curvilinear manner on the surface. The carrier can also be driven to move in different directions on the surface. For example, an electromagnetic field generated by a stator coil array can be used to drive the carrier in different directions. The directions can be parallel, orthogonal, opposite, or oblique to one another. The carrier can be driven out-of-plane in three dimensions on the surface. Alternatively, the carrier can be driven in-plane in two dimensions on a planar surface. The carrier can be driven from one point to another point on the surface. In some examples, the carrier can be controlled to move along a predefined motion path. The path may be a closed loop or an open-end loop. In some cases, a plurality of carriers can be controlled to move on the surface along a series of motion paths 2006 that may intersect with one another at different points in time. This can be useful, for example, in 3D braiding applications in which yarn or fiber is braided in complex 3D patterns.

The carrier can be configured to carry or dispense materials such as fibers, liquid polymers, powder materials, and/or inks, either directly or using a device attached to the carrier. As described below, a plurality of carriers can be driven on the surface to manipulate materials to form objects, such as 3D braided structures or 3D printed structures. The carriers can also be used to transport and/or assemble components.

A. 3D Braiding

Figure 21A:
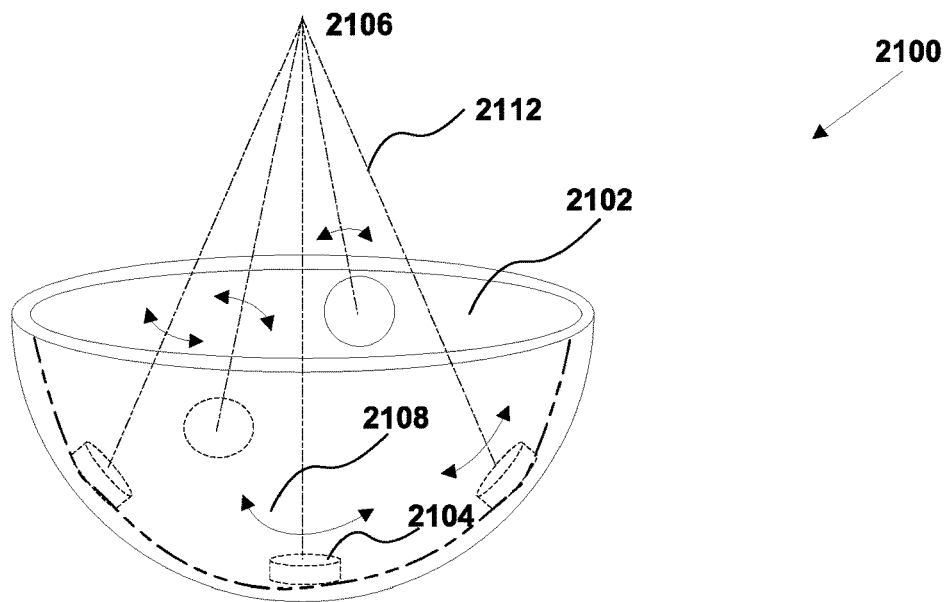
FIGS. 21A and 21B illustrate a 3D braiding operation using the disclosed apparatus.
Figure 21B:
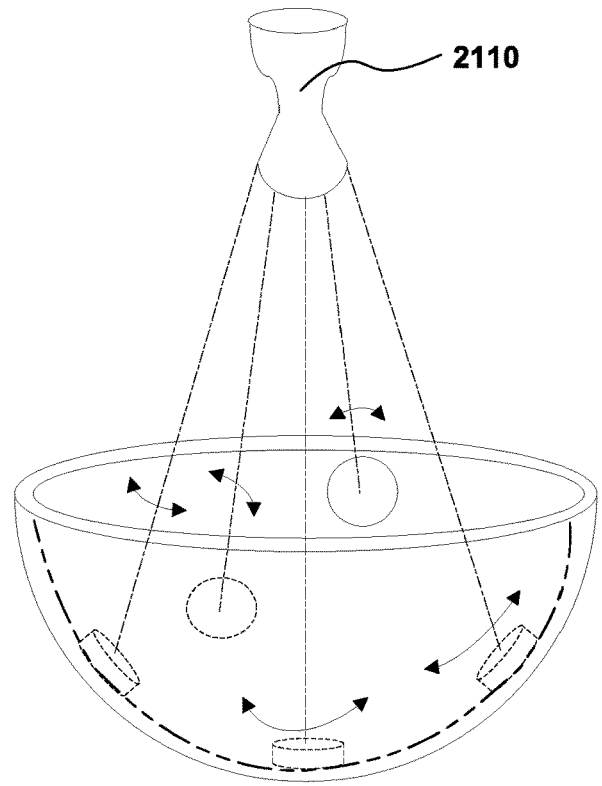

FIGS. 21A and 21B illustrate an example of 3D braiding using the apparatus and methods described elsewhere herein. A plurality of carriers 2104 may be disposed on a surface 2102 of an apparatus 2100. The carriers may be configured to support a plurality of bobbins (not shown). Fiber 2112 may be fed via the bobbins to a braiding point 2106 at which the braiding process takes place. At the braiding point there may reside a braiding ring. The surface of the apparatus may comprise a plurality of carrier guides (not shown) that are substantially equidistant from the braiding point or ring. The distances of the carriers to the braiding point may remain substantially the same as the carriers move about the surface. This equidistance aids in maintaining line tension of the fibers during the braiding process. In some examples, the distance of each carrier guide to the braiding point may be about 100 mm to about 600 mm. Alternatively, the distance of each carrier guide to the braiding point may be less than 100 mm or greater than 600 mm. Optionally, the distance of each carrier guide to the braiding point may be on the order of 1 m, 2 m, 3 m, 4 m, 5 m, or more than 5 m.

The hemispherical shape of the surface provides improved flexibility for moving the carriers in-plane and out-of-plane. This can allow complex-shaped 3D braided structures to be formed. The 3D braided structures may include objects having continuous profiles (e.g., I-beams, L-beams, aircraft buttresses, etc.), as well as objects that do not have continuous profiles (e.g., having amorphous shapes or volumes). Referring to FIGS. 21A and 21B, a 3D braided structure 2110 can be formed by controlling the bobbin-carriers to move on the surface in various motion paths 2108. The motion paths of the carriers may intersect at different points in time to create the 3D braided structure. Since the surface is substantially hemispherical, the carriers remain substantially equidistant to the braiding point, regardless of the motion or location of the carriers anywhere on the surface. Accordingly, the line tension of the fibers can be maintained as the bobbin-carriers move about in different directions and along complex motion paths on the surface. Adequate line tensioning can lead to improved quality and reliability of the 3D braided structure.

B. 3D Printing

Figure 22A:
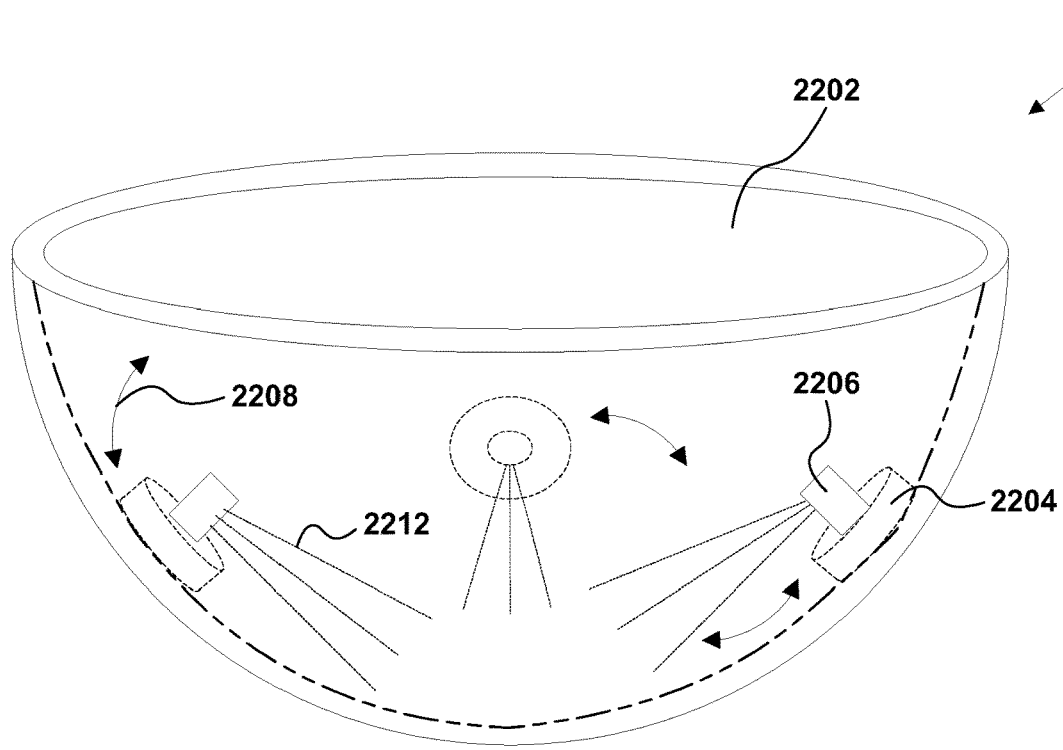
FIGS. 22A and 22B illustrate a 3D printing operation using the disclosed apparatus.
Figure 22B:
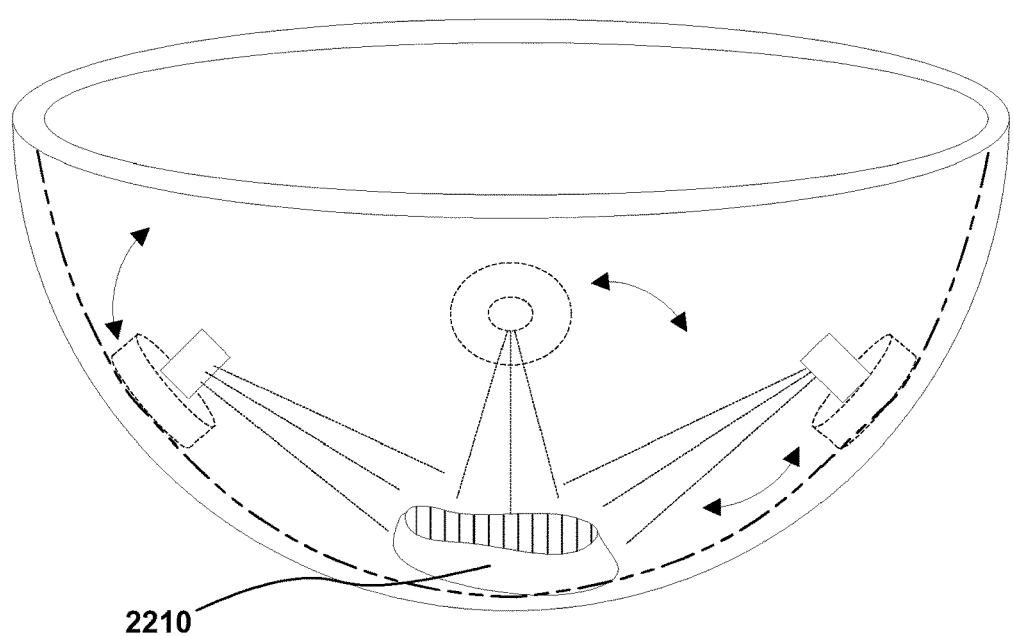

FIGS. 22A and 22B illustrate an example of 3D printing using the apparatus and methods described elsewhere herein. A plurality of carriers 2204 may be disposed on a surface 2202 of an apparatus 2200. The carriers may be configured to support one or more types of non-fiber carrying devices 2206. Example of non-fiber carrying devices may include material sprayers, matrix injectors, jet dispensers, etc. The non-fiber carrying devices 2206 may be configured to generate a 3D printed structure 2210, for example by dispensing a material 2212 (e.g., powder materials or inks) as the carriers move about on the surface of the apparatus in various motion paths 2208. As previously mentioned, the hemispherical shape of the surface provides improved flexibility for moving the carriers in-plane and out-of-plane, which may allow complex-shaped 3D printed objects to be formed.

C. Transportation and Assembly of Components

In addition to 3D braiding or 3D printing, the apparatus and methods disclosed herein may be used for materials conveyance or parts assembly. The carriers may be configured to support assembly robots. The assembly robots can be used to assemble components to form a finished or unfinished product. Mobility to the assembly robots is provided by the carriers which can be controlled to move on the surface of the apparatus in various motion paths. The assembly by the robots may include mechanical and/or electrical coupling (attachment) between various components. The assembly can also be accomplished by robots mounted externally to the field, for example, that are configured to add integrated sub-components to a braided structure during carrier weaving operations.

Figure 23:
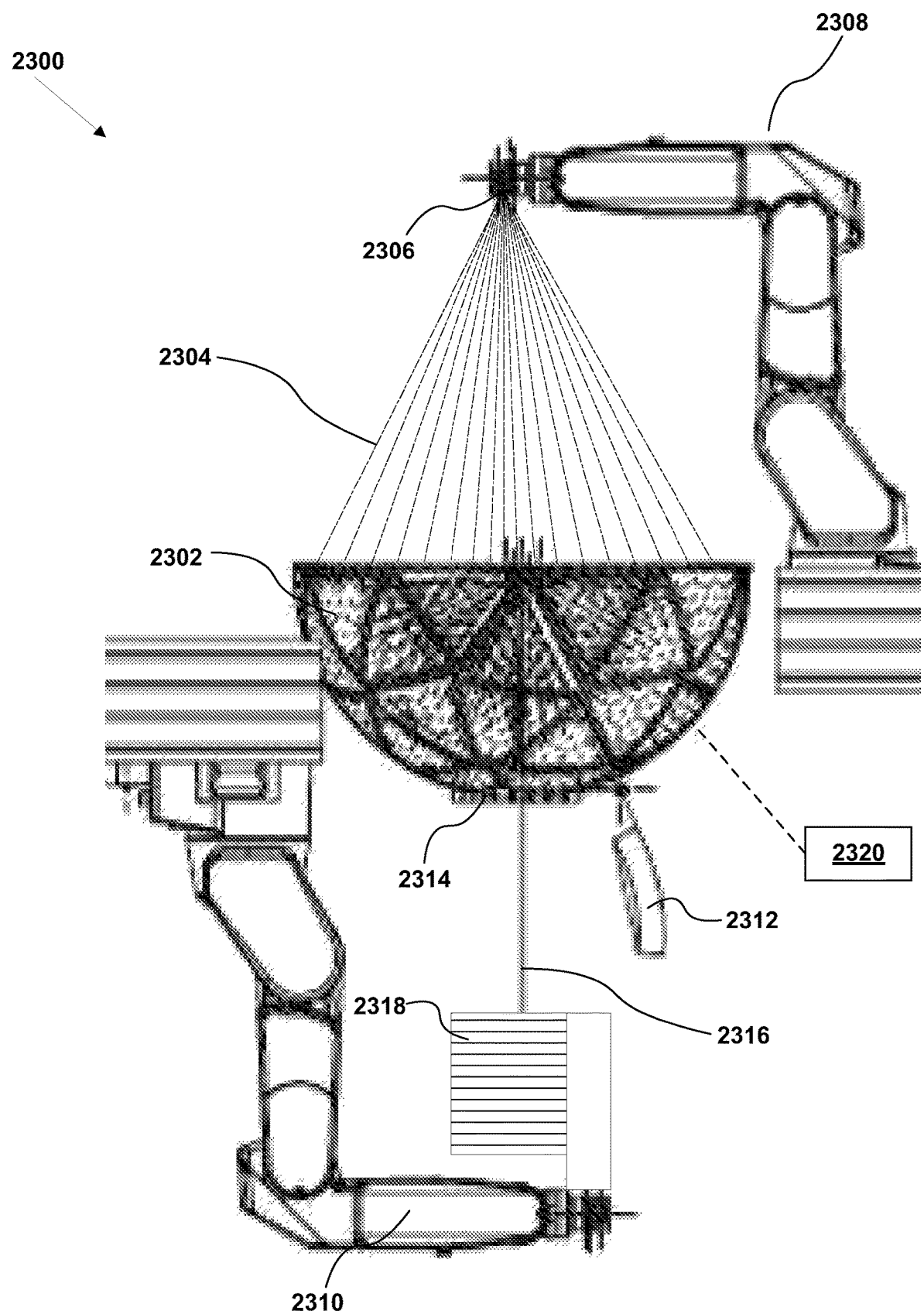
FIG. 23 illustrates a system comprising an apparatus.

FIG. 23 illustrates a system 2300 comprising an apparatus 2302. The apparatus may correspond to those described elsewhere herein. The system can be used in a manufacturing environment to create an object, for example a 3D braided structure. Referring to FIG. 23, the apparatus may comprise a hemispherical inner surface. A plurality of carriers (not shown) may be disposed on the surface. The carriers may be configured to support a plurality of bobbins (not shown). Fiber 2304 may be fed via the bobbins to a braiding point 2306 at which the braiding process takes place. The braiding point may be located on an upper robotic arm 2308. A lower robotic arm 2310 may be configured for arbor/core insertion. The lower robotic arm may be configured to grasp an active workpiece in unified motion with the upper robotic arm to provide greater positional rigidity to the workpiece, in resistance to other forces such as braiding line tensions and other robots manipulating lines and other objects associated with the workpiece. The objects may include inserted subcomponents, externally attached shells/mold components, etc. In some examples, a test assembly may include a plurality of assembly robots stationed around the field. The apparatus may comprise a door 2312 that can open or close an opening 2314 on a bottom surface of the door 2312. Additional fiber 2316 may be fed into and out of the apparatus through the opening 2314. Magazines of loaded carriers 2318 can be delivered into the field through the door, and empty magazines can be extracted from the field through the door. A field attachable magazine with internal field/stator coils may be configured for self-loading and unloading to and from the field. In some cases, a removable hole portion of the apparatus may also serve as a carrier magazine.

The surface of the apparatus may comprise a plurality of carrier guides (not shown) that are substantially equidistant from the braiding point 2306. The distances of the carriers to the braiding point may remain substantially the same as the carriers move about the surface. This equidistance aids in maintaining line tension of the fibers during the braiding process.

During the 3D braiding operation, the braided structure may be continuously retracted and collected, for example by another robotic arm (not shown). A controller 2320 may be configured to activate one or more stator coils of the apparatus to generate an electromagnetic field for driving the carriers on the surface of the apparatus, as described elsewhere herein. It should be appreciated that the apparatus described herein can be extended for use in other applications and in different configurations, and need not be limited to the setup shown in FIG. 23.

Figure 24:
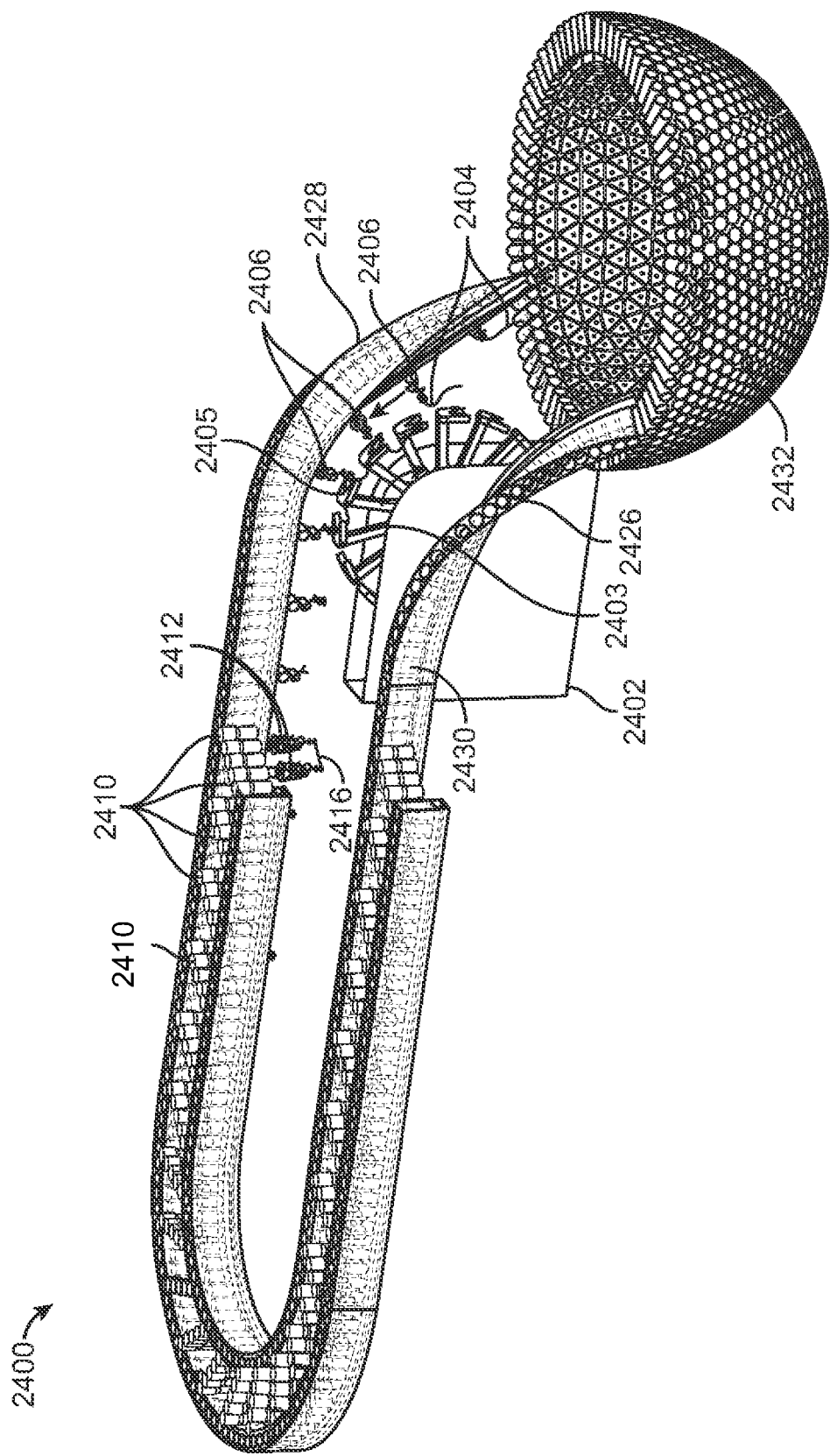
Figure 26A:
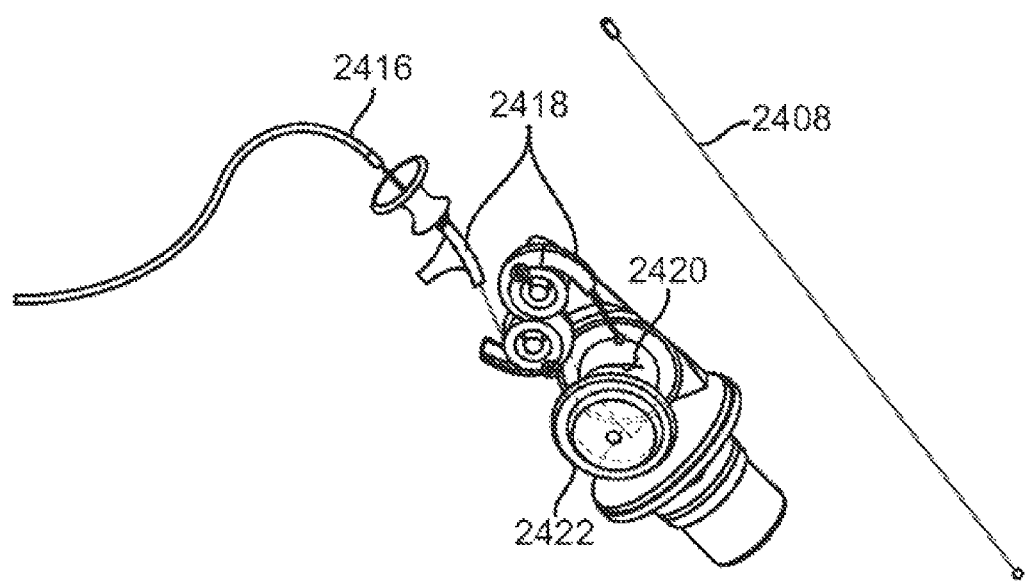
FIGS. 26A, 26B, 27A and 27B illustrate examples of lacing needle setups.
Figure 26B:
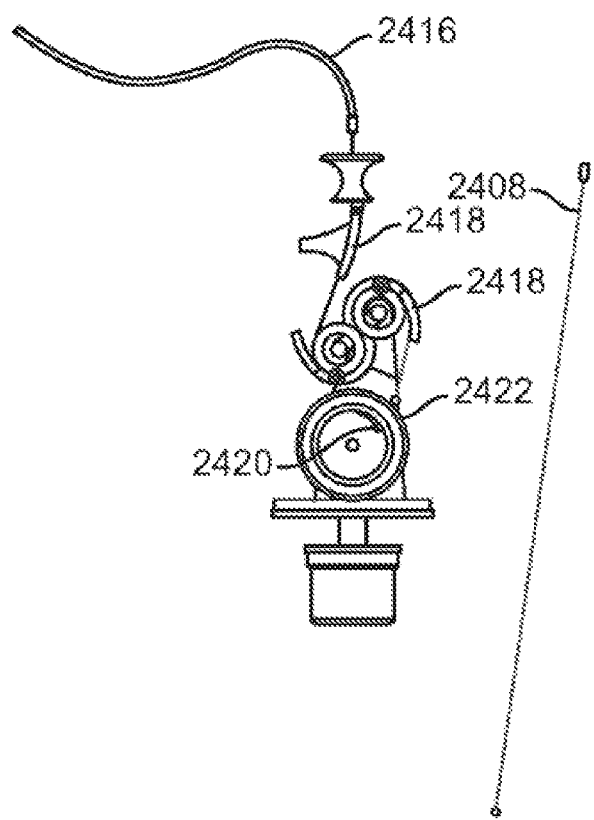

FIG. 24 illustrates a carrier loading system 2400 in accordance with some embodiments. The system may include, and/or may be used with any of the apparatus or manufacturing methods described elsewhere herein. The apparatus may be capable of creating an object, for example a 3D braided structure or a 3D printed structure as described elsewhere herein. The system can include one or more devices or mechanisms for (1) loading/feeding carriers into the apparatus, and/or (2) unloading or removing carriers from the apparatus. The system may include, for example one or more on/off ramps for introducing new carriers into the apparatus and removal of used carriers from the apparatus. Used carriers as described herein may refer to carriers that carry used fiber ends, and new carriers may refer to carriers that carry new fibers. The carriers may be transported on the ramps using any of the actuation mechanisms and principles described elsewhere herein. In some embodiments, the ramps may include linear arrays (see, e.g. FIGS. 3A-E and 4A-E) of the same type of magnetic units that are used in a hemispherical array within the apparatus described elsewhere herein. The linear arrays may extend from one or more edge circumferential portions of the hemispherical array. The linear arrays of magnetic units need not comprise any moving or movable parts. The carriers may be transported sequentially along the linear arrays of magnetic units, by modulating the polarities of the magnetic fields to create attractive and repulsive forces to generate translational forces, as described elsewhere herein.

When the carriers are fed into the apparatus, they may be unloaded onto an inner surface of the apparatus (e.g. any of the hemispherical inner surfaces described elsewhere herein) using a step-down loading mechanism. In some embodiments, the step-down loading mechanisms may include mechanical and/or magnetic fiber end grappling devices. Different loading mechanisms may be contemplated depending on the type, size and/or shape of the workpiece media.

In some alternative embodiments (not shown), the system may be a conveyor system comprising one or more moving conveyors, instead of linear arrays of non-moving magnetic units for transportation of carriers. The system may be configured for external automated conveyance of carriers (i.e. external to the apparatus, as opposed to conveyance located within or on the apparatus). Carriers may be transported in and out of the apparatus via conveyors. The conveyors may be provided via the on-ramps and off-ramps.

Referring to FIG. 24, the carrier loading system may include a ramp system. The ramp system may comprise a field exit ramp 2428 and a field entry ramp 2426. The field exit ramp and the field entry ramp may include linear arrays of magnetic units 2430. The field exit ramp and the field entry ramp may be integrally formed as a whole.

As shown in FIG. 24, the field exit ramp and the field entry ramp may be coupled to different portions (edges) of an apparatus 2432. The field exit ramp can be configured to remove one or more used carriers 2406 from the apparatus, and the field entry ramp can be configured to load one or more new carriers into the apparatus.

The one or more carriers exiting the apparatus may carry used fiber ends 2404. The field exit ramp may extend towards a device 2402 that is configured to remove the used fiber ends from the carriers. In some embodiments, the device may include a plurality of spokes 2403. Each spoke may have an extraction end 2405 that catches and removes the used fiber ends as the carriers carrying the used fiber ends move past the extraction ends. The plurality of spokes may be freely movable such that the spokes rotate with the flow of carriers. As the carriers move past the spokes, they engage with the extraction ends in a gear-like manner causing the spokes to rotate. The device 2402 can be configured to concurrently extract lacing needles on the carriers along with the used fiber ends. An enlarged tail/ coupling area of a lacing needle can be set at a precise elevation by a carrier to align with the extraction end of each spoke.

In some alternative embodiments, the plurality of spokes may be optionally configured to rotate in a direction opposite to the flow of carriers. The rotational speed and direction of the spokes (and spacing between the spokes) may be synchronized and aligned with the translational speed and direction of the conveyor system (and spacing between the carriers), such that each extraction end of the spoke precisely catches the used fiber ends as a carrier carrying the used fiber ends passes by the extraction end. For example, in FIG. 24, the plurality of spokes may be configured to rotate in a clockwise direction, and the flow of carriers may be in an opposing tangential direction, thereby allowing the used fiber ends to be captured by the spokes via the counteracting motions. The used fiber ends may be captured by the extraction ends at a predetermined frequency or at a variable frequency. In some embodiments, as the spokes continue to rotate, the extraction ends of the spokes move into the housing of the device, where the used fiber ends and needles may be disposed in a bin (not shown). Such disposal can help to prevent excess used fiber ends and needles from accumulating at the extraction ends of the spokes, and ensures that an extraction end is free of any residual objects prior to capturing the used fiber ends and lacing needle on the next incoming carrier.

After the used fiber ends and lacing needles are removed, the carriers can be transported to an array of reloading positions 2410 that each holds a pair of carriers, such that a carrier pair 2412 holding halves of a single fiber 2416 can be automatically prepared. The reloading array can be configured in a variety of different arrangements and sizes. Each reloading position may comprise a plurality of magnet nodes. For example, FIG. 24 shows each reloading position having five magnet nodes as required by the depicted mode of conveyance, in order to permit two carriers (a pair) to be adjacent to each other without physically blocking adjacent conveyor tracks. In some embodiments, a base of each carrier may be slightly less than twice a diameter of the magnet nodes.

Each pair of carriers may have a same vertical height. In some alternative embodiments, each pair of carriers may have different vertical heights. In some cases, a pair of carriers may be staggered relative to each other (e.g. one carrier is further along a ramp than the other carrier), such that a longitudinal axis of the fiber is non-orthogonal (e.g. oblique) to the direction of conveyance.

FIG. 25A illustrates a carrier reloading system 2500 in accordance with some further embodiments. The carrier reloading system 2500 is similar to the system shown in FIG. 24, except FIG. 25A further illustrates an array of paired loading devices 2424. FIG. 25B illustrates a magnified view 'A' of FIG. 25A showing a single reloading array in closer detail. A reloading array can be configured such that a carrier pair 2412 holding halves of a single fiber 2416 can be automatically prepared, for example as shown in magnified view 'A'. The array of paired loading devices can attach lacing needles to lengths of fiber cut from a spool and feed them into one or two bobbin carriers.

Figure 27A:
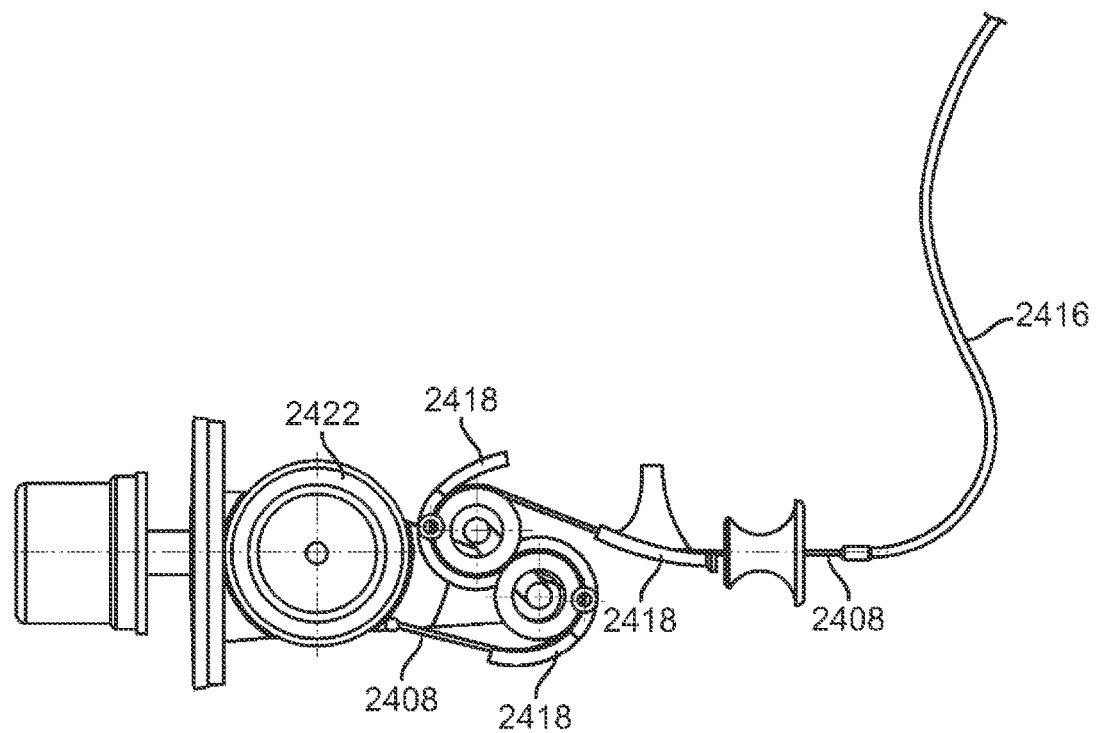
Figure 27B:
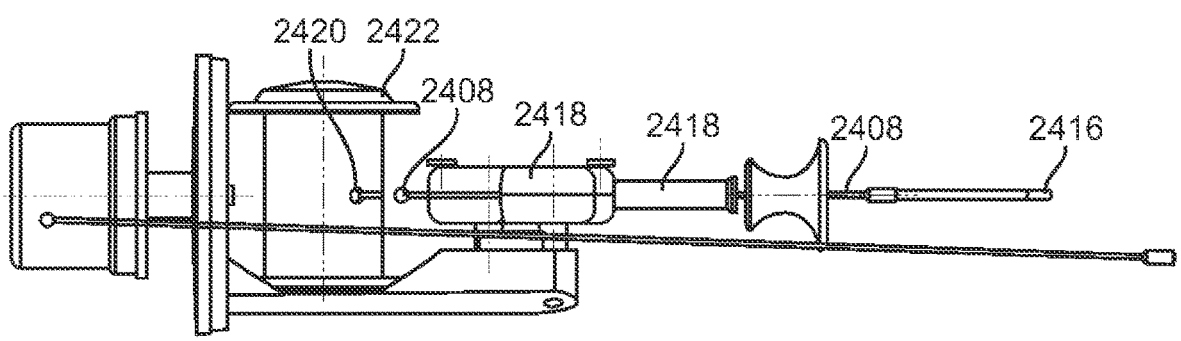

Examples of lacing needle setups are further illustrated in FIGS. 26A, 26B, 27A, and 27B. The lacing needle setups can be configured to allow for on-field connection of fibers into unloaded carriers. Referring to the above figures, in order to facilitate automated fiber loading through each carrier's tensioning pulleys, a variety of farings 2418 can be configured to guide a flexible wire lacing needle 2408 attached to an end of the fiber 2416, to an attachment point 2420 on the carrier bobbin 2422, thereby allowing the carrier to wind up the needle and fiber. Once the fiber and needle have been wound, the carriers and carrier pairs may feed to the array of paired loading devices 2424 to await reentry into the apparatus via the field entry ramp 2426. Fully automatic repeated braiding operations can be achieved using the above configurations, FIG. 27B shows a single carrier with a loaded fiber 2416 that has a lacing needle 2408 on both ends (one end protruding from the carrier orifice). The carrier can be transported onto the field of the apparatus, for example using the field entry ramp 2426 shown in FIGS. 24 and 25A. A robot (not shown) can be configured to (1) capture an end of the lacing needle 2408 that is extended/protruded from the carrier, (2) thread the fiber 2416 through a workpiece/subcomponent, and (3) deliver the needle to an unloaded carrier which can then reel in a portion of the fiber that is now shared between the two carriers. The two workpiece-threaded ends can be subsequently integrated into a braiding operation. The above configuration can allow automated fiber threading of holes in a workpiece, which is not presently available in conventional braiding setups.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While preferred embodiments have been shown and described herein, it will be obvious to those skilled in the art that such embodiments are provided by way of example only. Numerous variations, changes, and substitutions will now occur to those skilled in the art without departing from the scope of the disclosure. It should be understood that various alternatives to the embodiments described herein may be employed in practice. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the disclosure and that methods and structures within the scope of these claims and their equivalents be covered thereby.

What is claimed is:

1. An apparatus comprising:
   a magnetic device arranged in a three-dimensional configuration; and
   a surface on which at least one carrier is configured to move, wherein the surface comprises a trackless bearing layer,
   wherein the magnetic device is configured to provide a magnetic field for driving the carrier on the surface to manipulate a material.

2. The apparatus of claim 1, wherein the trackless bearing layer comprises an unguided surface that does not comprise tracks or carrier guides for guiding a movement of the carrier.

3. The apparatus of claim 2, wherein the unguided surface is disposed above the magnetic device such that at least a portion of the unguided surface conforms to a shape, a profile, or a contour of the three-dimensional configuration of the magnetic device.

4. The apparatus of claim 1, wherein the carrier comprises one or more magnets disposed thereon for interacting with the magnetic field.

5. The apparatus of claim 4, wherein the one or more magnets are configured to interact with the magnetic field to drive the carrier along one or more adjustable paths.

6. The apparatus of claim 4, wherein the one or more magnets comprise one or more magnetic discs.

7. The apparatus of claim 6, wherein the one or more magnetic discs are axially magnetized.

8. The apparatus of claim 4, wherein the one or more magnets comprise a plurality of co-planar adjacent pole surfaces.

9. The apparatus of claim 4, wherein the one or more magnets comprise a plurality of magnetic poles with different orientations relative to the magnetic device.

10. The apparatus of claim 4, wherein the one or more magnets are configured to interact with a plurality of electromagnetic fields generated by the magnetic device, wherein the plurality of electromagnetic fields comprise the magnetic field.

11. The apparatus of claim 10, wherein the one or more magnets are configured to simultaneously interact with the plurality of electromagnetic fields to drive the carrier.

12. The apparatus of claim 1, wherein the magnetic field is modulated to drive the carrier to manipulate the material to form an object, wherein the object is selected from the group consisting of a three-dimensional braided structure, a three-dimensional printed structure, and a three-dimensional assembled structure.

13. The apparatus of claim 1, wherein the magnetic device is selected from the group consisting of stator coils, movable permanent magnets, and switchable permanent magnets.

14. The apparatus of claim 1, wherein the material is selected from the group consisting of fibers, liquid polymers, powder materials, and inks.

15. The apparatus of claim 1, further comprising a controller configured to control the magnetic device to modulate the magnetic field.

16. The apparatus of claim 15, wherein the controller is configured to drive the carrier on the surface by modulating the magnetic field.

17. The apparatus of claim 15, wherein the controller is configured to drive the carrier on the surface to move in three dimensions.

18. The apparatus of claim 15, wherein the controller is configured to drive the carrier on the surface along a predetermined path.

19. The apparatus of claim 15, wherein the controller is configured to detect a position or a motion of the carrier.

20. The apparatus of claim 1, further comprising one or more sensors configured to detect a position and/or a motion of the carrier, wherein the one or more sensors are selected from the group consisting of radio frequency (RF) sensors, magnetic field sensors, optical sensors, and inertial sensors.

* * * * *